United States Patent
Baker

(10) Patent No.: US 10,025,866 B2
(45) Date of Patent: Jul. 17, 2018

(54) COMPARING ITEMS USING A DISPLAYED DIAGRAM

(71) Applicant: Visipick, LLC, Wilmington, DE (US)

(72) Inventor: Scott T. Baker, North Hampton, NH (US)

(73) Assignee: VISIPICK, LLC, Wilmington, DE (US)

( * ) Notice: Subject to any disclaimer, the term of this patent is extended or adjusted under 35 U.S.C. 154(b) by 448 days.

(21) Appl. No.: 14/858,705

(22) Filed: Sep. 18, 2015

(65) Prior Publication Data

US 2016/0042081 A1 Feb. 11, 2016

Related U.S. Application Data

(63) Continuation of application No. 14/831,361, filed on Aug. 20, 2015, and a continuation of application No. 12/829,069, filed on Jul. 1, 2010.

(51) Int. Cl.
| | | |
|---|---|---|
| *G06Q 30/00* | (2012.01) | |
| *G06F 17/30* | (2006.01) | |
| *G06Q 30/06* | (2012.01) | |
| *G06Q 30/08* | (2012.01) | |
| *G06F 3/0484* | (2013.01) | |

(52) U.S. Cl.
CPC .... *G06F 17/30867* (2013.01); *G06F 3/04842* (2013.01); *G06F 3/04847* (2013.01); *G06F 17/30699* (2013.01); *G06Q 30/0643* (2013.01); *G06Q 30/08* (2013.01)

(58) Field of Classification Search
CPC .... G06Q 30/00; G06Q 30/08; G06Q 30/0643; G06F 17/30867; G06F 17/30699; G06F 3/04842; G06F 3/04847; G06F 17/30
See application file for complete search history.

(56) References Cited

U.S. PATENT DOCUMENTS

| | | |
|---|---|---|
| 5,267,274 A | 11/1993 | Donelick |
| 6,502,089 B1 | 12/2002 | Amundsen et al. |
| 6,877,015 B1 | 4/2005 | Kilgore et al. |
| 7,113,190 B2 | 9/2006 | Heaton |
| 7,334,195 B2 | 2/2008 | Gemmell et al. |
| 7,620,573 B2 | 11/2009 | Jameson |
| 7,640,198 B1 | 12/2009 | Albanese et al. |
| 7,752,077 B2 | 7/2010 | Holden et al. |
| 7,966,210 B2 | 6/2011 | Hall et al. |
| 8,176,096 B2 | 5/2012 | Allyn et al. |

(Continued)

FOREIGN PATENT DOCUMENTS

WO   WO2012/003246   1/2012

OTHER PUBLICATIONS

Trevor Thomas Richardson "A software environment for visualizing high-dimensional data using contextual self-organizing maps linked with immersive virtual reality" Iowa State University Copyright © Trevor Thomas Richardson, 2013 (Year: 2013).*

(Continued)

*Primary Examiner* — Naeem U Haq
(74) *Attorney, Agent, or Firm* — Fish & Richardson P.C.

(57) ABSTRACT

Among other things, a user can view graphically how different available items compare to one another, with respect to attributes of the available items, by controlling what is shown in a displayed diagram that identifies the items, in the context of indicators of their attributes.

5 Claims, 57 Drawing Sheets

(56) References Cited

U.S. PATENT DOCUMENTS

| | | | |
|---|---|---|---|
| 8,230,037 | B2 | 7/2012 | Story et al. |
| 8,326,662 | B1 | 12/2012 | Byrne et al. |
| 8,381,180 | B2 | 2/2013 | Rostoker |
| 8,515,809 | B2 | 8/2013 | Jambunathan et al. |
| 2002/0120551 | A1 | 8/2002 | Jones, III |
| 2002/0184266 | A1 | 12/2002 | Blessin |
| 2004/0183835 | A1 | 9/2004 | Muench et al. |
| 2008/0163085 | A1 | 7/2008 | Subbu |
| 2009/0144624 | A1 | 6/2009 | Barnes, Jr. |
| 2009/0209631 | A1 | 8/2009 | Zsebo |
| 2011/0266313 | A1 | 11/2011 | Ghalib et al. |
| 2012/0005045 | A1 | 1/2012 | Baker |
| 2012/0124039 | A1 | 5/2012 | Sandholm et al. |

OTHER PUBLICATIONS

FusionCharts, Investment Analysis Tool [online], [retrieved on May 5, 2010]. Retrieved from the Internet: http://www.fusioncharts.com/Demos/ScatterReturn/Default.html, 1 page.

Google, DoubleClick Ad Planner [online], [retrieved on May 5, 2010]. Retrieved from the Internet: http://www.google.com/adplanner, 2010, 1 page.

Hedger, "Don't Buy Junk" [online], [retrieved on May 5, 2010]. Retrieved from the Internet: http://www.searchengineguide.com/jim-hedger/dont-buy-junkco.php, published on Sep. 27, 2005, 3 pages.

HomeNet Automotive, Integrated Price Analysis Tool [online], [retrieved on May 5, 2010]. Retrieved from the Internet: http://www.homenetauto.com/products/price-analysis.asp, 2010, 3 pages.

iCharts Inc., Public icharts [online], [retrieved on May 5, 2010]. Retrieved from the Internet: http://www.icharts.net/portal/app?page=PublicPortal&service=external&sp=2&sp=SFEATURED_CHARTS, 2010, 2 pages.

MetaFilter Network Inc., "Help me find a good interactive product comparison/tool" [online], [retrieved on May 5, 2010]. Retrieved from the Internet: http://ask.metafilter.com/32418/WebsiteFilter-help-me-find-a-good-interactive-product-comparision-sitetool, published on Feb. 9, 2006, 2 pages.

New York Times, "Obama's 2011 Budget Proposal: How It's Spent" [online], [retrieved on May 5, 2010]. Retrieved from the Internet: http://www.nytimes.com/interactive/2010/02/01/us/budget.html, published on Feb. 1, 2010, 3 pages.

Ovims, Product Release [online], [retrieved on May 5, 2010]. Retrieved from the Internet: http://www.ovims.com/product-price.html, Jan. 15, 2009, 1 page.

The Auto Channel, "Kelley Blue Book Posts Resale Values for Every New Vehicle on kbb.com" [online], [retrieved on May 5, 2010]. Retrieved from the Internet: http://www.theautochannel.com/news/2007/04/12/043472.html, published on Apr. 12, 2007, 3 pages.

zKnives, Interactive Knife Steel Composition Chart [online], [retrieved on May 5, 2010]. Retrieved from the Internet: http://zknives.com/knives/steels/steelchart.php, 3 pages.

Reed, Philip, "Strategies for Smart Car Buyers: Drive a (Nearly) New Car for (Almost) Free!", printed on Apr. 29, 2010, internet website: http://www.edmunds.com/advice/strategies/articles/77147/article.html, 1 page.

Pousman, Zachary et al., "Casual Information Visualization: Depictions of Data in Everyday Life", manuscript received Mar. 31, 2007; accepted Aug. 1, 2007, posted online, Oct. 27, 2007, 8 pages.

Stasko, John, "CS 4460/7450—Information Visualization", Spring 2010, Internet website: http://www.cc.gatech.edu/~stasko/7450/, printed on Aug. 19, 2010, 1 page.

"Featured Visualizations", Internet website: http://manyeyes.alphaworks.ibm.com/manyeyes/, printed on Aug. 19, 2010, 1 page.

TIBCO Software, Inc., "Business Intelligence Analytics Software & Data Visualization—TIBCO Spotfire", Improve Decision-Making Across the Enterprise, Internet website: http://www.spotfire.com, printed on Aug. 19, 2010, copyright 2000-2010, 2 pages.

Tableau, "Business Analytics for All", Data Visualization and Business Intelligence from Tableau Software, Internet website: http://www.tableausoftware.com/, printed on Aug. 19, 2010, 1 page.

Rosling, Hans, "Ted: Ideas Worth Spreading", Internet website: http://www.ted.com/speakers/hans_rosling.html, printed on Sep. 9, 2010, 3 pages.

International Search Report and Written Opinion from corresponding PCT application No. PCT/US2011/042477, dated Oct. 27, 2011 (18 pages).

Eric Sponberg "This is how much sailing yachts cost", posted on Sep. 6, 2006. Retrieved from http://www.boatdesign.netlforums/all-th i ngs-boats-and-boating/how-much-sai ling-yachts-cost-13657.html.

Kirsner, Scott, "A cellphone solution that's hard to grasp", Boston.com, http://www.boston.com/business/articles/2011/04/11/loopski_offered_as_answer_to_cellphone_juggling/, Apr. 2011.

International Preliminary Report on Patentability from corresponding PCT application No. PCT/US2011/042477, dated Jan. 17, 2013 (13 pages).

Transaction history and pending claims for U.S. Appl. No. 12/829,069, filed Jul. 1, 2010 as of Aug. 20, 2015.

\* cited by examiner

Auto Sales Site
Enter Your Search Criteria
Vehicle Status
○ New  ←—12
● Used
Make:
 ←—14
Model:
Distance From
Zip:  ←—16
 ←—18
FIG. 1

| Audi A4 Example | Year | Model | Mileage | Price |
|---|---|---|---|---|
| | 2005 | 1.8 | 54902 | 16995 |
| | 2005 | 1.8 | 59821 | 16495 |
| | 2004 | 1.8 | 62786 | 15555 |
| | 2005 | 1.8 | 62177 | 13995 |
| | 2005 | 1.8 | 73533 | 13497 |
| | 2004 | 1.8 | 74677 | 12995 |
| | 2005 | 1.8 | 80490 | 12888 |
| | 2004 | 1.8 | 75714 | 12350 |
| | 2004 | 1.8 | 103098 | 11500 |
| | 2004 | 1.8 | 100465 | 10877 |
| | 2004 | 1.8 | 90938 | 9900 |
| | 2004 | 1.8 | 117000 | 8499 |
| | 2005 | 2 | 44955 | 16995 |
| | 2006 | 2 | 24625 | 25695 |
| | 2006 | 2 | 43868 | 23900 |
| | 2006 | 2 | 39800 | 20995 |
| | 2006 | 2 | 46547 | 20993 |
| | 2006 | 2 | 42750 | 20900 |
| | 2006 | 2 | 25750 | 19999 |
| | 2005 | 2 | 42353 | 19995 |
| | 2006 | 2 | 67615 | 19795 |
| | 2006 | 2 | 38500 | 18993 |
| | 2006 | 2 | 32380 | 18990 |
| | 2006 | 2 | 35473 | 18900 |
| | 2006 | 2 | 38120 | 18883 |
| | 2005 | 2 | 48500 | 18798 |
| | 2005 | 2 | 49342 | 18432 |
| | 2006 | 2 | 65961 | 17495 |
| | 2006 | 2 | 54736 | 17400 |
| | 2006 | 2 | 65486 | 16995 |
| | 2006 | 2 | 89304 | 12987 |
| | 2005 | 3 | 43564 | 24995 |
| | 2004 | 3 | 73995 | 13995 |
| | 2004 | 3 | 73165 | 12900 |
| | 2006 | 3.2 | 30844 | 25883 |
| | 2006 | 3.2 | 22712 | 24997 |
| | 2006 | 3.2 | 41061 | 21111 |
| | 2006 | 3.2 | 40000 | 20995 |
| | 2005 | 3.2 | 70146 | 15900 |

FIG. 22

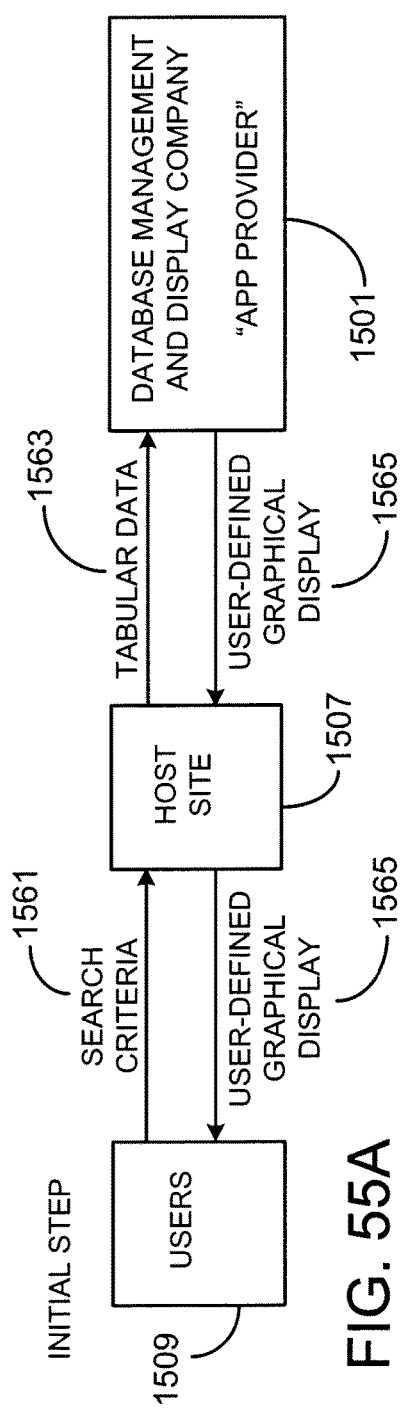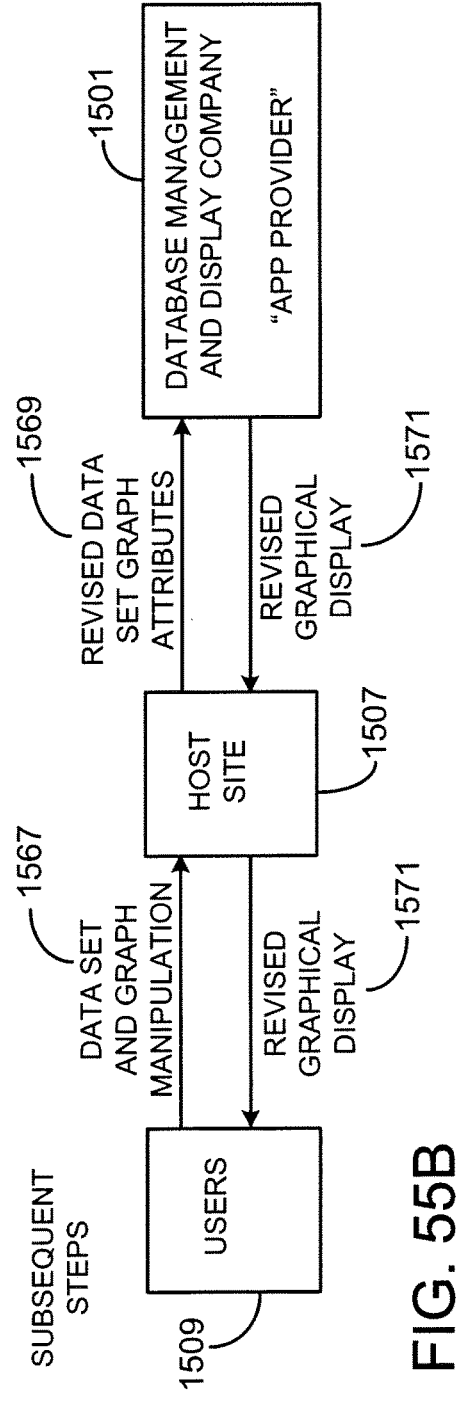

COMPARING ITEMS USING A DISPLAYED DIAGRAM

RELATED APPLICATION

This application is a continuation (and claims the benefit of priority under 35 USC 120) of U.S. application Ser. No. 12/829,069, filed Jul. 1, 2010, and is a continuation (and claims the benefit of priority under 35 USC 120) of U.S. application Ser. No. 14/381,361, filed Aug. 20, 2015 the contents of both of which are incorporated herein by reference.

BACKGROUND

This description relates to comparing items using a displayed diagram.

For the vast majority of websites that offer information on products, services and people over the web, many allow users to input filter criteria for the purpose of narrowing the scope of their search. By using filter criteria, users can focus on the specific product or service that they wish to view by eliminating from a data set all of those products and services of which they have no interest.

Once a user has established the data set he wishes to view, and after entering and employing their filter criteria, the products, services or people are commonly presented to the user in a list or gallery format. These lists are generally very readable and easy to understand, and they often allow users to interact with the list by clicking on an item, providing the user with more detailed information on that product, service or person. Also common, is the user's ability to sort these lists by various data criteria that help define their data set. In virtually all instances, information can be sorted by only one variable at a time; hence, items can only be measured against one another by one variable in any given display, and the information is conveyed in a text format. Information lists, whether in text or photographs, are the standard to which most information-providing websites ascribe.

SUMMARY

In general, a user can view graphically how different available items compare to one another, with respect to attributes of the available items, by controlling what is shown in a displayed diagram that identifies the items, in the context of indicators of their attributes.

Implementations may include one or more of the following features. The user controls what is shown by defining criteria of a search, the diagram is displayed in response to the search, and the items portray in the diagram are controlled by the search. The user controls what is shown by refining an existing search, and the displayed diagram is altered in response to the refining of the search, to include items controlled by the refined search. The user controls what is shown to him using elements of the displayed diagram.

The different items are portrayed by respective graphical identifiers that have positions in the displayed diagram that correspond to the attributes for those items. The relative positions of the graphical identifiers, in the displayed diagram, show how the different items compare. The graphical identifiers include points or dots or x's or icons or images or other markers. The controlling includes changing which items are represented in the displayed diagram. The controlling includes changing the number of items that are represented in the displayed diagram. The controlling includes changing a range, of at least one of the attributes, that is met by the items that are included in the displayed diagram. The controlling includes applying a filter that governs which items are represented in the displayed diagram.

The controlling includes applying search criteria to a body of items to select items to be portrayed in the displayed diagram. The search criteria are expressed with respect to the attributes. The displayed diagram portrays the attributes in two or three dimensions. The items are portrayed in the displayed device along two or three dimensions that are associated with two or three of the attributes. At least one of the attributes is quantitative. At least one of the attributes is non-quantitative. At least one of the attributes includes a subjective quality of the items. One of the attributes includes aging.

The displayed diagram portrays a statistical value that is based on the values of at least one of the attributes for a set of the items. The statistical value includes an average or median. The items include unique items. The unique items are new or used items. The items are organized as groups of items. One of the attributes includes price.

The user can view an image, data, or both related to each of the items by interacting with the displayed diagram. The user can interact with the displayed diagram by pointing to identifiers of items. The interacting causes additional information about the items to be displayed on or in the vicinity of the displayed diagram. The displayed diagram is displayed in conjunction or alternately with a display of a text list of the items. The diagram is displayed on an online commercial service.

The user can drag an interactive display element to alter the number or identity or both, of the items that are portrayed in the displayed diagram. The element that is dragged includes a slider. The element that is dragged includes a bounding box.

Two dimensions of the displayed diagram show ranges of two of the attributes for the items, and a third conceptual dimension shows at least a third attribute. The third conceptual dimension is shown using color. The third conceptual dimension is shown using multiple trend lines.

One of the attributes includes an indicator of age or wear other than time. One of the attributes includes an indicator of worth other than money. On or in the vicinity of the displayed diagram, two or more of the items are identified that are determined automatically to be relatively attractive to the user. The user can indicate ranges of the attributes that are of interest to the user. The displayed diagram portrays which items have prices that are above a book or appraised value or below a book or appraised value for the items. A depreciation of value includes one of the attributes. Items belonging to different groups are portrayed in a way to identify the groups to which they belong. The displayed diagram shows predictions of attributes associated with the items. The predictions are of depreciated values.

The items include vehicles. The attributes include at least two of price, age, mileage, color, model, style, or brand. The items include at least one of cars, trucks, motorcycles, and boats. The items include items related to travel. The attributes include at least two of mode of travel, departure location, arrival location, departure time, arrival time, time of travel, one-way or round trip, seating class, duration of travel, and price. The mode of travel includes at least one of plane, train, bus, or boat. One dimension of the displayed diagram includes times of departure, times of arrival, or both. The items include possible relationships. The items include identifications of at least one other person or entity of interest to the user. The items include an introduction of the user to another person for the purpose of dating. The attributes include at least one of appearance, interests, background, values, sex, location, amount of education, and age. The displayed diagram shows age along one dimension.

The items are portrayed in clusters at intersections of values of two attributes. The attributes include a quantitative measurement of a quality of a match between the user and other persons or entities. The displayed diagram includes statistics showing the number of items that are characterized by at least one of the attributes. The displayed diagram includes a map on which the items are portrayed at respective locations. The items include real estate for rental or sale or lodging rooms. The attributes include size and price. The displayed diagram includes a portrayal of a trend of the attributes. The displayed diagram includes a histogram of values for an attribute. The attributes include a number of bedrooms. The attributes include a listing price. The attributes include a rating. The items include food service locations. The items include boats and the attributes include at least two of price, engine hours, length, horsepower, maximum speed, and cruising range. The items are available at auction. The attributes include a stage of the auction. The user can switch between the displayed diagram and a list or gallery view. The different available items include services or vendors of services. The attributes include distance from the user. The attributes include quality rating for a vendor of services or a measure of user satisfaction with a vendor of services. The attributes include a measure of how well a vendor of services matches the user. The attributes include one or more of scope of services, product lines offerings, reputation ratings, or accreditations. The attributes include a measure of compatibility of the items with answers of the user to questions.

In general, in an aspect, items are identified to a user that are available to the user through an online site, the user can define a search for available items that have specified attributes, available items are listed that have the specified attributes, and a diagram is displayed to the user that portrays the available items that have the specified attributes, in the context of their attributes.

Implementations may include one or more of the following features. The items include used products and the online site lists used products that are for sale to users. The items include used cars and the attributes include price and mileage. The items include new cars and the attributes include selling price and MSRP or dealer invoice. The items include travel arrangements. The items include travel tickets and the attributes include at least two of time, price, location, class, and supplier. The items include hotel rooms. The items include restaurants. The items include boats, and the attributes include at least two of price, engine hours, length, horsepower, maximum speed, and cruising range. The items include potential relationships. The online site includes a dating service and the attributes include at least two of age, sex, appearance, education, location, and values. The items include real estate or lodging and the attributes include at least two of size, price, location, number of bedrooms, and ratings. The items are available at auction and the attributes include price and a stage of the auction.

In general, in an aspect, information is received, from a site that identifies items that are available, about attributes of the items and information about searches done by users of the site, information is delivered to the site, in exchange for a fee, that enables the site to display, to the users, diagrams that portray the items that meet the searches, in the context of the attributes of those items.

In general, in an aspect, users can view graphically how different available items compare to one another, with respect to attributes of the available items, by enabling the users to control what is shown in a displayed diagram that portrays the items, in the context of indicators of their attributes, measuring uses by the users of the displayed diagrams, and assessing fees, based on the measured uses. between conduct of, attitude towards, or awareness of items of users who used the displayed diagrams and those who did not. Conduct, attitude towards, or awareness of items related to the uses of the displayed diagrams are measured for effectiveness and fees are assessed based on the effectiveness. The users are members of a site that identifies the available items.

In general, in an aspect, webpages are served that identify used cars for sale, and in response to a user searching for used cars that meet specified attributes, the user can view graphically how the different used cars that meet the attributes compare to one another, by controlling what is shown in a displayed diagram that portrays the used cars in the context of indicators of at least their prices and aging.

In general, in an aspect, webpages are served that identify new cars for sale, and in response to a user searching for new cars that meet specified attributes, the user can view graphically how the different new cars that meet the attributes compare to one another, by controlling what is shown in a displayed diagram that portrays the new cars in the context of indicators of at least their selling prices, manufacturer's suggested retail prices, or dealer invoice prices.

In general, in an aspect, webpages are served that identify flights, boat rides, or trains that have available seats, and in response to a user searching for flights, boat rides, or trains that meet specified attributes, the user can view graphically how the different flights, boat rides, and trains that meet the attributes compare to one another, by controlling what is shown in a displayed diagram that portrays the flights, boat rides, or trains in the context of indicators of at least their times and prices.

In general, in an aspect, webpages are served that identify people who are available for relationships, in response to a user searching for people that have specified attributes, the user can view graphically how the different people who meet the attributes compare to one another, by controlling what is shown in a displayed diagram that portrays the people in the context of indicators of at least their sex, age, and location.

In general, in an aspect, webpages are served that identify real properties that are available, in response to a user searching for properties that have specified attributes, the user can view graphically how the different properties that meet the attributes compare to one another, by controlling what is shown in a displayed diagram that portrays the properties in the context of indicators of at least their price, size, and location.

In general, in an aspect, webpages are served that identify boats that are available, in response to a user searching for boats that have specified attributes, the user can view graphically how the different boats that meet the attributes compare to one another, by controlling what is shown in a displayed diagram that portrays the boats in the context of indicators of at least their price, size, and engine hours.

In general, in an aspect, webpages are served that identify items for sale at auction, in response to a user searching for items for sale at auction that have specified attributes, the user can view graphically how the different properties that meet the attributes compare to one another, by controlling what is shown in a displayed diagram that portrays the auction items in the context of indicators of at least their price, time to auction closing, and location.

In general, in an aspect, webpages are served that identify restaurants, in response to a user searching for restaurants that have specified attributes, the user can view graphically how the different restaurants compare to one another, by controlling what is shown in a displayed diagram that portrays the restaurants in the context of indicators of at least their quality ratings.

In general, in an aspect, the user can view graphically how different available items compare to one another, with respect to attributes that include at least two of price, size, location, timing, and rating, by controlling what is shown in a displayed diagram that portrays the items, in the context of indicators of their attributes.

Implementations may include one or more of the following features. The user controls what is shown to him by zooming in on a region of the displayed diagram. The displayed diagram is altered dynamically in response to the refining of the search. The user can insert at least one line to show suggested prices from third-party pricing sources along a continuum of age or wear. The displayed diagram has regions, where different regions are displayed using different appearances or names based on their location within the displayed diagram. The user can control what is shown by controlling data points or data subsets that are included in the displayed diagram, based upon specific criteria. The displayed diagram portrays an estimate of the future value of an item taking account of age or aware of the item. The user can control what is shown in the displayed diagram by identifying an item with respect to which at least some information should not be included in the displayed diagram. No information about the identified item is shown in the displayed diagram.

The user can control what is shown either by defining search criteria for items in a search facility, or by interacting with the displayed diagram, or both. At least one of the attributes includes a non-quantitative attribute and the indicators of the attributes are displayed in the diagram ordinally. The user can control what is shown in the displayed diagram by choosing a number of items to be identified in the displayed diagram. One of the attributes includes distance and the items are identified in the displayed diagram in order from smaller to larger distances. The distance is determined using at least one of an address, a venue, or an attraction. The user can view graphically and simultaneously two or more displayed diagrams that identify items. Values of one of the attributes are normalized along a normalized line using available information about the values and simultaneously items are identified in terms of their values relative to the normalized line. The attributes include price and the items are identified in terms of their prices relative to the normalized price line.

One benefit of the graphical view of a data set is that it allows users to see how data points within the data set relate to one another using more than one variable, and in a visual format. It is this visualization of a comparison between data points that allows users to easily see how products, services and people compare or relate to one another, using criteria that they deem important. By allowing users to see how all data points relate to one another or to a common element, in just a single display, they can more efficiently focus in on the data point(s) that are most interesting to them, and hence, accelerate and improve the research and selection process.

From users' point of view, they will find the graphical displays helpful in their search, as these graphs show information in an easy-to-comprehend format by providing a visual of the relative attractiveness and/or relative value of one product versus another. To the extent that users are better able to locate the item in which they search, they will value this application. This enhanced process can come in the form of a more informed selection, as they are more knowledgeable about the relative value or attractiveness of the item(s) in which they seek. This knowledge can then be translated into cost savings, a greater likelihood of making a good, informed decision, or simply more confidence in making a selection. A better-informed consumer will make better decisions, which will also result in a more satisfying selection experience; at the point of selection, as well as after the selection. Furthermore, to the extent that users are able to make their search process more efficient by finding their desired item more quickly, they will also value the time savings offered by a more intuitive, more interactive search process. Web sites that allow users to potentially save time and money, while making them more knowledgeable and confident in their selection process, will be attractive to users. When users have a better search experience on a site, whether they are looking for a product, service or person, they are more likely to frequent that site vis-à-vis competitor sites. As a result, the sites that provide this better user experience will end up with increased traffic, and increased traffic generally leads to increased commerce. This increased commerce can come in the form of additional product listing fees, direct sales, referral sales, sales commissions, advertising revenue and website memberships. Moreover, if users' confidence is enhanced through increased knowledge, the probability of them actually making a selection will be greater. As a result, websites that employ this application will experience not only an increase in the quantity of site traffic, but also in its quality, as selection rates will be higher.

In viewing an online site for the purposes of buying or researching a product, the user typically has the ability, from the universe of products that are available on that website, to narrow the scope of his search to identify the product that is most consistent with the product that he wishes to investigate. The narrowing of this scope can be done through the input of search criteria, which are specific qualitative and quantitative attributes associated with that product or product class. The search process can be done in a single phase, where all criteria are selected on a single display, or in a multi-phase process, where consecutive narrowing of scope is carried out over multiple displays.

Information about products and services has become more readily available on web sites, the Internet, and other modern information technology than ever before. Consumers can use this information to make informed choices about which products and services to purchase, but at the same time the sheer amount of information now available can be overwhelming. The information can be made more usable and manageable if it is presented in a way that is visible, interactive, and easy to use.

These, and other advantages, features, and implementations, and combinations of them, can be expressed as method, apparatus, systems, program products, means and steps for performing functions, components, and in other ways.

Other advantages, features, and implementations will become apparent from the following description, and from the claims.

DESCRIPTION

FIGS. 1-21 are screen shots of portions of a web site.
FIG. 22 is a data table.

FIGS. 54-56 are block diagrams

By (a) allowing a user (of a website, for example) to view graphically how different available items (for example, used cars) compare to one another, with respect to attributes of the available items, and (b) enabling the user to control what is shown in a displayed diagram that portrays the items, in the context of indicators of their attributes, the user can more easily and visually compare and pick products and services in terms of their attributes.

By allowing the user to use interactive controls to change the appearance of the visualization, including which attributes are shown and in what manner they are presented in relation to each other, the comparison display allows users to quickly and easily visualize the relationship between different products, services, and people, and come to a well-informed selection decision. Such a visualization technique could be implemented on a wide variety of web sites but many other media for interactive presentation and visualization would also be possible. For example, hand-held devices may have access not only to web sites but also to customized applications ("apps") that also provide visual access to data. An "app" could be used to present the comparison display or visualization. Other custom applications could be used with personal computers, public kiosks, or other kinds of electronic information system. Thus, when we refer to a "web site," it is just one example of a very wide range of possible implementations.

In the case of FIG. 1, we use the example of a web site that offers vehicles for sale, and where the user has the ability to select basic information regarding the vehicle in which he is searching. In this case, the user can choose between "new" and "used" vehicles 12, and he has chosen the Audi A4 as the vehicle's make and model 14. Additionally, he (or she) has chosen to search for A4's within a 5-mile radius of zip code 01234 16. With these criteria chosen, the user then clicks on "Search" button 18.

Figure 2:
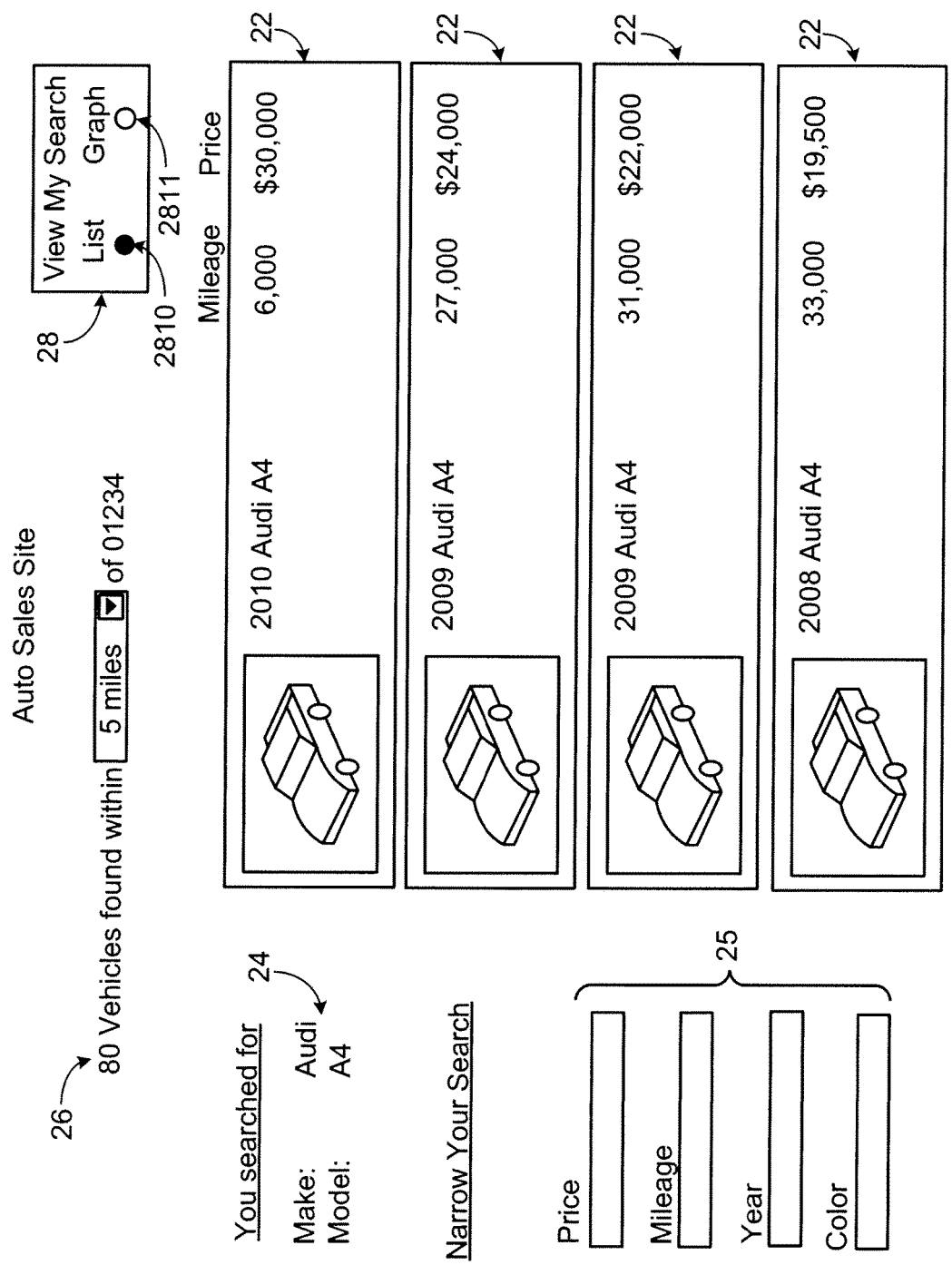

Once the user chooses to search the site's database using the basic search criteria, he is brought to a display similar to FIG. 2. In this display, the vehicles that match the basic search criteria are displayed 22 "historically, only visible in a list or gallery format", along with the search criteria 24 and a representation of the number of vehicles that meet the criteria 26. Additionally, the user is often presented with the ability to choose from additional search criteria 25, where he has the ability to filter the site's database further, to further refine their search (e.g. narrow the search, broaden the search, or perform a combination of the two by narrowing some search criteria and broadening others). Here, we introduce the notion of adding a display alternative for the user. In this case, the user can select from within a "View My Search" box 28, either a "list" view, a historical standard, or a display alternative, the "graph" view, which presents a visual diagram of product attributes or characteristics and indicates how those attributes or characteristics compare with one another.

Figure 3:
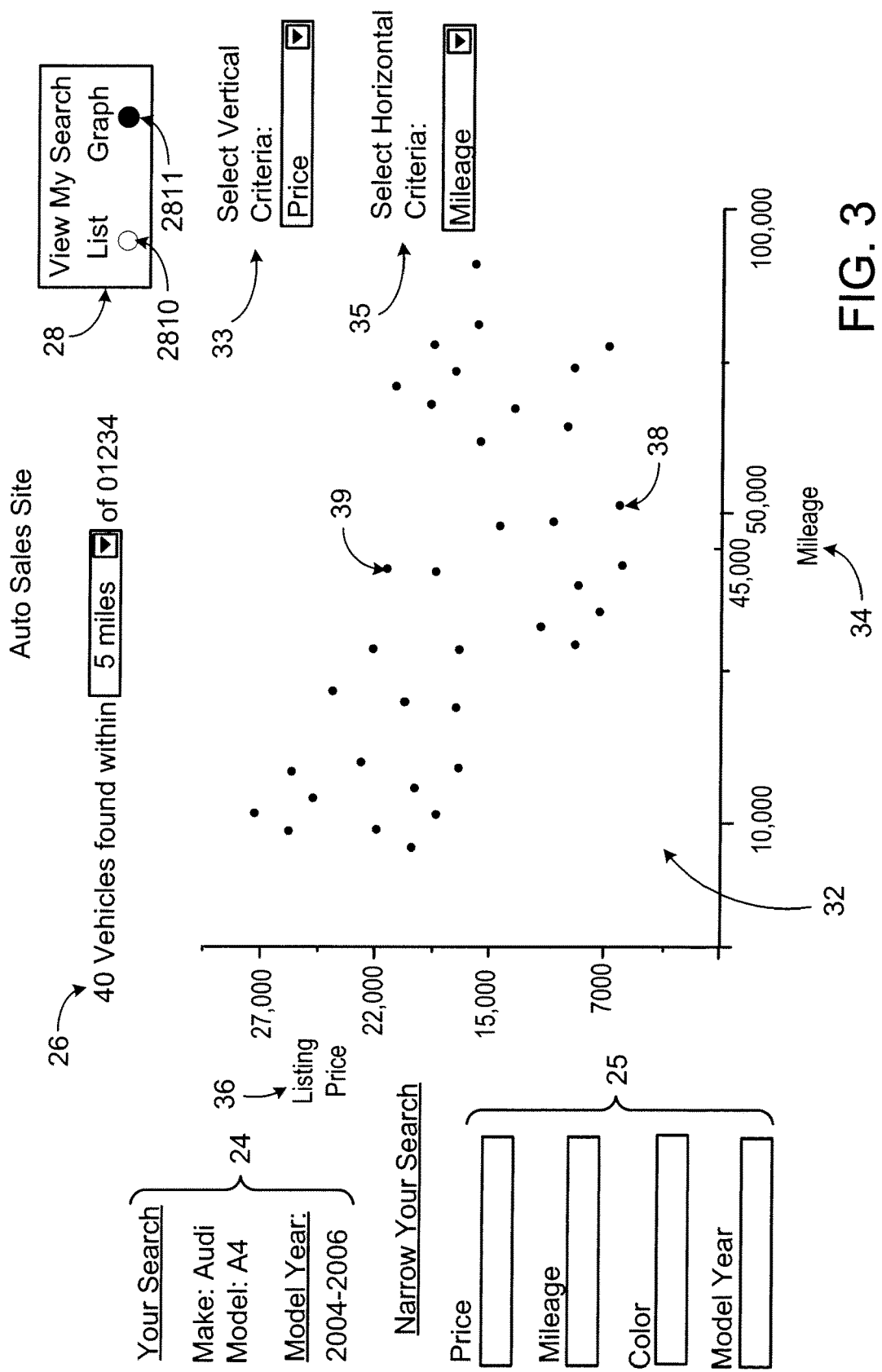

If the user selects the "graph" view, he is brought to a display that is represented by FIG. 3. In this display, instead of seeing vehicles listed sequentially or in a gallery display, each vehicle that meets the search criteria is displayed as a data point on an X/Y graph 32. For this demonstration, the default display shows vehicles plotted using their mileage 34 and their listing price 36 as the X and Y coordinates, respectively. In instances where three variables are chosen in which to view the data set, a three-dimensional X/Y/Z graph, with three axes can be utilized.

In this instance shown in FIG. 3, the user sees the price and mileage relationship between each vehicle. Price and mileage have been used as default variables in this example, as vehicles' mileage and price are key determinants in users' vehicle-purchasing process. With this graphical display, the user can readily see the relationship among all of the vehicles that meet his or her search criteria, displayed relative to one another by the variables that are important to him or her. In this demonstration, the vehicles that resulted from applying the search criteria are priced roughly between $8,000 and $26,000, and their mileage varies from a low of 24,000 miles, to a high of 118,000 miles. For example, vehicle 38 has a price of $15,000 and mileage of 50,000. Vehicle 39 has a price of $22,000 and mileage of 45,000. The user might find this interesting and might be attracted to vehicle 38 rather than the vehicle 39, as it would show a significantly lower price for a vehicle with similar mileage. In this example, vehicles 38 and 39 are represented by a graphical indicator, which here is a dot but could be any other graphical element.

If the user wishes to modify, refine or narrow his search criteria, he can do so from the search criteria options listed on the display 24, 26. As these search criteria are modified while in the "graph" viewing option, data points will appear and disappear dynamically as the displayed data set reflects the new search parameters. To the extent that the user feels that there are too few or too many data points to review, he can modify his search to expand or reduce the number of instances, or data points, on the graph for a better visualization. Users will find that as the search criteria is broadened to allow for more data to be included in the search the graphical display will become more challenging to view a single data point. However, by broadening the search criteria, the user will be able to see a more pronounced trend to the data, as the randomness of individual data points will succumb to the overall relationship between the two axis variables. For example, if the user narrowed their search criteria so that only ten Audi A4s met those criteria and were displayed, the relationship between the two variables, if any, may not be apparent. However, if five hundred A4s met the search criteria and were displayed, the relationship between mileage and price will become much more pronounced and defined.

With this visual display, the relationship between data points, e.g. vehicles or relative attractiveness, becomes recognizable, as users are able to see how the price and mileage of specific vehicles compare to one another. For practical purposes, users interested in vehicles in specific price or mileage ranges can easily view the alternatives that exist within those ranges and how those vehicles compare to others that fall outside of those ranges. In general, this feature can be described as showing data points relative to one another in a graphic display. The characteristics or attributes of a product (such as a vehicle), service, or person are used to determine how the items are visually represented in comparison to each other.

Figure 4:
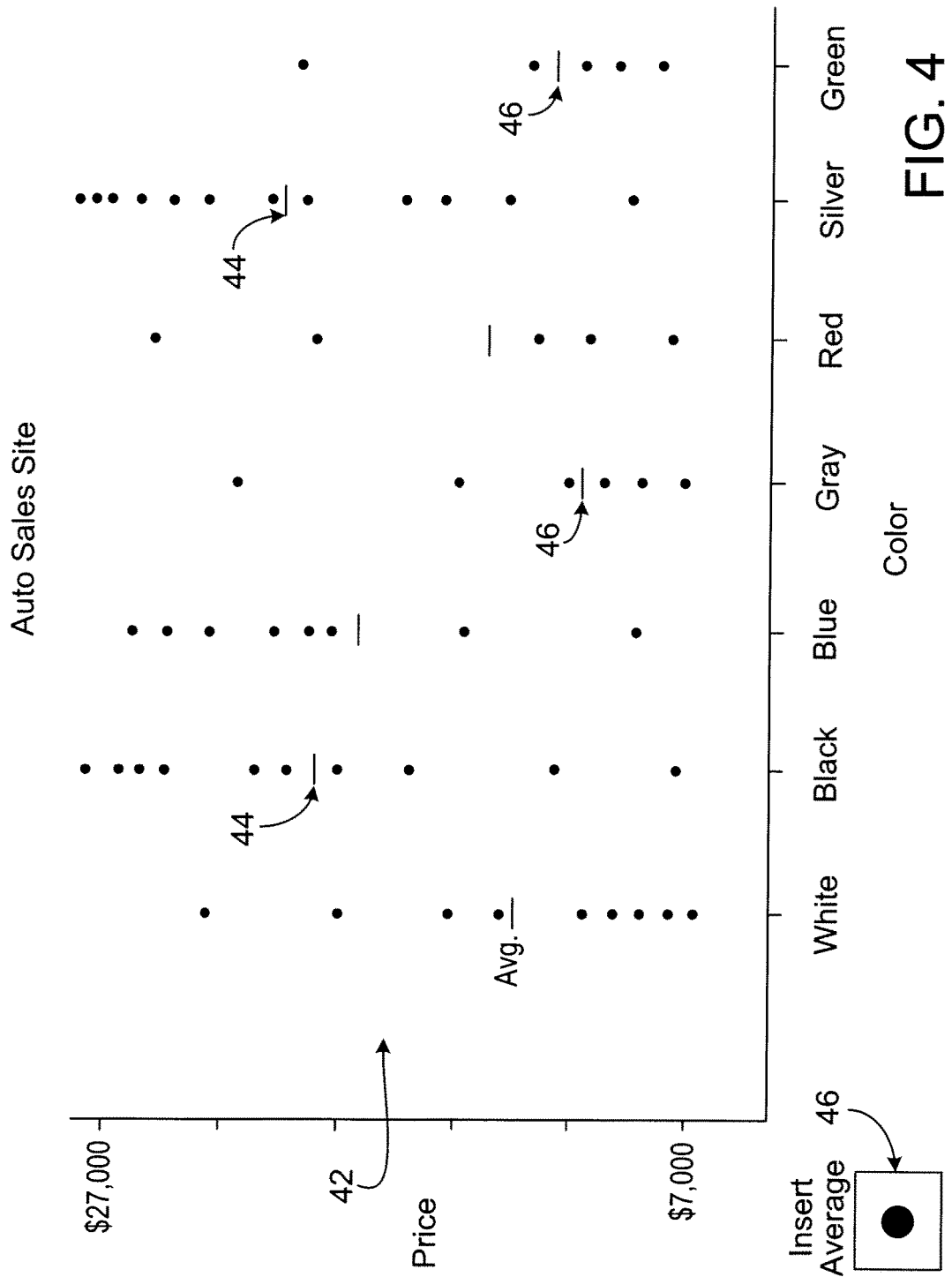

Within the display represented by FIG. 3, users have the ability to choose the search criteria 24, 25 that are used as variables along the axes of the X/Y graph 32. Utilizing drop-down boxes 33 and 35, users can select from any of the search criteria to determine the vertical criteria "Y axis" 36 and the horizontal criteria "X axis" 34. FIG. 4 shows another example of the display in which the user has chosen the criteria "price" and "color" as the vertical and horizontal measurements, respectively, using the drop-down boxes 33 and 35.

As shown in FIG. 4, a user can easily see the data set of Audi A4s displayed with their price and respective colors on the X/Y graph 42. By clicking on the "Show Averages" button 46, one searching for an A4 can observe that black and silver A4s have on average, higher listing prices 44 than those that are gray or green 46, and conclude that black and silver alternatives are more valuable than those colored gray or green.

Figure 5:
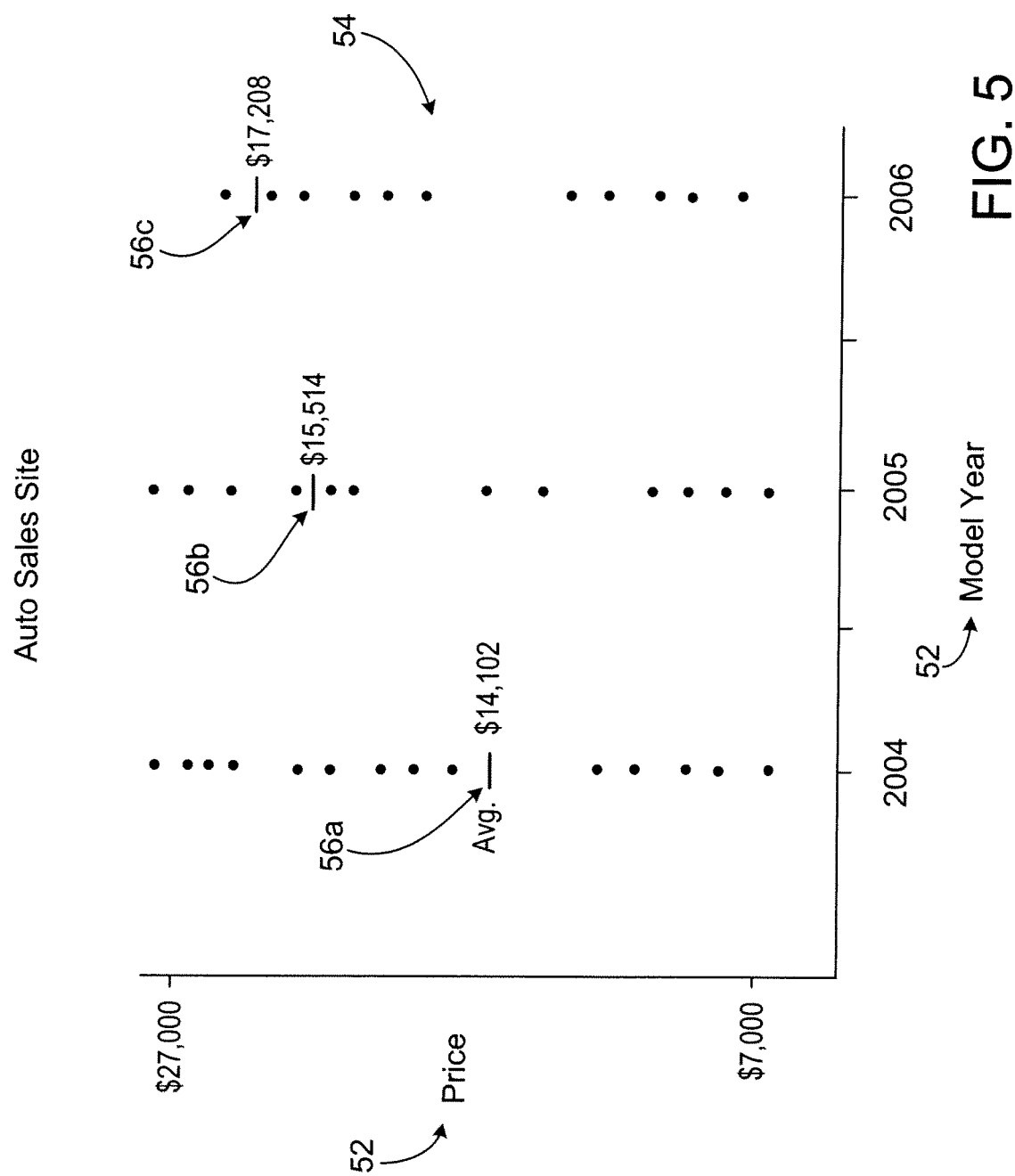

In FIG. 5, the user has chosen "Price" and "Model Year" as the desired variables 52 for viewing. In this example, users can see how the model years of different A4s are priced relative to one another 54 and see the difference in average list price between vehicles of the different model years. In this example, 2004 models 56a have an average list price $1,412 lower than 2005 models 56b and $3,106 lower than 2006 models 56c.

Figure 6:
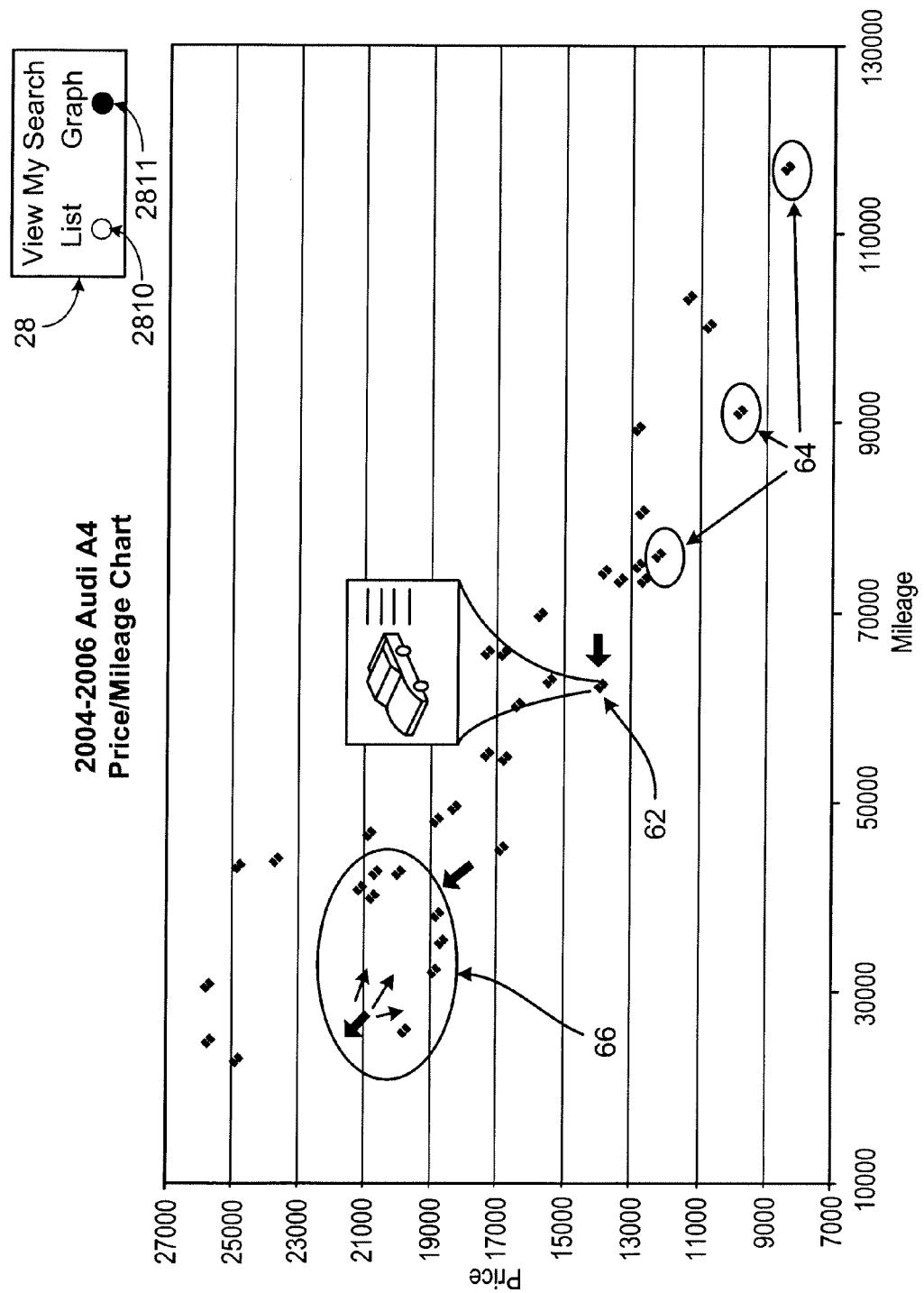

Users that wish to interact with the data points displayed have a number of different alternatives available in which to view more detail of the data points, e.g. vehicles; some of these alternatives are displayed in FIG. 6. A user that wishes to see more information about a particular vehicle can simply move his cursor over the data point and the basic information about the vehicle, e.g. picture and summary info, will pop up while the cursor is located over the data point 62. If the user wishes to view a specific vehicle, he or she can click on the data point 62 to view the full listing details. If the user wishes to view a number of selected data points, such as 64, he or she can perform a function such as a "control/click" or another user interface action upon each of the data points in order to view the full listing details of just those selected. If the user wishes to view a range of data points 66, he or she can click on an open location of the graph and drag the cursor across the desired area to highlight the relevant data points to be selected 66. If the user wishes to have that data point removed from the display, a function such as a right-click, followed by the selection of "remove" from a drop-down menu, will allow the user to remove this data point from the display. This is helpful in that if the user has viewed a data point and determined that he has no interest in that selection, he can then remove that selection from the field of view. Those data points that have been selected or viewed can be noted by a differing appearance from those that have not been viewed, for example, the selected or viewed data points could have a different color, a different size, a different shape, or another visual characteristic that is distinct from the other data points. In all instances, users have the ability to toggle between "list" view or "graph" view with the selections that they have chosen by clicking the appropriate option within the "View My Search" box 28.

Figure 7:
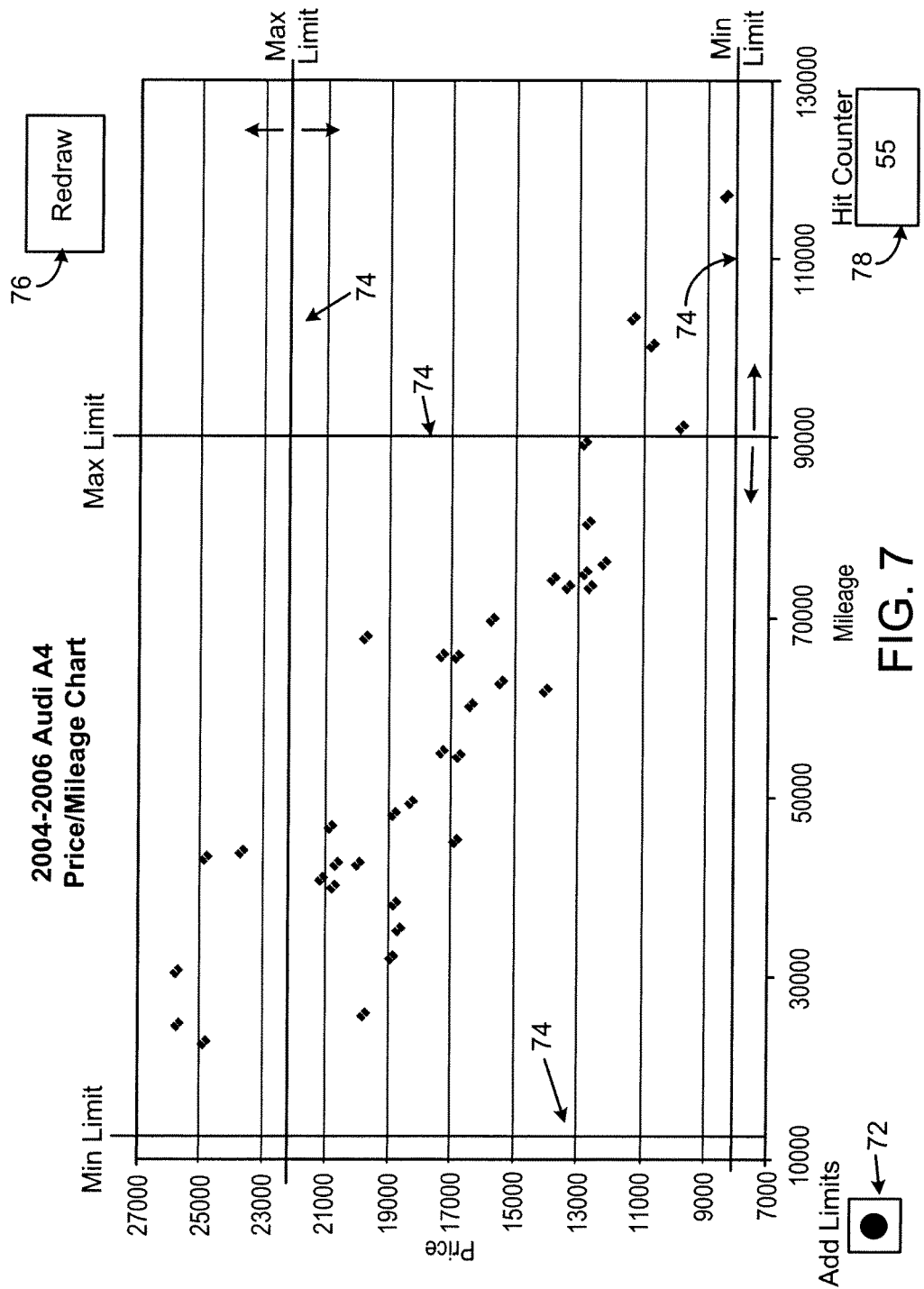

As shown in FIG. 7, if the user wishes to eliminate a portion of the data set, e.g. those vehicles with more than a certain number of miles and/or with a list price above a certain amount, the user could click on an "Add Limits" icon 72 to install limit lines on the graph 74. With both horizontal and vertical maximum and minimum limit lines displayed 74, the user could then click on and drag these limit lines both horizontally and vertically to alter the search range to be displayed. In this example, the user selects 90,000 miles and $22,000 as the respective maximum limits to put in place for new search criteria. With the new limits established, the user clicks on the "Redraw" button 76 to redraw the graph with the new parameters. This can be useful, for example, when outlying data distorts the overall view of the data set, and causes data points to congregate in one small area of the graph. By establishing new limits, users can essentially "stretch" the graph to view a new sub-set of the data in an expanded view. Additionally, as the limit lines 76 are moved left/right, up/down, a "Hit Counter" 78 will update real-time with the number of data points that fall within the bounds of the limit lines. As the maximum and minimum limit lines are brought closer together, thus reducing the allowable data range, the Hit Counter 78 will display a decreasing number of instances of data within the search parameters. For those users wishing to only view a finite number of data points, e.g. 20 or 30 within a certain range, the limit lines 74 can be dragged closer to one another until the desired number of data points within the search area is achieved.

Figure 8:
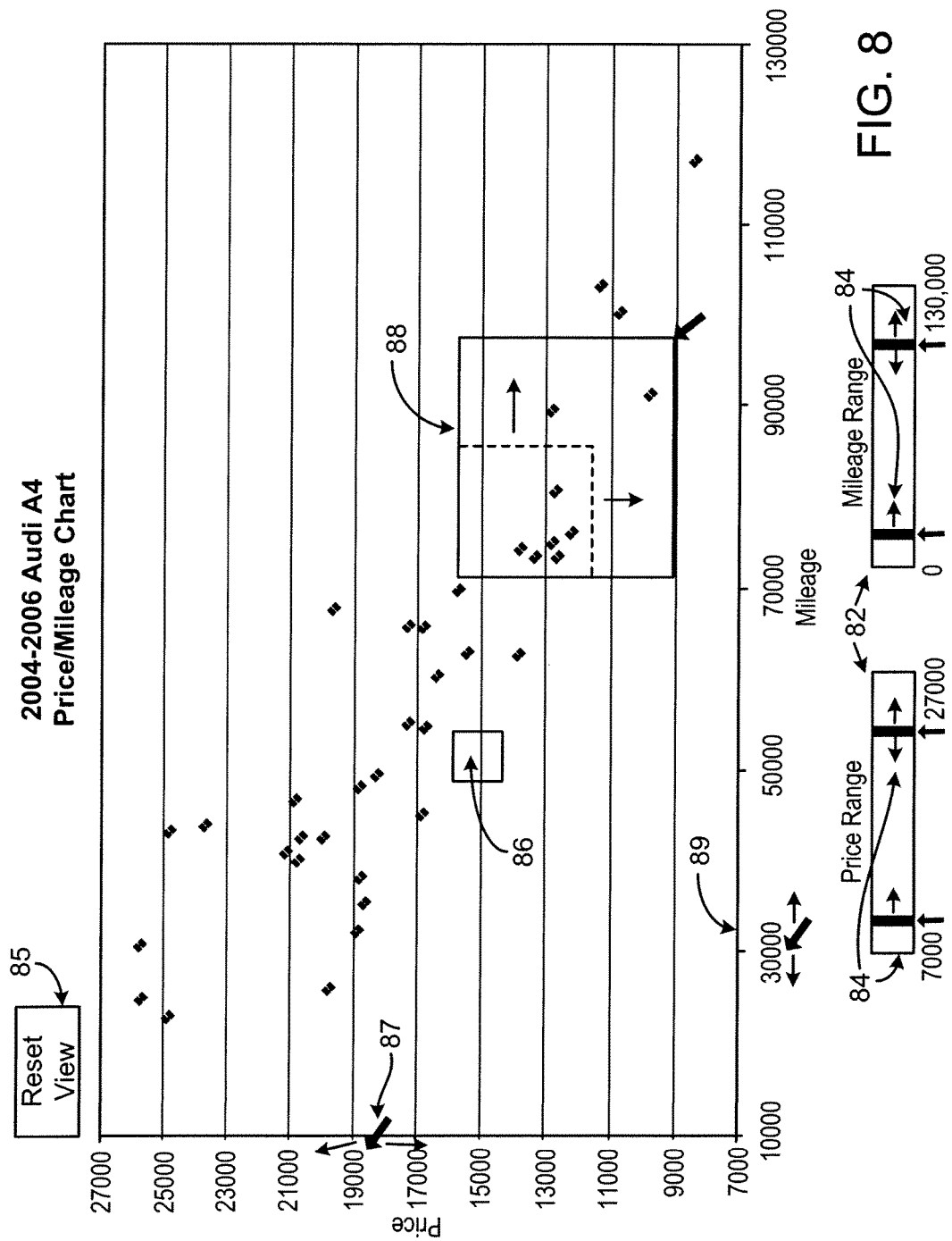

An alternative to inserting and moving limit lines can be found in FIG. 8. In this instance, "range bars" 82, are present on the display, and users can drag the range limits 84 for each variable, left and right to increase/decrease the viewable range of data points. Under this alternative, a "Redraw" button 76 would not be needed, as the graph axes would adjust to the new limits dynamically, giving the effect of zooming in, as the range limits are brought closer together. In this instance, the user can determine a data range that is of interest to him and expand the graph for that particular data range.

Referring to FIG. 8, other options exist for looking at a region of the graph more closely, or "zooming in". One option is to simply double-click on (or otherwise indicate) a vacant spot on the graph 86 in the area to be viewed more closely. Double-clicking will have the desired effect of zooming into that area of the graph more closely so that data points within that area become more dispersed and more easily viewed individually. Another option is to click on a vacant spot on the graph, and drag across the area to be more closely viewed, as shown in area 88. Once the area has been highlighted, the user releases the mouse click, and the highlighted area is immediately displayed as the new full graphical display. Another option is to click on either the X or Y axis at a specified point 87, 89, and then move the cursor along the axis to expand or collapse the view, having the effect of increasing/decreasing the numerical range of the axis. For example, if the user were interested in A4s in the $19,000 range, he or she could click on the $19,000 price on the Y axis 87, and move the cursor upward. Doing so would have the effect of zooming into the $19,000 price range, and expand the data points on and around that value. A similar exercise could be done with the mileage on the X axis, such that a user interested in lower-mileage vehicles could click on the 30,000 mileage value 89, for example, and move the cursor to the right, also having the same desired zooming effect. Those vehicles with much higher mileage values would fall off the graph display because the zooming feature would cause those data points to be outside the range of the display.

For all limit and zooming features, and for all other alterations that are made to the original display from the original search criteria, the graphical display can be reset to its original view by clicking on the "Reset View" button 85.

Figure 9:
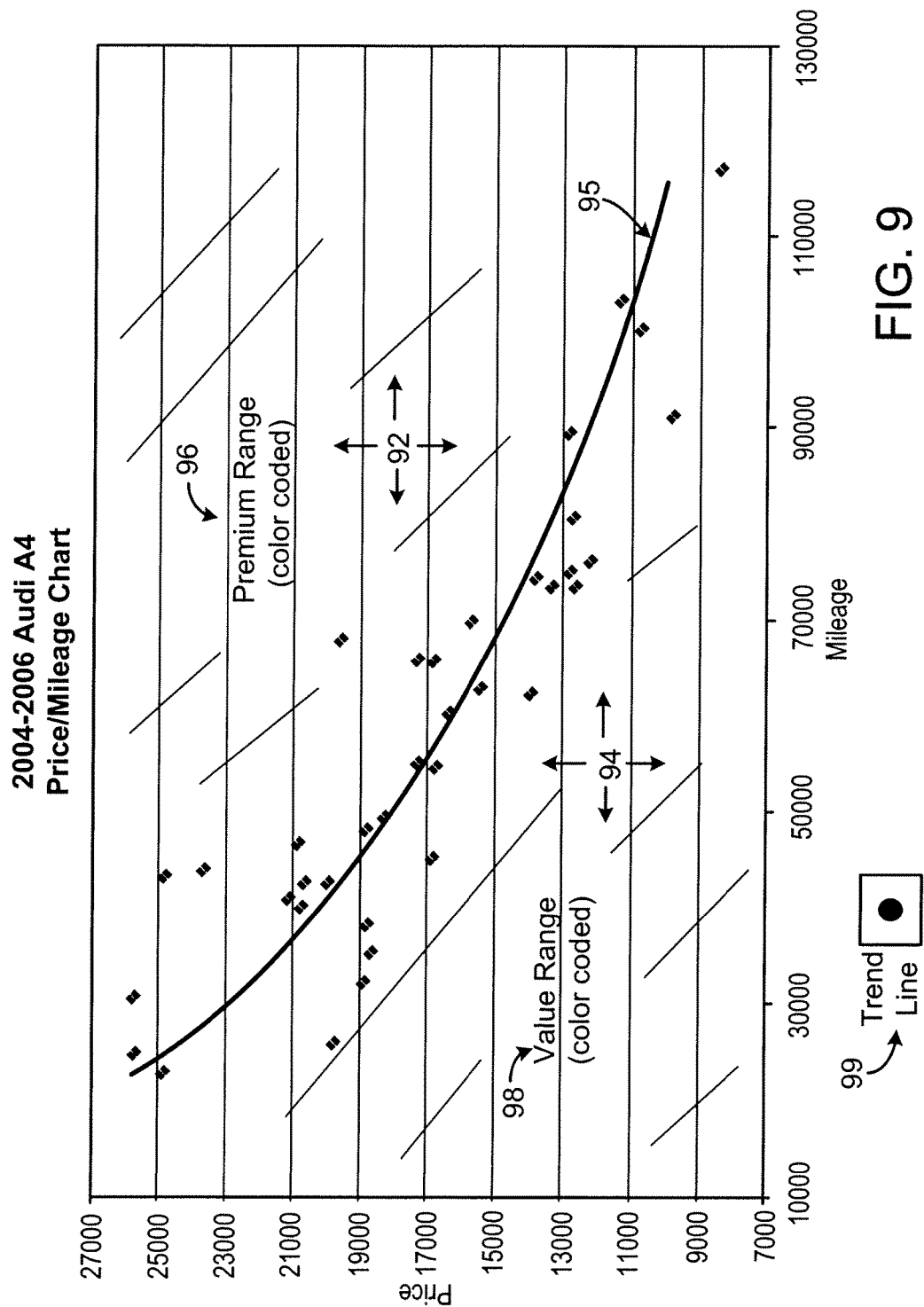

Referring to FIG. 9, for graphical displays of vehicles plotted using price and mileage as the X and Y variables or for any other variables that are quantitative in nature, e.g. horsepower, engine size, warranty period, a regression line or trend line 95 can be inserted onto the graph. In this example, the trend line is a line drawn down the center of the data points reflecting the average values of all the data points along a continuous line. However, the trend line can also be calculated in other ways using some operation or operations that are performed on the product or service data. Here, the trend line is arrived at by performing a mathematical analysis of the data, and determining the "best fit" from among all of the data points being included in the analysis. For visual purposes, the trend line is helpful in showing the user any particular relationship between two variables such as price and mileage of used vehicles. In FIG. 9, the user can see that there is a significant downward trend in a vehicle's price as the vehicle accumulates more mileage 95. Additionally, the user can see that as the mileage increases the rate of decrease in prices diminishes. In other words, in this example, the change in a vehicle's price given a change in mileage is attenuated for high-mileage vehicles compared to low-mileage vehicles. The trend line 95 is also helpful in that it forms a line of comparison for all of the data points on the graph. Those data points falling above the line can be considered being "above-trend" and those below the line can be considered "below trend". In the case of vehicle prices, they can denote vehicles that are "premium-priced" (or priced higher than average), versus those that are "value-priced" (or priced lower than average), assuming that they are comparable vehicles. To further enhance the user's interpretation of the graph, with a trend line in place, the graph can be split into two ranges, an area 92 above the line and an area 94 below the line. These respective areas could be color-coded to reflect their position relative to the line, and they can also have names associated with them, such as "premium range" 96 and "value range" 98. A trend line can be inserted onto a graph by clicking on the "Trend Line" button 99, with a standard mathematical regression analysis of the data being performed on the data.

While in FIG. 9 a single trend line is used to regress all of the data points within the data set a user can also insert multiple trend lines to view the listing price relationship between sub-sets of the data set. In the example in FIG. 10, the data set consists of three model years 2004, 2005, 2006 of Audi A4s. Should the user desire, trend lines 102 can be inserted for each of the three model years to see the pricing relationship between the three data sub-sets. These sub-sets are selected using the trend line drop-down menus 104. In the case of used vehicles, other search criteria could also be used to determine subsets, e.g. color or trim level, where the user could see the variation in prices between black cars and green cars, or 4-cylinder engines versus 6-cylinder engines.

Figure 11:
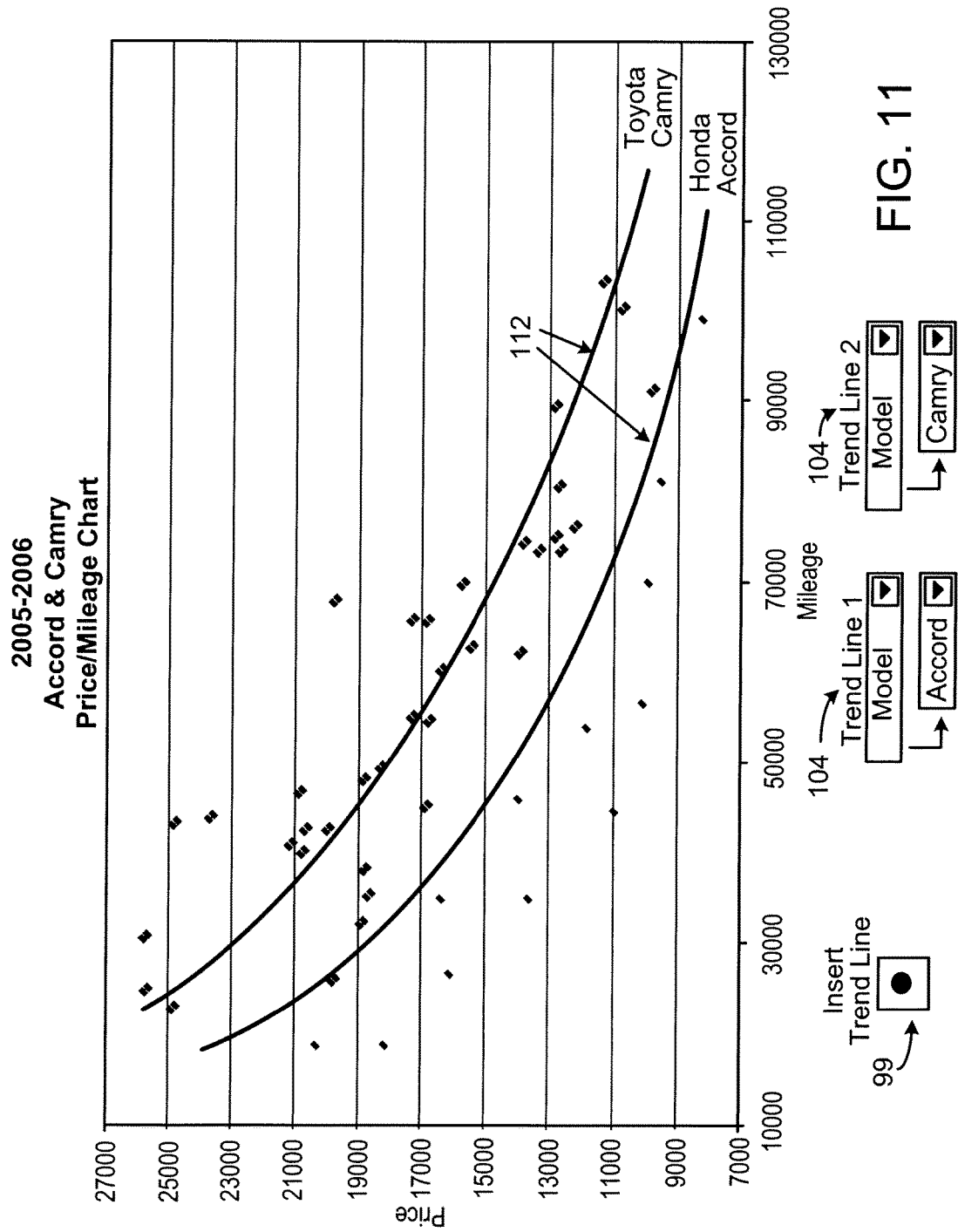
Figure 12:
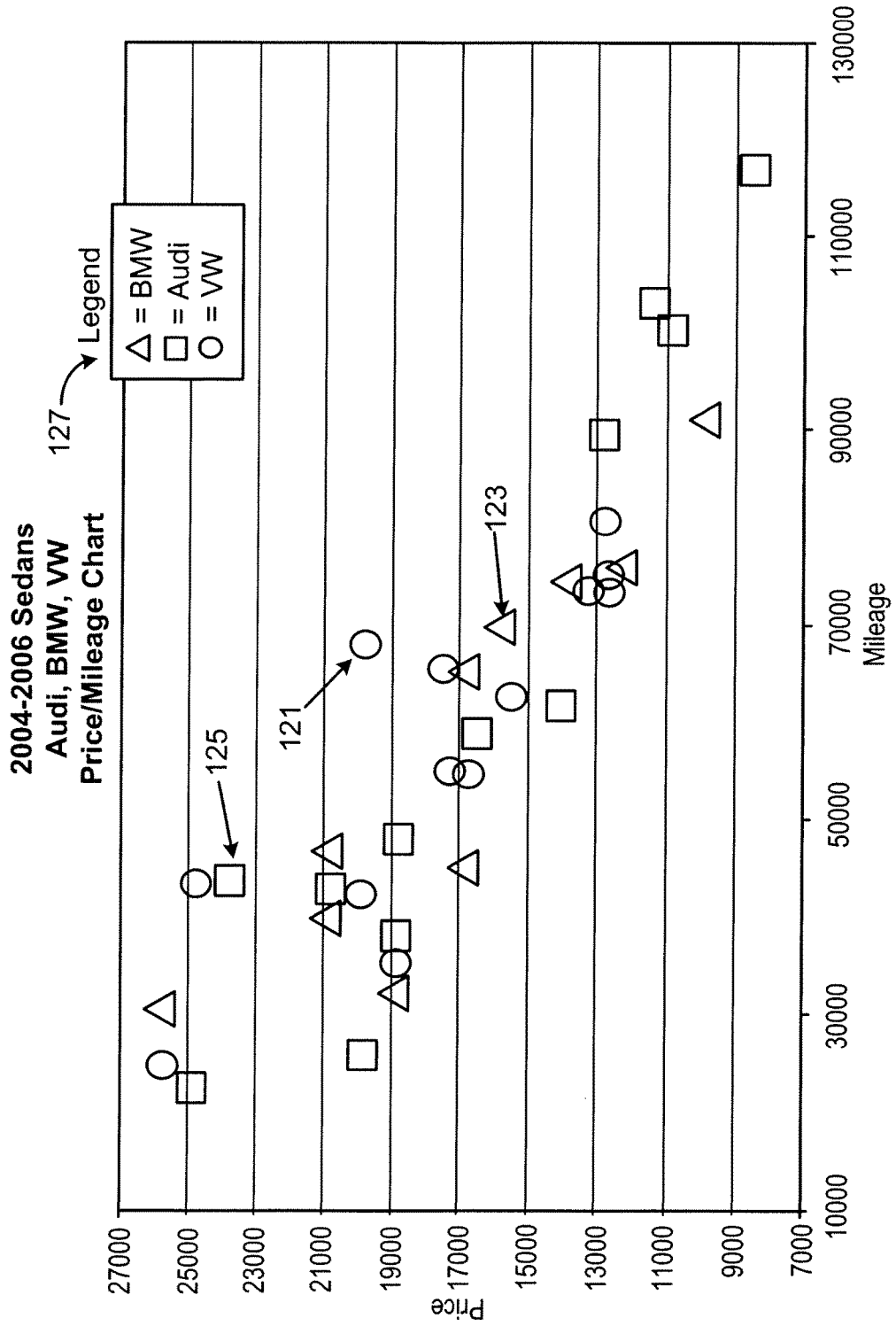
Figure 13:
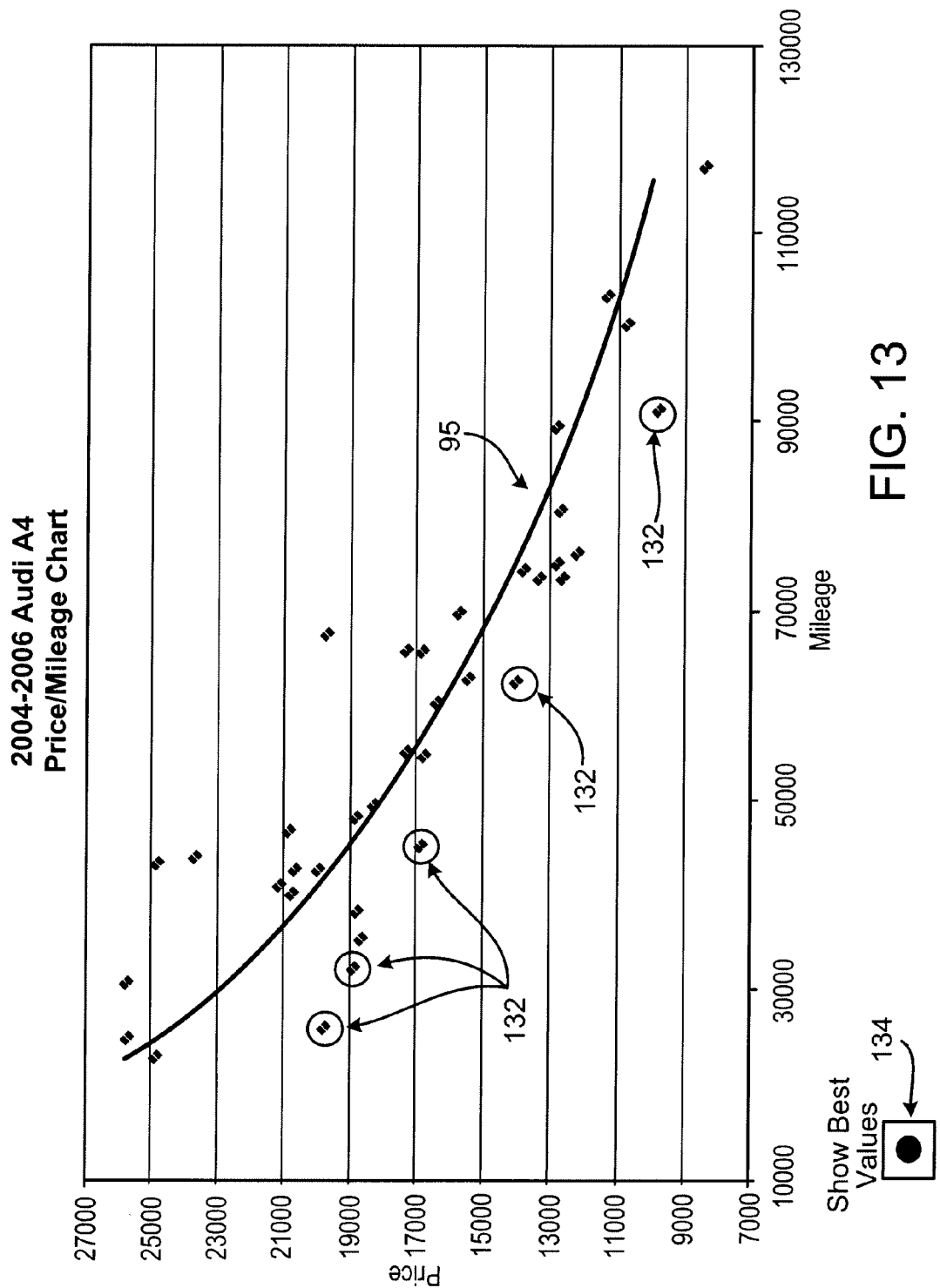

In instances where the data set is not one specific model (e.g. Audi A4), but instead one class of vehicles, e.g. pick-up trucks or convertibles, data sub-sets can be established where each sub-set is a different model. In the example of FIG. 11, the user could be looking for a 4-door sedan, and is considering both the Honda Accord and Toyota Camry. Once the user has selected his or her search criteria to determine the Accords and Camrys in which he or she interested, the user can then draw trend lines 112 represented by the pricing data of each respective model. With the trend lines 112 displayed, the user can see the pricing relationship between the two models and determine whether that relationship carries itself out as the mileage of the vehicles increases. This can be helpful to users, as they can see the pricing differential of the two vehicle models at both lower mileage as well as higher mileage and thus have an indication as to which model's value will fall faster with increasing mileage, for example, or which model is a better value at a particular mileage. As discussed previously, data sub-sets can be established for any of the variables, whether considering one vehicle model, one type of vehicle, sedans, wagons, SUVs, for example, or a broader class, such as all certified pre-owned vehicles. Data sub-sets can also be displayed using different characters or colors rather than a single character or color. For example, in FIG. 12, in a user's search for 2004-2006 model year Audi, BMW and VW sedans, data can be subdivided by the vehicles' make (or the model year or another characteristic) such that each subset has its own distinct character, e.g. triangle for BMW 123, square for Audi 125, and circle for VW 121, with all characters and respective data sub-sets shown in a legend 127. With each respective vehicle sub-set being represented by a different character or color, a user is able to more easily visualize the pricing relationship between the sub-sets. Additionally, when trend lines are inserted onto the graph for each of the data sub-sets, the user can see where a character- or color-coded data point falls relative to its respective trend line. This can be useful to the user when he is considering a broader group of vehicles in which to choose, e.g. sedans, minivans, or simply late-model hybrids. The data points can also be differentiated by appearance, not only for their own physical attributes, but also by other variables such as the party offering the vehicle, e.g. for sale by owner or dealer, or the vehicles' history, e.g. "one-owner" or "accident-free" or "certified pre-owned". Vendors such as auto dealers that wish to have their vehicles highlighted vis-à-vis other dealers' vehicles can arrange through the host website to have their vehicles displayed with a special attribute (for a price) that will draw attention to their vehicle. For example, "preferred" vehicle listings may be shown using a special color, a larger data point, or a unique symbol such as a star. Any search criteria used to filter the site's database can be used as a defining characteristic of determining a sub-set of the data set. These sub-sets can then be shown individually or simultaneously with other sub-sets with the graphic display differentiating the data points within each of the respective sub-sets.

In instances where a user has chosen to insert a trend line 95 onto their display the application can also identify the best values relative to that trend line, i.e. those points that are located the furthest below the trend line 132. When the user clicks on the "Show Best Values" button 134, the site will highlight a number of data points (e.g. five, as shown) that fall the furthest below the trend line. "Best Values" can be determined by absolute dollars, or by a percentage difference from the trend line, for example. The data points 132 show the five Audi A4s that are priced the lowest relative to what the trend line suggests is the average list price at that amount of mileage. While the graphical display should be relatively intuitive, highlighting other data points based upon other criteria can also be incorporated, e.g. "show lowest priced vehicles", or "show lowest mileage vehicles."

Figure 14:
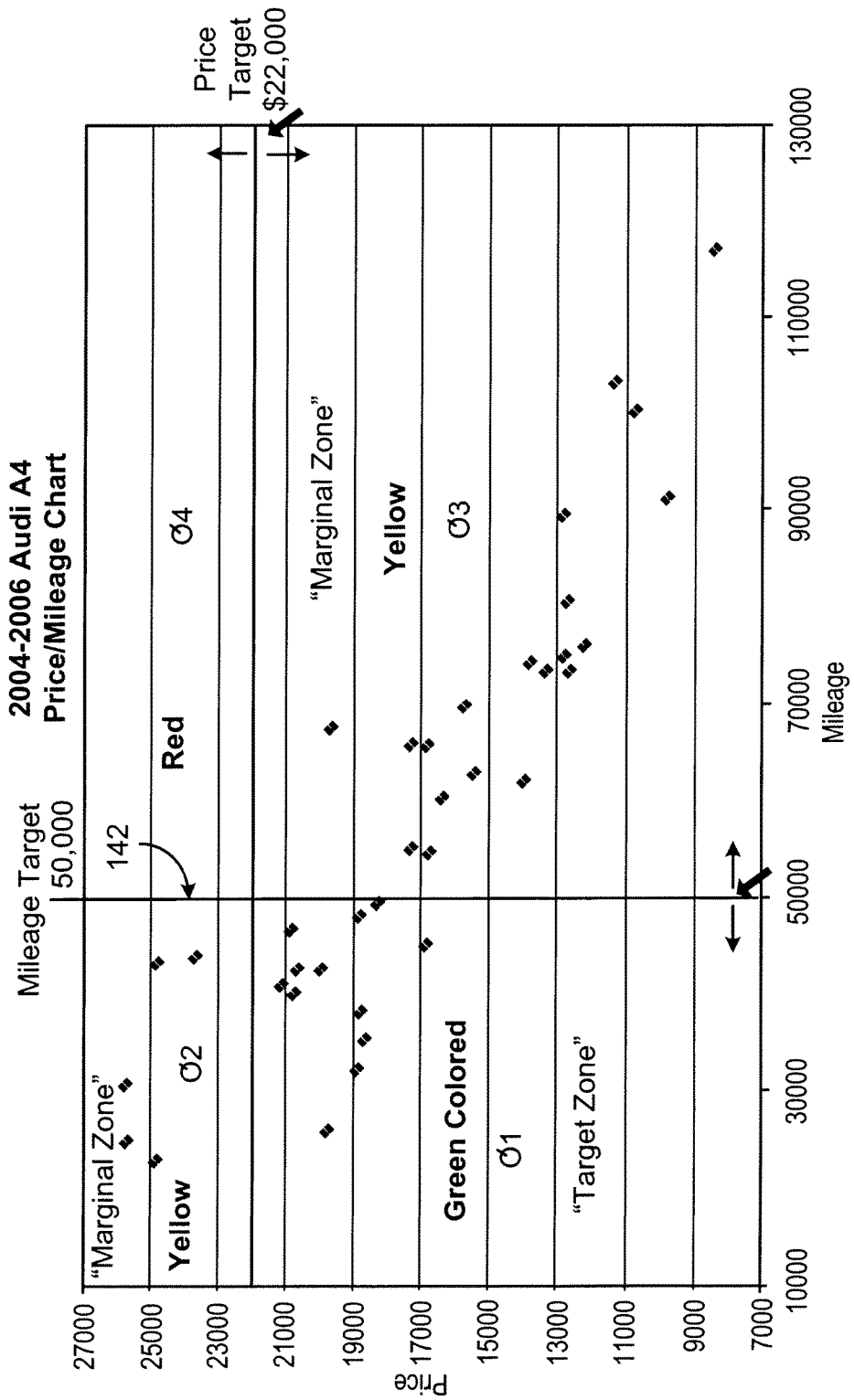

In some instances a user has a certain target of what he wants to spend on a vehicle. The user may also have a target on the maximum number of miles he would find acceptable on the vehicle, e.g. for warranty entitlement considerations. In these instances, the user can insert target lines 142 into the graph to show the user those vehicles that fall above or below these targets. In FIG. 14, for example, the user has clicked on the "Show Targets" button 144 which creates both a horizontal and vertical line 142. The user can then drag the target lines 142 left/right or up/down to position the target lines over the value parameters in which he is most focused. In this case, the user has set a price target at $22,000 and a mileage target at 50,000 miles. Unlike the limit lines that were established before (see FIG. 7), which had the ability to change the search criteria with the movement in the lines, these target lines are used for display purposes only, and help the user determine which data points fall within their limits versus those that fall outside the limits. This is useful in that with the establishment of defined search criteria the user receives a binary result; either the data point meets all of the search criteria or it does not. If it does not it is not included in the data set and the user will not be aware of data points that do not meet the search criteria. With the establishment of targets, all data points from the search criteria are displayed, and they are displayed relative to reference points on the display.

With targets 142, users can state the attributes that are most preferential such as vehicles less than $22,000. The data set still displays those vehicles priced greater than $22,000. There may be a vehicle that is priced slightly greater than $22,000 of which the user would like to be aware. With the targets 142 positioned, the graphic display is segmented into four quadrants. One quadrant represents an area that meets both target criteria Q1. Two quadrants represent the areas that meet only one of the target criteria Q2 and Q3. One quadrant represents the area that does not meet either of the target criteria Q4. In this example, the quadrants can be color-coded, for example, Q1 in green, Q2 and Q3 in yellow, and Q4 in red, representing the relative attractiveness of the data points in those quadrants given the target criteria set. As the target lines are moved up/down or left/right the quadrants will adjust accordingly with data points entering and exiting quadrants as the targets change. These quadrants, instead of being color-coded, could also have specific names, for example "target zone", "marginal zone" and "out-of-target zone".

Used vehicles have marketplace-specific characteristics in that there are a number of firms that aggregate used vehicle historical sales data to determine used vehicle market values. These "aggregators" provide pricing values which are commonly called the vehicles' "book value". These values are routinely used by participants in the used car market for determining a basis for a used vehicle's worth. With the exception of rare, exotic or highly customized vehicles, all used vehicles have an implied book value. Book value information is typically provided by one or more of the aggregators either onto their own websites, or to those sites that offer used vehicles for sale, and who compensate the aggregators for the use of their data.

Figure 15:
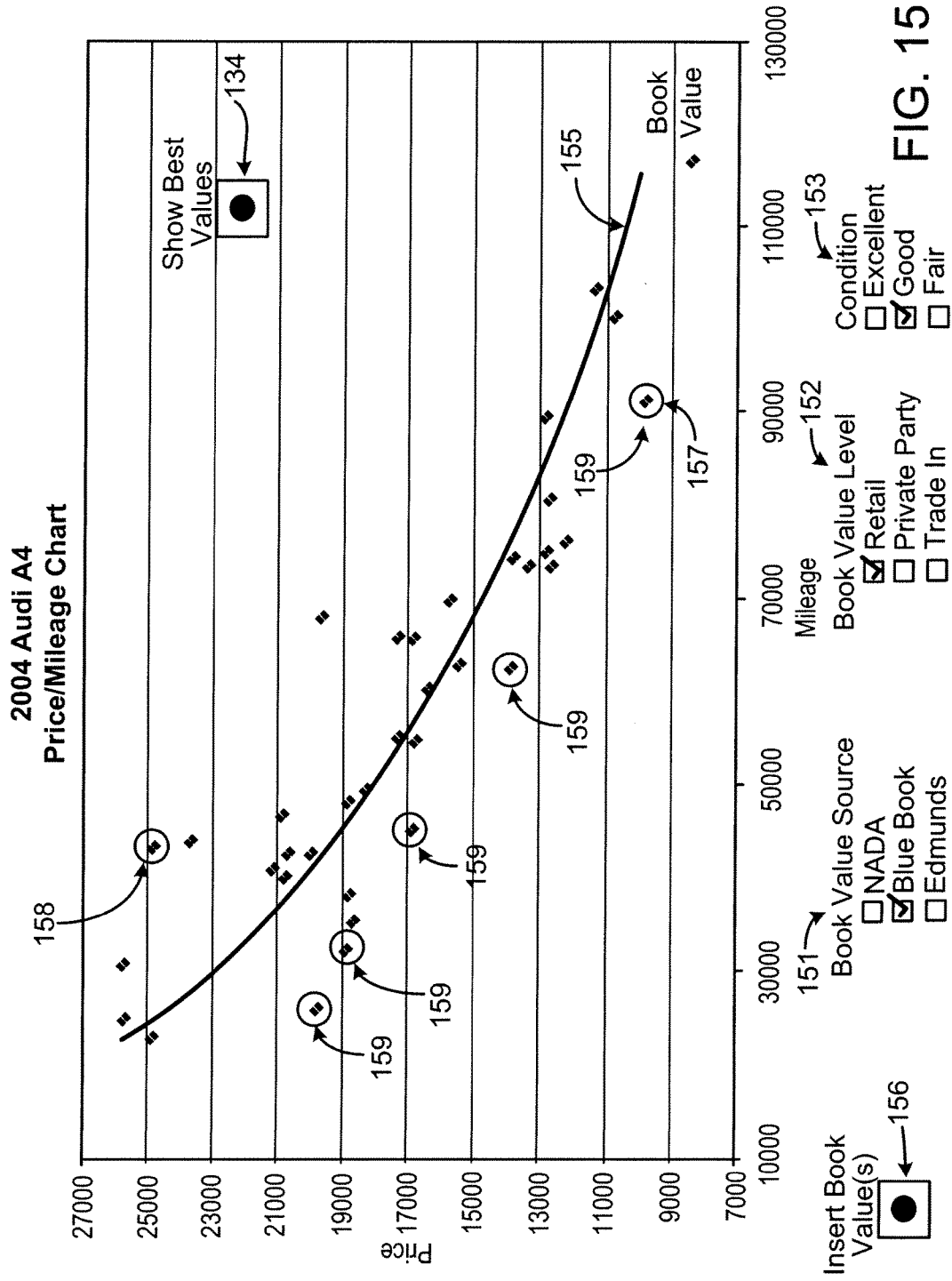

In the display of a particular vehicle, i.e. a specific make, model and model year, for example a 2004 Audi A4, a book value image can be incorporated into a graphical display. As shown in FIG. 15, the user has the ability to add a book value line 155 that represents that vehicle's expected worth over varying mileage. In doing so, the user would have the ability to select what data source aggregator is used to provide the values 151, what value level he is seeking, e.g. dealer retail, private party transaction, or wholesale trade-in 152, and the general condition of the vehicle, e.g. excellent, good, or fair 153. While the methodology for determining book value is unique to each aggregator data source it is common practice within the industry to differentiate between the value level and condition of the vehicle to determine its specific book value. In FIG. 15, the user has selected "Blue Book", "Retail" and "Good" as the vehicle's principal book value determinants By clicking on the "Insert Book Value" button 156, the book value line 155 is generated showing the value of the chosen vehicle with the chosen valuation criteria along a continuum of mileage, because a vehicle's mileage is also a large determinant of its book value.

When a book value line 155 is inserted into a graphical display such as that shown in FIG. 15, a user can see the relationship of the data points on the display relative to vehicles' book values. In contrast to the previously discussed trend lines, which reflect a regression of the listing price data for vehicles currently offered for sale, book value data represents an aggregation of recent historical sales data for that vehicle. It is a comparison of vehicles' actual historical sales prices versus their listing prices.

Figure 10:
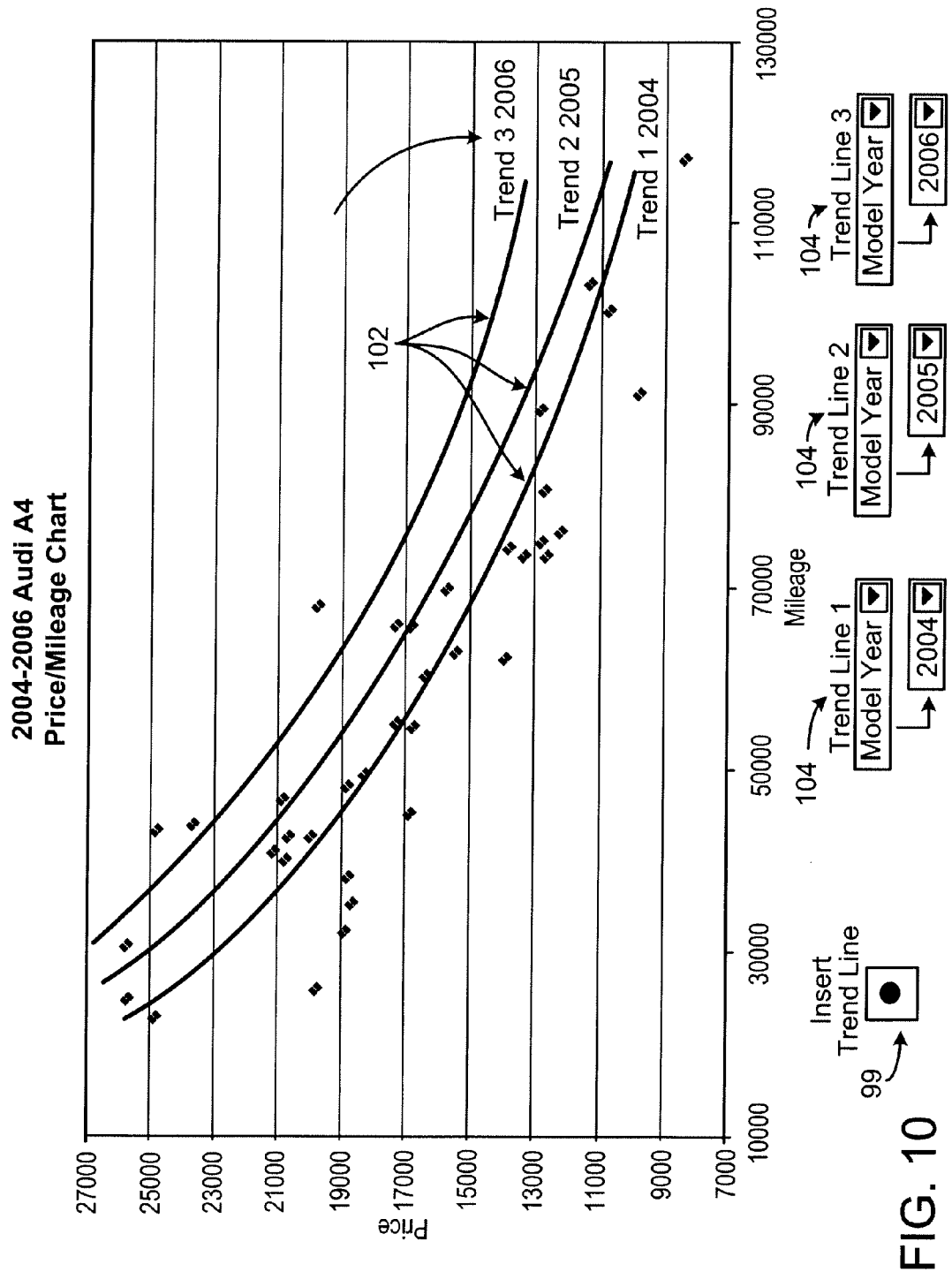

The utility of a book value line is very similar to that of a trend line and can be used for all of the purposes discussed in the sections relating to trend lines (e.g. FIGS. 9-11). However, users can compare a vehicle's listing price to that of what is considered a fair market value for that vehicle, given the valuation parameters 151, 152, 153 as shown on FIG. 15. As an illustration, data point 157 has a listing price that is $3,000 below the stated book value for a 2004 Audi A4 with 91,000 miles. Data point 158 has a listing price that is $5,500 above the stated book value for an A4 with 42,000 miles. Given these relationships, the user can reasonably conclude that data point 157 is offered at a more attractive value than data point 158 and perhaps is worthy of closer examination. Like the "Show Best Values" button 134 utilized with trend lines, this button can also be used to indicate those data points that fall the furthest from the book value line 155; this is illustrated by 159. In this example, the user has the ability to change any of the book value parameters 151, 152, 153, should he wish to see other book values that he feels are also relevant. While listing price does not necessarily suggest what the final sales price will be for a particular vehicle, it does provide a good indication of what the final sales price will be relative to other like vehicles also offered for sale.

Figure 16:
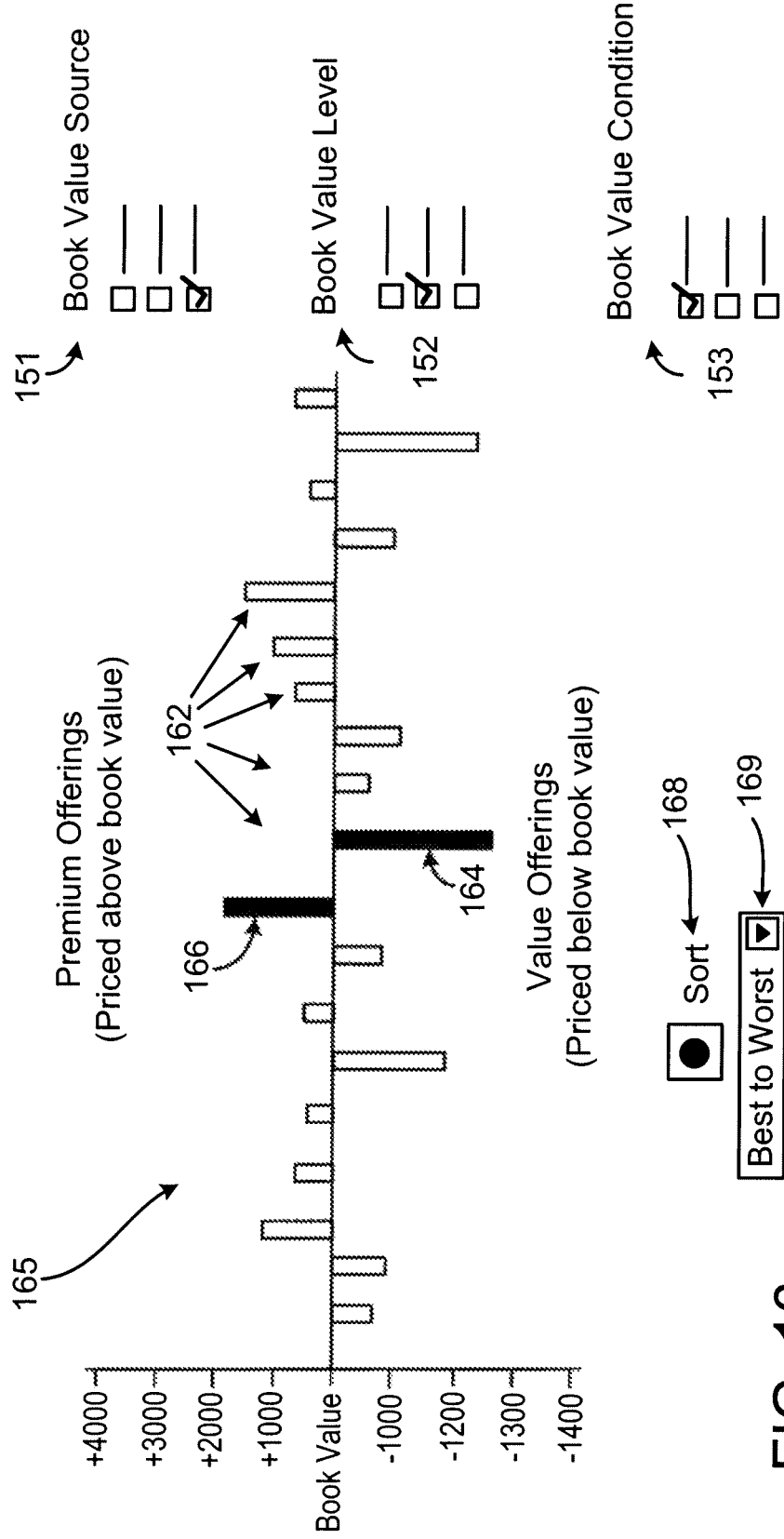

Every vehicle has its own book value, taking into consideration not only the vehicle's basic criteria, such as make, model and model year, but also such attributes as the vehicle's geographic location, optional equipment and color. Given such, each vehicle listed on a site can be compared to its own unique book value in view of the specific attributes of that particular vehicle. As shown in FIG. 16, vehicles within the data set can be presented in not a scatter graph format, but in a bar chart or histogram 165. In a histogram display 165, vehicles' book values are normalized so that each vehicle's offering price is shown relative to its own book value. In this display, each bar on the histogram 162 represents an individual vehicle, and its height represents the dollar difference (or percentage difference, for example, or another type of difference) between its listing price and its book value. For example, bar 164 represents an Audi A4 whose listing price is $2,400 below its book value, and bar 166 represents an A4 whose listing price is $1,900 above its book value. In a manner helpful for users focused on finding vehicles whose listing price is below book value, this display shows the relationship between listing price and book value for the entire data set. This display is also very helpful in allowing the user to compare side-by-side the relative value of two vehicles of a similar make and model, but perhaps having other differences, such as optional equipment or differing physical and/or mechanical conditions. By viewing each vehicle normalized against its respective book value, users can efficiently determine value, not against arbitrary listing prices, but against actual historical sales data.

Figure 17:
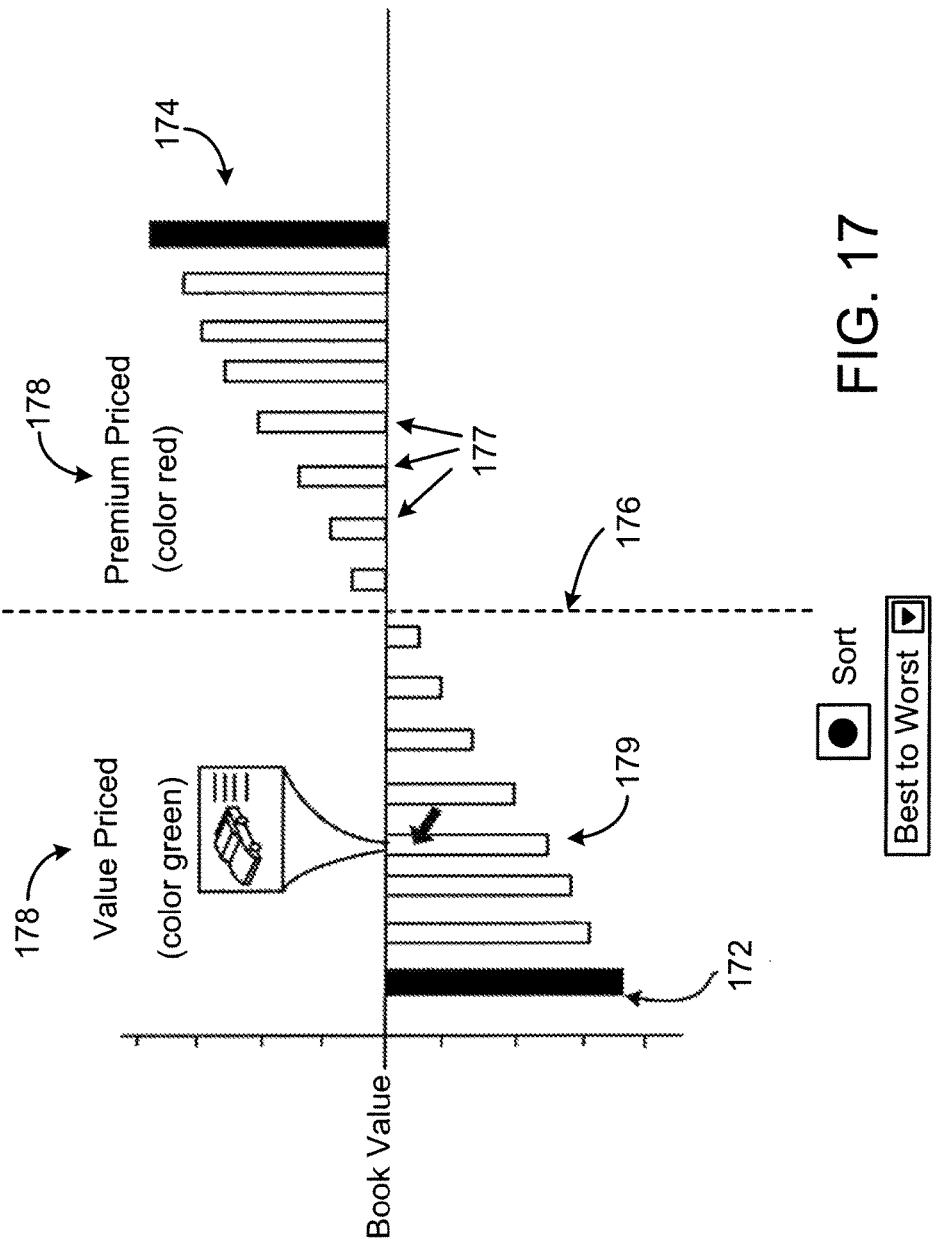

As added functionality for this display, the user has the ability to sort the vehicles by different variables, such as "best value", "listing price", "mileage", etc. by clicking on the "Sort" button 168 and selecting the sort criteria from a drop-down menu 169. An example of the data set sorted by "best value" is shown in FIG. 17, where the vehicle with a listing price most below its book value 172 is shown on the far left, and the vehicle with the listing price most above its book value 174 is shown on the far right. In this view, a line of demarcation 176 can separate those vehicles that are priced below book value from those priced above. Additionally, these respective regions 178 of the display can have names associated with them, or be color-coded to draw attention to the difference between those vehicles to the left and right of the line.

While book value is one criterion against which vehicles can be judged, they can also be compared to their original MSRP or invoice price, if known. In this capacity, vehicles' listing prices can be compared to their original sticker price or dealer cost. For this functionality, the user would enter a vehicle's VIN (vehicle identification number) to determine the specific vehicle to be viewed.

Figure 18:
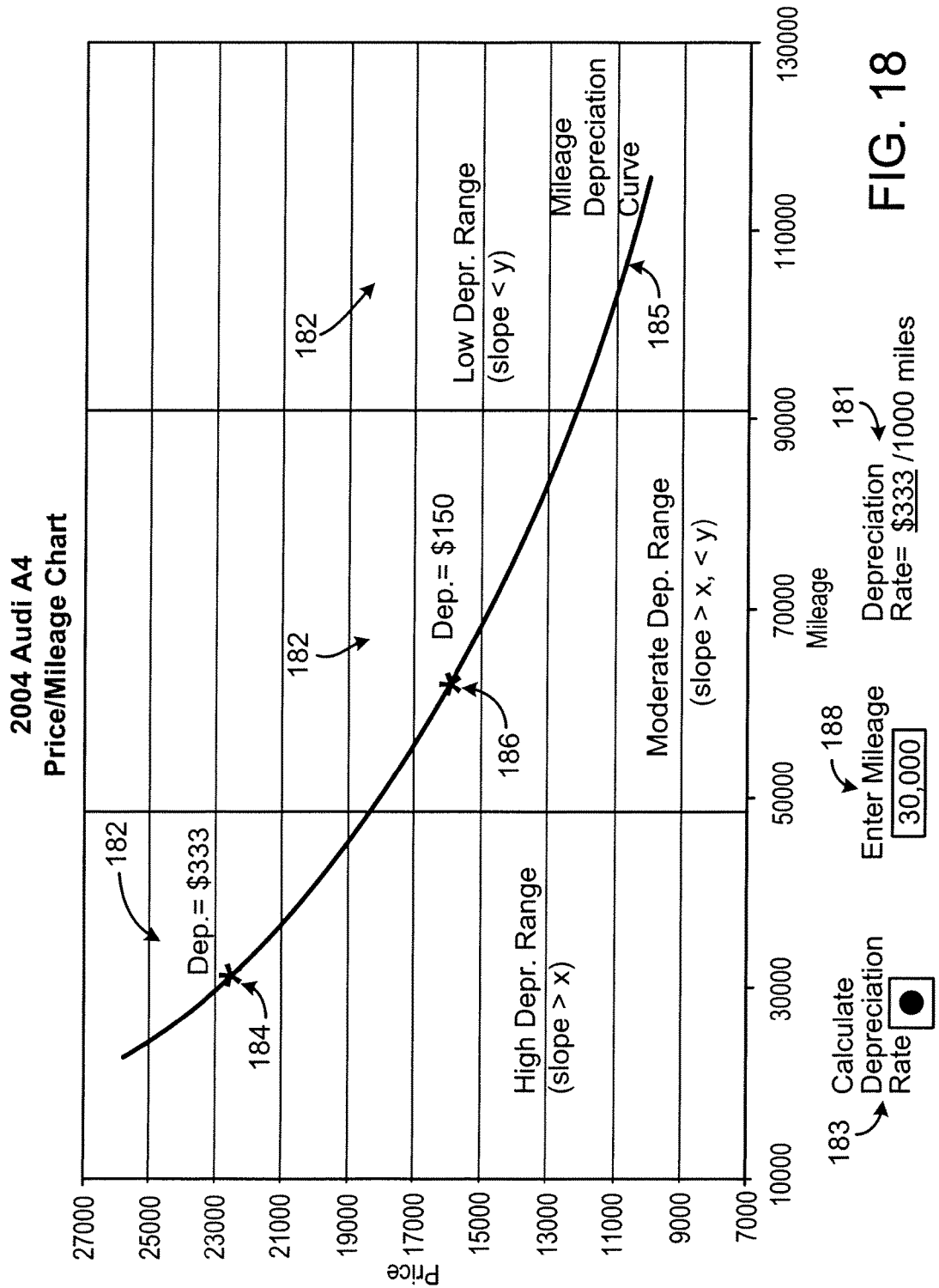

Similar to when vehicles are displayed on a scatter graph, the same viewing capabilities are available with vehicles displayed in a histogram. For example, moving the cursor over an individual bar representing a single vehicle 179 will show a brief overview of the vehicle, including a photo and basic vehicle information. Clicking on the bar will bring up the full listing of the vehicle. Control/clicking a number of bars 177 will highlight those bars, which can then bring up full listings of all those selected. Right-clicking on the bar and then selecting "remove" from a drop-down menu can remove the data point from the display. Two primary drivers of the depreciation of a vehicle are age and mileage. As vehicles age and/or incur more mileage, their value generally declines. The book value curve or depreciation curve 185 depicted in FIG. 18 represents the rate at which 2004 Audi A4s on average lose value as their mileage increases. As one can see from FIG. 18, the rate at which a vehicle loses value diminishes as the vehicle incurs additional mileage; this is generally consistent with all vehicle makes and models, as lower-mileage vehicles lose value at a faster rate per mile than higher-mileage vehicles. It is useful for users shopping for a particular vehicle to understand the rate at which their vehicle will depreciate as additional mileage is placed upon the vehicle; the depreciation curve 185 allows users to see this relationship. To assist users visualize these conditions, the depreciation curve can be segmented into three ranges 182, where vehicles fall into one of the three depreciation rate ranges. The depreciation rate is calculated based upon the loss of value for the vehicle for each mile driven, and can be expressed in absolute dollars $ or percent % of vehicle cost. In FIG. 18, the user enters the specified mileage 188 to be used for determining the depreciation rate. In this case an Audi A4 with 30,000 miles falls at point 184 on the depreciation curve. At that point, A4s lose on average $333 for every 1,000 miles driven, calculated by observing the book value at −1,000 miles, and +1,000 miles, or stated differently, the slope of the depreciation curve at that point 181. Using another example, an average A4 with 60,000 miles will fall at point 186 on the depreciation curve. At this point, A4s lose on average $150 for every 1,000 miles driven. Users can now conclude that on average, purchasing an A4 with 30,000 miles will depreciate initially at over twice the rate ($333/$150=2.22 times) that of an A4 with 60,000 miles. The user is able to gather this information by entering the mileage of the vehicle in question on the display 188, and then clicking on the "Calculate Depreciation Rate" button 183. The result will show an average value lost per 1,000 miles. The user can use this information to weigh the benefits of a lower-mileage car against its current mileage depreciation rate to make a better-informed purchase decision.

Figure 19:
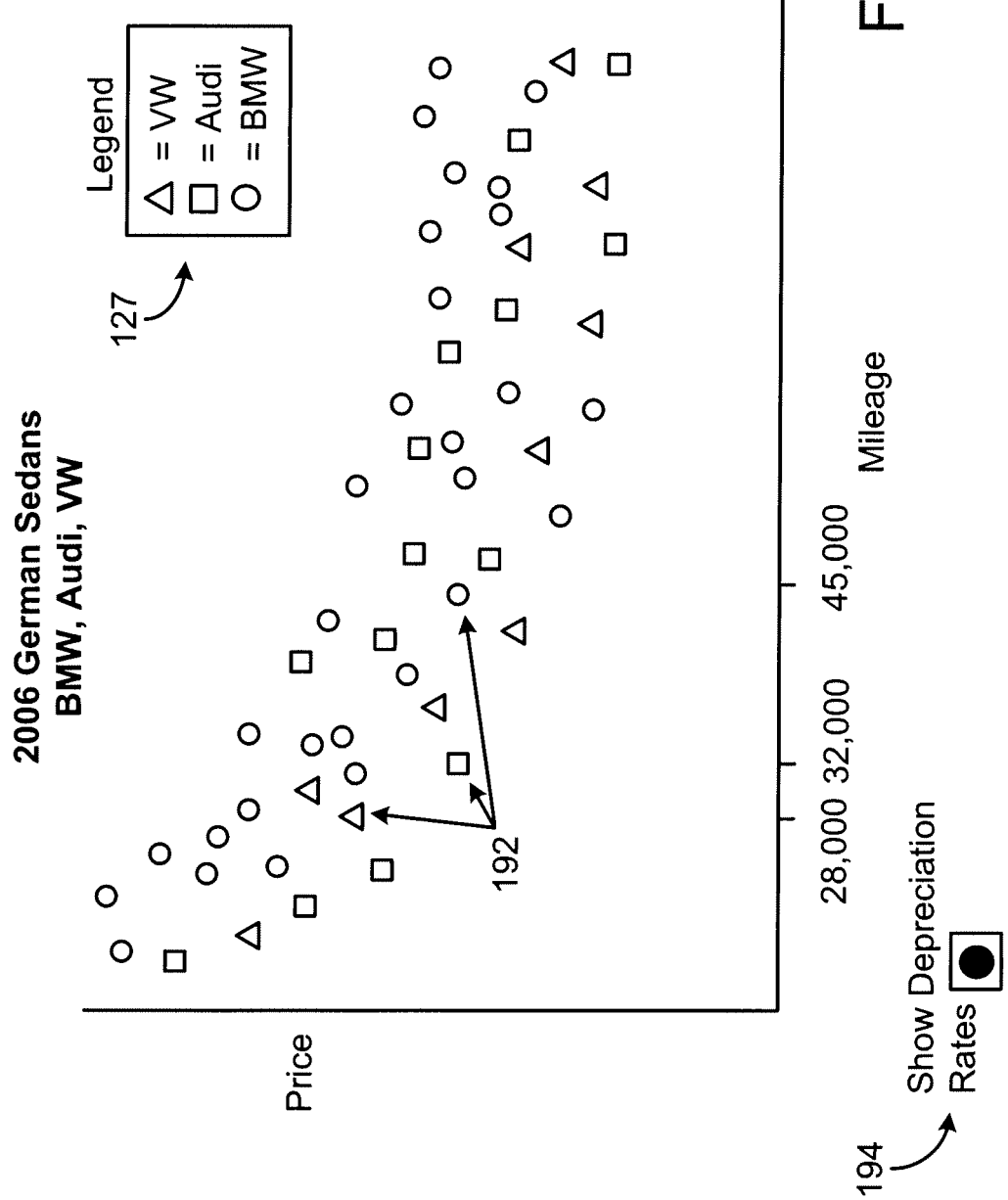

Measuring the depreciation rates between similar models, e.g. 2004 Audi A4s of FIG. 18 is helpful, but it can also be useful to compare depreciation rates between different model years, e.g. 2004 vs. 2007, or perhaps even different models, e.g. Audi A4 vs. BMW 325 vs. VW Passat. As shown in FIG. 19, the user can identify three vehicles of interest 192, one BMW, one Audi and one VW. The user can also see the rate of depreciation for each of the three vehicles by clicking on the "Show Depreciation Rates" button 194. The user is brought to a "Depreciation Rate Comparison" as displayed in FIG. 20 that shows the mileage depreciation curves 205 of the three vehicles selected by the user. In viewing the graphic, the user can see that the VW with 28,000 miles has the highest depreciation rate at $240 per 1,000 miles, and the Audi and BMW have $215 and $175 depreciation rates respectively 202.

Figure 20:
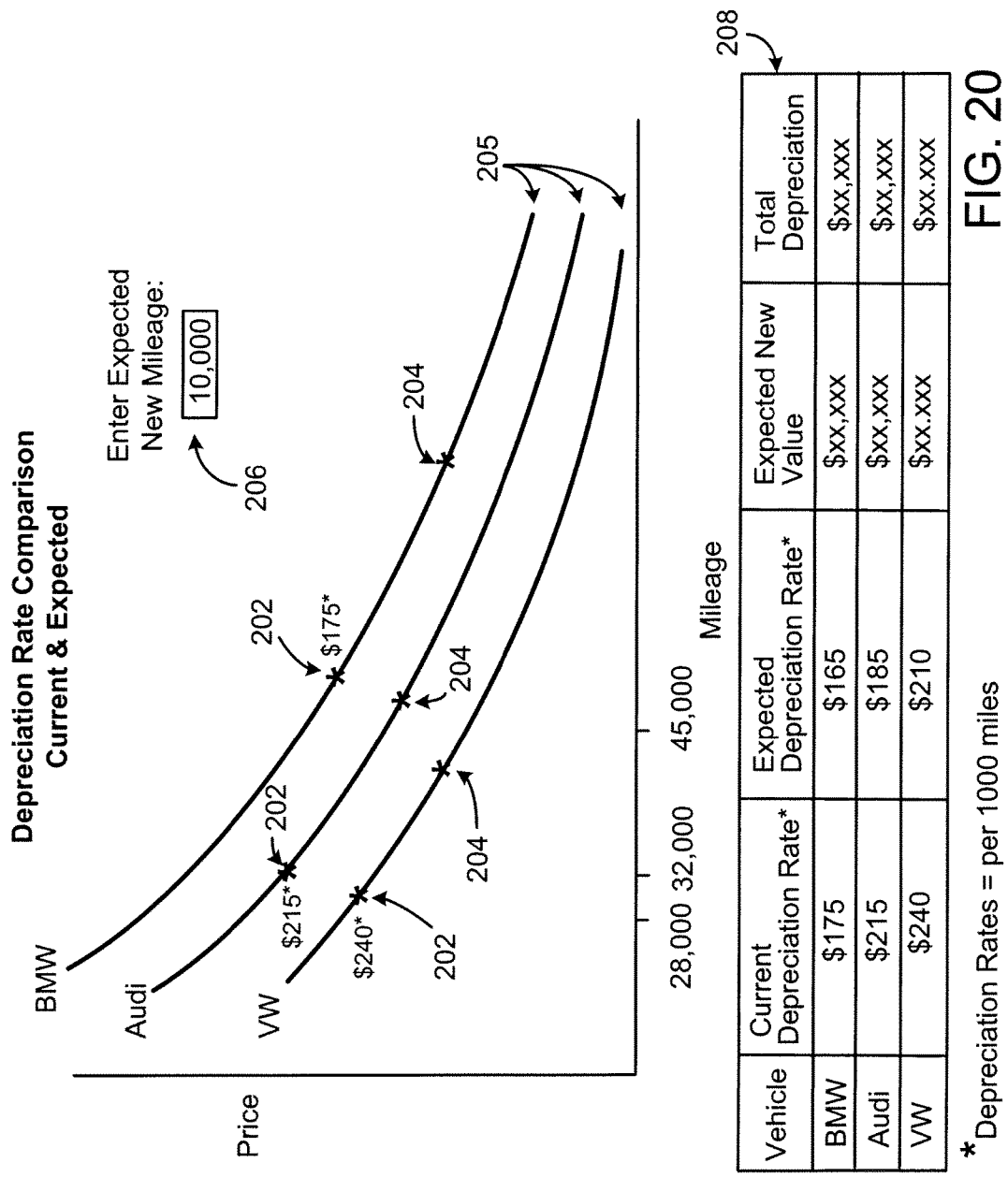

In FIG. 20, the user has the ability to do a "what if" analysis by entering the number of miles that he expects to drive in the coming year or other timeframe. Using the "Expected New Mileage" input box 206, the user can enter 10,000 miles, for example. With this figure entered, each vehicle has 10,000 miles added to its existing mileage and the vehicle data travels along the mileage depreciation curve to points 204. Using the depreciation curve data, expected depreciation rates, expected new value and total depreciation can be calculated and displayed 208. With this data, users can forecast how additional mileage can be expected to affect their selections and provide some guidance into the cost of ownership in the coming year or other timeframe.

Figure 21:
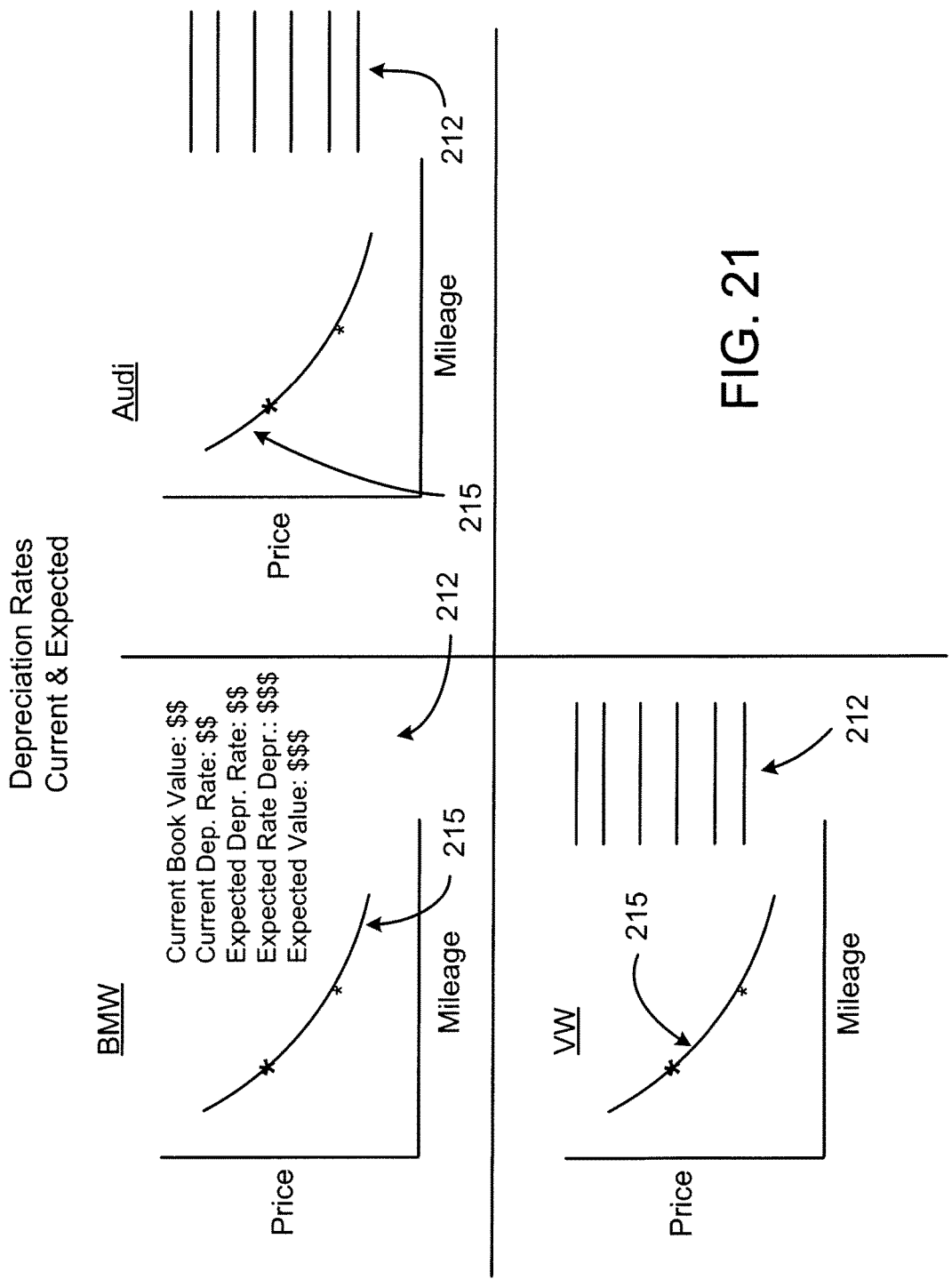

As an alternative display to FIG. 20, the display screen can be split into sections as shown on FIG. 21, depending upon # of vehicles to be viewed, and in this case into 4 quadrants. In this example, each section of the display shows the depreciation curve of each vehicle being considered 215, and provides depreciation analysis with each vehicle 212.

FIG. 22 shows the source data, "year, model, mileage, price" for the Audi A4 examples included for the application.

Another use of the comparison display is in travel. For example, a user may wish to take a trip on a commercial plane, train, boat or other mode of transportation, where there is a schedule of departure and arrival times. Sometimes the user will consult an aggregator, which is a web site that offers trips from multiple vendors. The aggregator may allow the use of search criteria in the form of specific qualitative and quantitative attributes of the trip (or another product/service type) that can be used to differentiate one trip from the next. In this example, we refer to "build your trip" criteria which is synonymous with search criteria.

When accessing an online site for the purposes of researching or buying a trip, the user typically has the ability from the universe of trips that are available on that website to narrow the scope of their search to identify the trip that is most consistent with their needs. The narrowing of this scope can be done through the input of search criteria. The search process can be done in a single phase, where all criteria are selected on a single display, or in a multi-phase process, where consecutive narrowing of scope is carried out over multiple displays. Data is accessed from the site's database, and data queries are made based upon users' input.

The data set that is produced is a function of those trips that meet the search criteria specified by the user.

Figure 23:
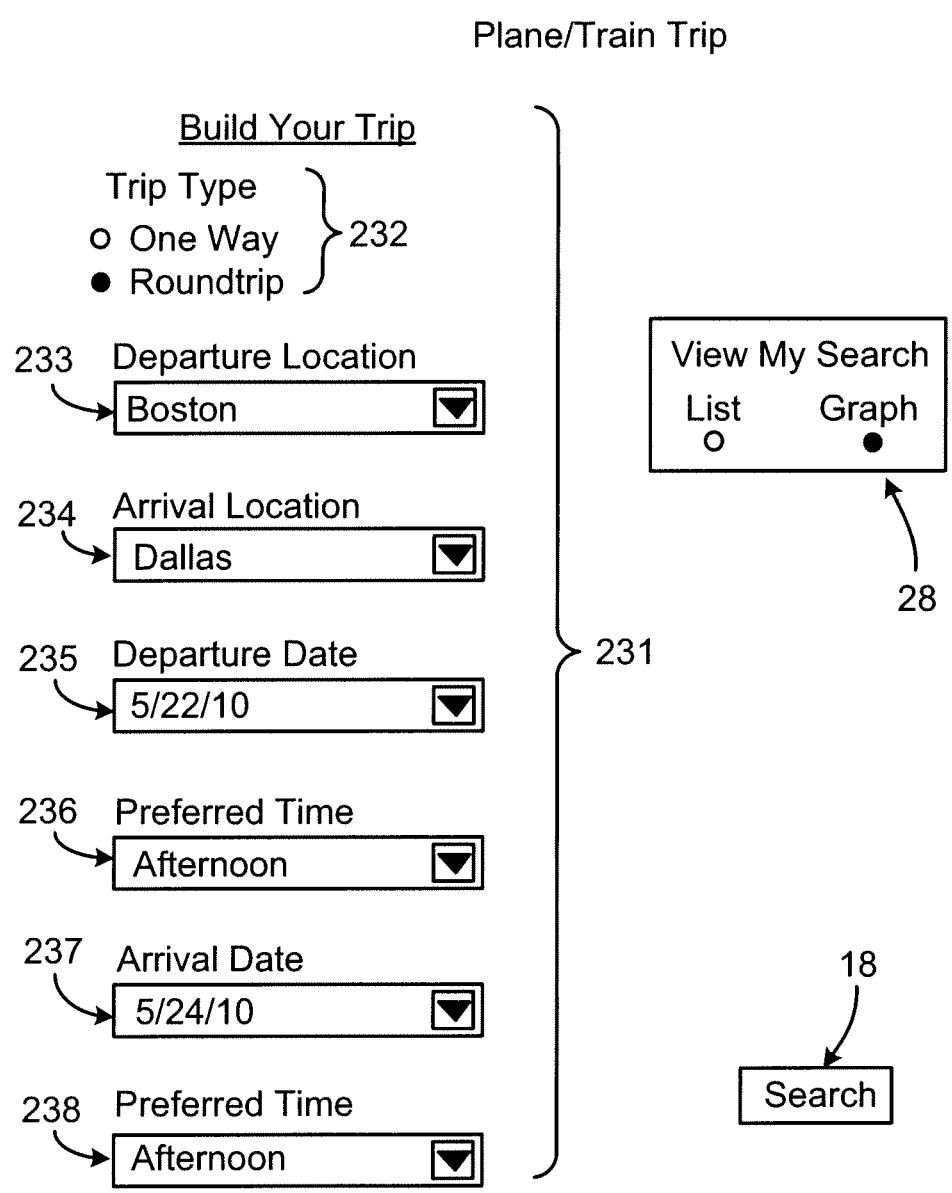
FIGS. 23-30 are screen shots of portions of portions of a travel web site.

In the case of FIG. 23, we use the example of a web site that offers trips, e.g. plane, train and boat trips, and where the user has the ability to populate basic search criteria for a trip in which he is researching or are looking to purchase. In this case, from the "build your trip" criteria 231, the user can choose between "One Way" and "Roundtrip" 232, and he has chosen Boston at the departure location 233 and Dallas as the arrival location 234. The user also enters additional trip preferences such as preferred travel dates and times 235-238. For this application, the user also has the ability to click within the "View My Search" box 28 to choose either a list or graphical display of their search results. With these criteria chosen the user then clicks on "Search" button 18.

Figure 24:
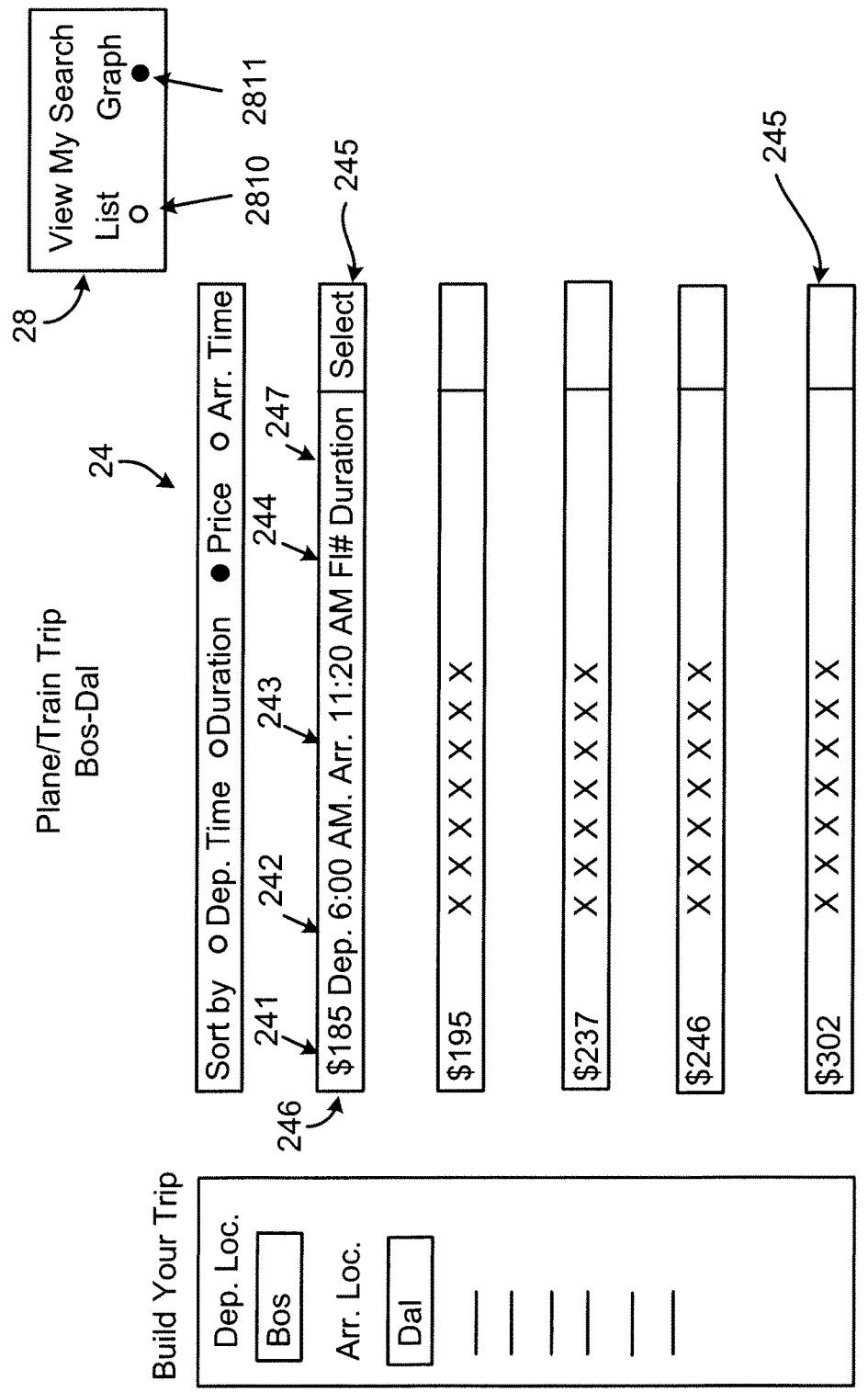

FIG. 24 shows an example of the user selecting "list" 2810 within the "View My Search" box 28. In this display, the trips that match the "build your trip" criteria 231 are displayed in a list format 245. In each entry 246 of the listing, trip details such as price 241, departure 242 and arrival location 243 and time, flight/train #244 and trip duration 247 are displayed. The user also has the ability to sort the listings by clicking on various trip parameters, such as price, arrival or departure time, trip duration or preferred departure time, within the sort menu bar 242. Also in this view the user has the ability to alter his search criteria by changing existing criteria or adding new criteria that will refine or further narrow their search within the "build your trip" criteria 231. For this application, the user can again select the "graph" view 2811 within the "View My Search" box 28 which will display the trip information in a graphical format.

Figure 25:
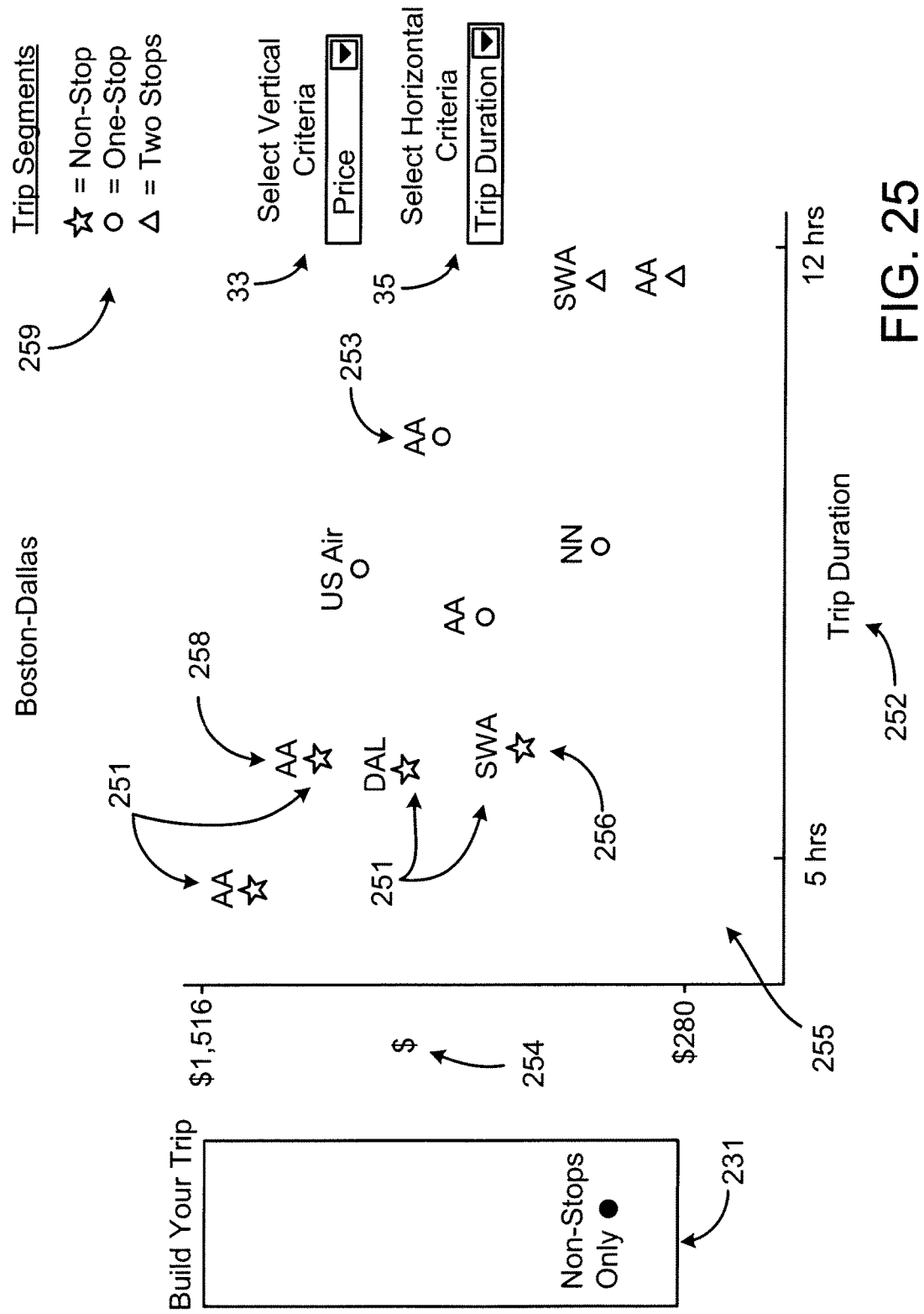

FIG. 25 shows a result of the user selecting the graph view 2811. In this view, instead of seeing trips listed sequentially in text, each trip that meets the "build your trip" criteria is displayed as a data point on an X/Y graph 255. For this example, the default display shows trips plotted using both their trip duration 252 and their price 254 as the X and Y coordinates, respectively.

In this instance, the user sees the relationship between the price and trip duration of each trip versus one another. Price and trip duration have been used as default variables in this example as duration and price are often determinants in users' trip-purchasing process. With this graphical view users can readily see the relationship among all of the trips that meet their search criteria relative to one another by the variables that are most important to them. In this example, the trips that resulted from applying the "build your trip" criteria are priced between $300 and $1,300, and their duration varies from a low of five hours to a high of twelve hours. For example, trip 256 has a price of $450 and a duration of 5 hours, 20 minutes. Trip 258 has a price of $925 and a duration of 5 hours, 10 minutes. The user might find this interesting and might be more interested in trip 256 versus trip 258, as it is offered at a significantly lower price, despite very similar trip durations.

If the user wishes to refine or narrow his search criteria, he can do so from the "build your trip" options listed within criteria display 231. As these search criteria are modified while in the graph view 2811, data points will appear and disappear dynamically as the displayed data set reflects the new search parameters. For example, by clicking on the "Non-Stops Only" button 253 within the "build your trip" box 231, all trips which have one or more stops would be eliminated from the data set, with only those trips that are non-stops continuing to be displayed 251 in graph 255. Additionally, to the extent that the user feels that there are too few or too many data points to review, he can modify their search to expand or reduce the number of instances, or data points, on the graph for a better visualization of relative value or attractiveness. For practical purposes, users interested in trips within specific price or duration ranges can easily view the alternatives that exist within those ranges, and conveniently view how those specific trips compare to trips that fall outside of their desired ranges.

To also enhance the user's viewing experience, data sub-sets can also be displayed using different characters, colors or images instead of all data points within the data set being represented as a single character, e.g. a dot. Any search criteria used to filter the site's database or any variable of which the data set can be divided such as number of stops or vendor can ultimately be used as a defining characteristic for determining a sub-set within the data set. These sub-sets can then be shown individually or with other sub-sets within the graphic display, each sub-set having a differing appearance. In this example, non-stop flights are denoted as stars, one-stop flights as circles, and two-stop flights as triangles; these relationships are shown in a legend 259. A further enhancement is that the airline carrier's logo 253 can appear next to each trip in instances where more than one carrier's flights are being offered in the display. Displaying the data set as more than one data sub-sets allows users to not only see trips compared to one another by two variables at the same time but also allows users to see how the data sub-sets relate to one another by those same variables.

Within the example shown in FIG. 25, users have the ability to choose which search criteria are used as variables along the axes of the X/Y graph. Using drop-downs 33 and 35, users can select from any of the search criteria to determine the vertical criteria 254 and the horizontal criteria 252 for the X and Y axes respectively.

Figure 26:
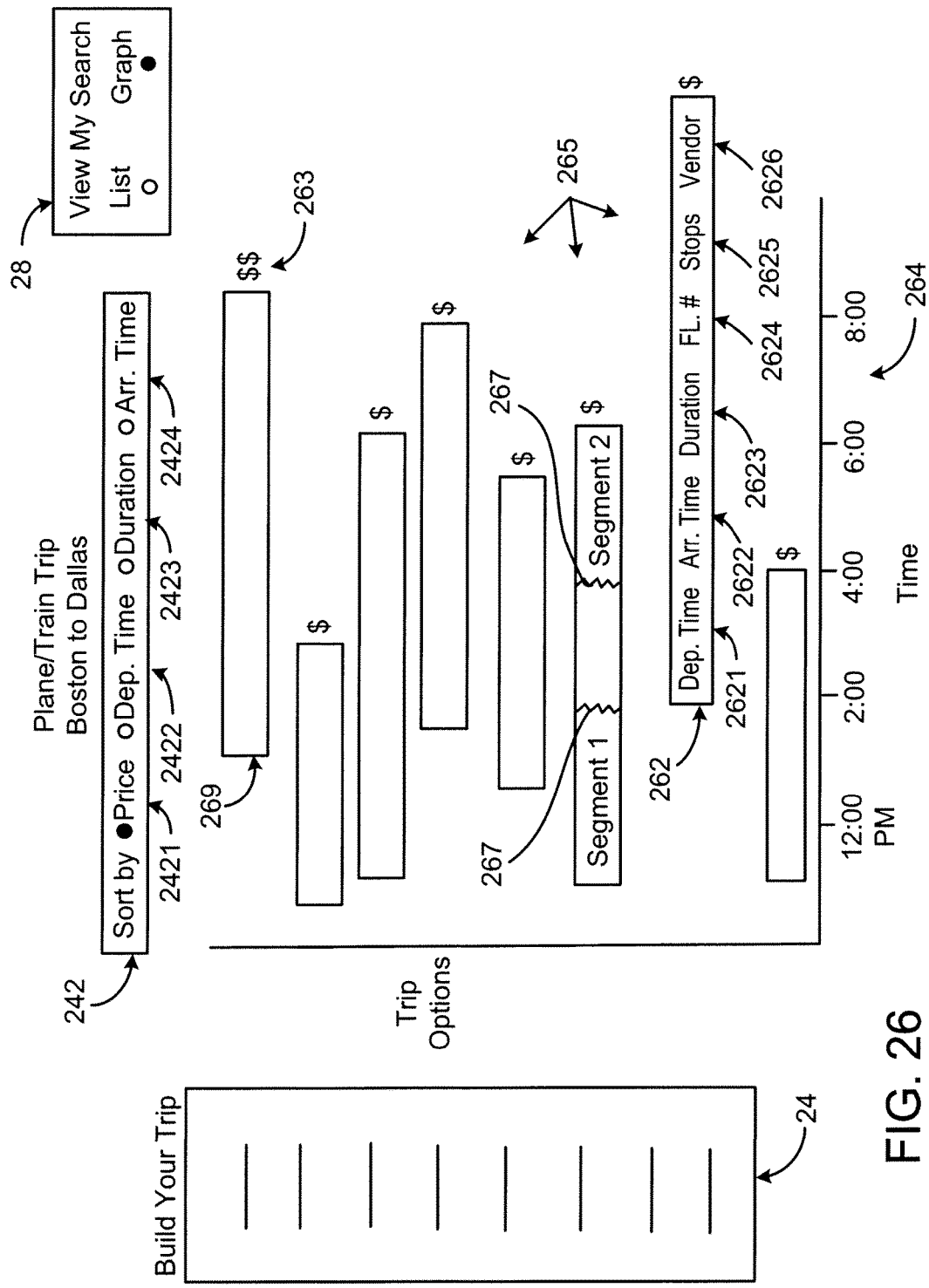

As an alternative view to FIG. 25, users could see their trip options displayed as either a horizontal or vertical bar chart 265. For example, FIG. 26 shows the horizontal bar alternative. In this display, each bar 262 represents one trip alternative as offered by either a single or multiple vendors. In the display, time is measured along the X axis 264, with the length of each bar 262 determined by the duration of the trip, the left side of the bar determined by the departure time, and the right side of the bar determined by the arrival time. Within each bar 262, the trip details are shown, e.g. departure time 2621, arrival time 2622, trip duration 2623, flight/train #2624, # of stops 2625, and vendor 2626. For trips with multiple segments, verticals lines 267 denote the ending of one trip segment, e.g. each flight, and the beginning of the next segment. Alternatively, there can also be a different color or pattern on the bar denoting the space where there is a layover between segments.

Figure 27:
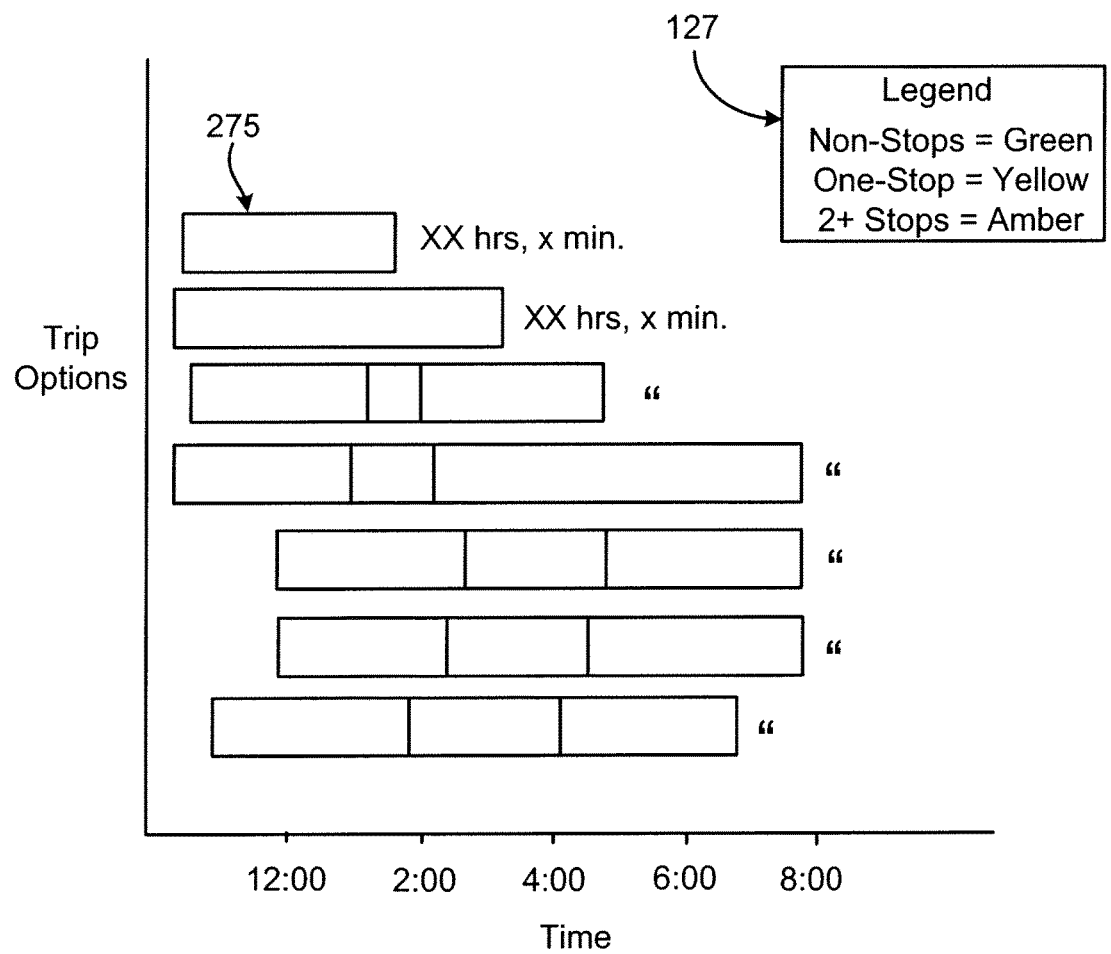

In the example of FIG. 26, the user can select sort criteria from the "Sort Menu Bar" 242, where each trip bar 262 will be ranked vertically, either ascending or descending, based upon the sort criteria. The default sort criteria is price 2421, with the lowest priced alternative 269 at the top of the bar chart. Other sort criteria are also available, such as departure time 2422, trip duration 2423, and arrival time 2424. To the right of each bar 262, the sort criteria 263, (in this example, price) is shown. If the user were to choose trip duration 2423 as the sort criteria from the sort menu bar 242 the display would be similar to that as shown in FIG. 27. In this example, the shortest trip duration would be at the top of the bar chart 275, with the trip duration noted to the right of each bar 262.

For bar chart displays, such as the examples in FIGS. 26 and 27, the appearance of each bar can be differed by various criteria. For example, non-stop trips can be shown in green, one-stop trips in yellow, and multi-stop trips in amber. Users would be able to understand how each bar is color- or pattern-coded by viewing the legend 127 shown in the display. Alternatively, the individual bar appearance, i.e. color, pattern, etc., can be determined by other attributes, such as the vendor provider, or passenger class, e.g. first class, business class and coach.

Figure 28:
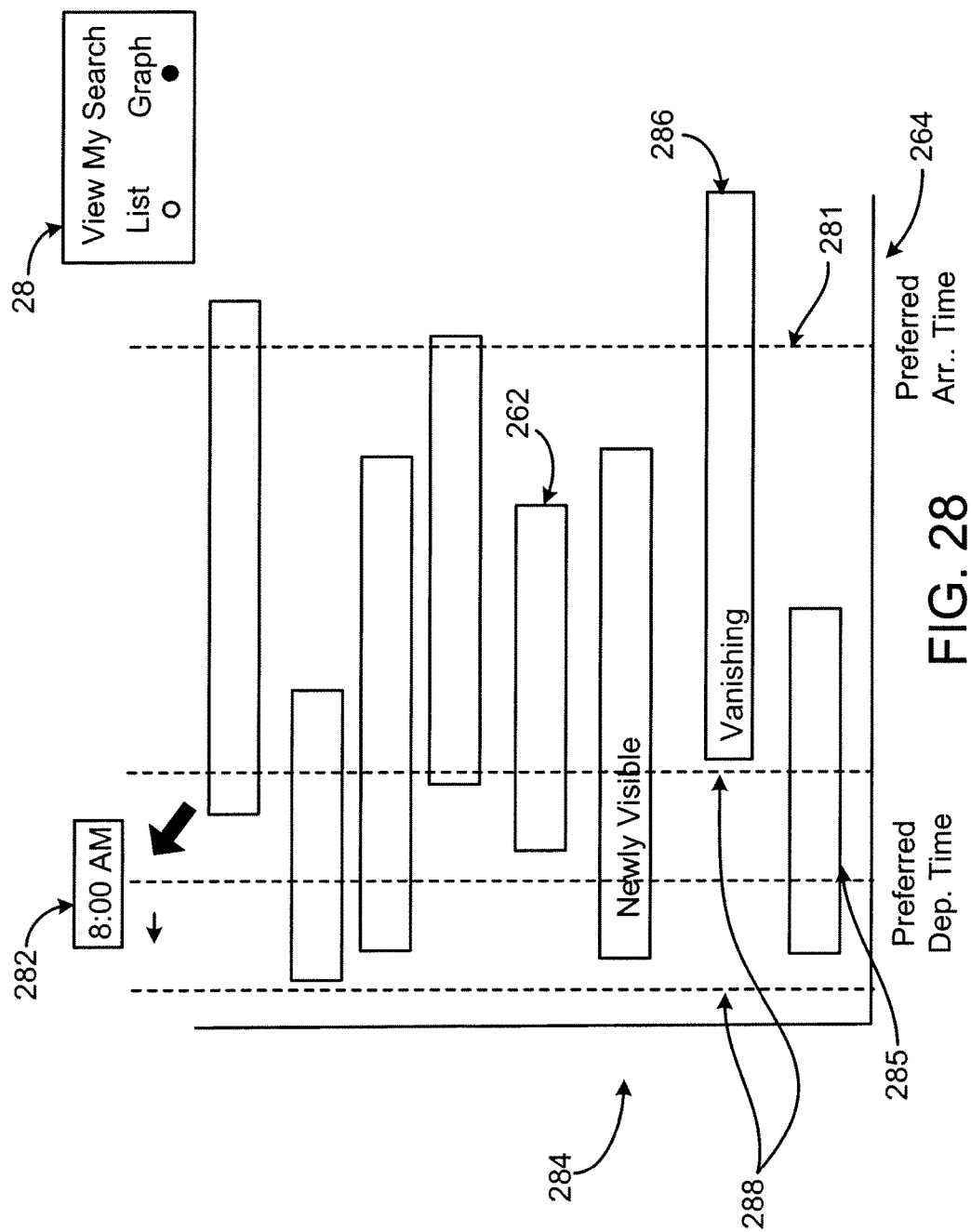

Referring to FIG. 28, for users that select specific preferred departure times or arrival times, vertical preferred departure time 285 and/or preferred arrival time lines 281 can be displayed on the graphic, providing reference points for how each trip relates to those preferred times. With these lines present, users have the ability to drag each line 285, 281 left or right to change their preferred time(s). As these line(s) 285, 281 are dragged to the left, e.g. earlier times, the hours of the day displayed on the X axis 264 will change accordingly, e.g. show earlier times in the display. To enhance usability, these preferred time lines 285, 281 can also display the time 282 associated with the position of the line on the X axis. As this occurs, the trip options represented by each bar 262 dynamically change to reflect those trip options that fall within the preferred time band 288. A preferred time band 288 can be a default period, such as the preferred time+/−2 hours, for example. Stated differently, as the preferred departure time line 285 is dragged to the left, new trip options with earlier departure times such as option 284 will appear. Previously shown trip options with later departure times such as option 286 will disappear as these respective trips fall into and out of the preferred time band. By way of example, with a 4-hour preferred time band 288 and a preferred departure time of 8:00 AM, only those trips that depart between 6:00 AM and 10:00 will be displayed. Those trips falling outside this time band will not be displayed unless the preferred departure time 285 or preferred arrival time 281 lines are moved earlier or later, i.e. left or right. If taken to an extreme, a preferred time line 285, 281 can be dragged into preceding or subsequent days until a desired alternative is found on another date.

Users that wish to interact with the trip alternative bars 262 displayed will have a number of different alternatives available to them. Users that wish to see more information about a particular trip bar 262 can simply move their cursor over the bar 262 and the trip's information will pop up while the cursor is located over that bar 262. Users wishing to actively interact with a particular Trip bar 262 can perform the following actions (as one example): double-click on that bar to select that alternative; click/hold on a particular bar to drag that bar higher or lower in the display, moving it adjacent to another bar that is also of interest to compare the two side-by-side; control/click on multiple bars to view only that sub-set selected; shift/click two different bars to view those bars, and all bars in between those bars; right click and choose "remove" from a drop-down menu to remove that bar from the display. Another set of interactions could achieve the same result depending on the particular interface. In all instances, users have the ability to, once the bars are selected, to toggle to the "list" view by clicking 2810 within the "View My Search" box 28.

Figure 29:
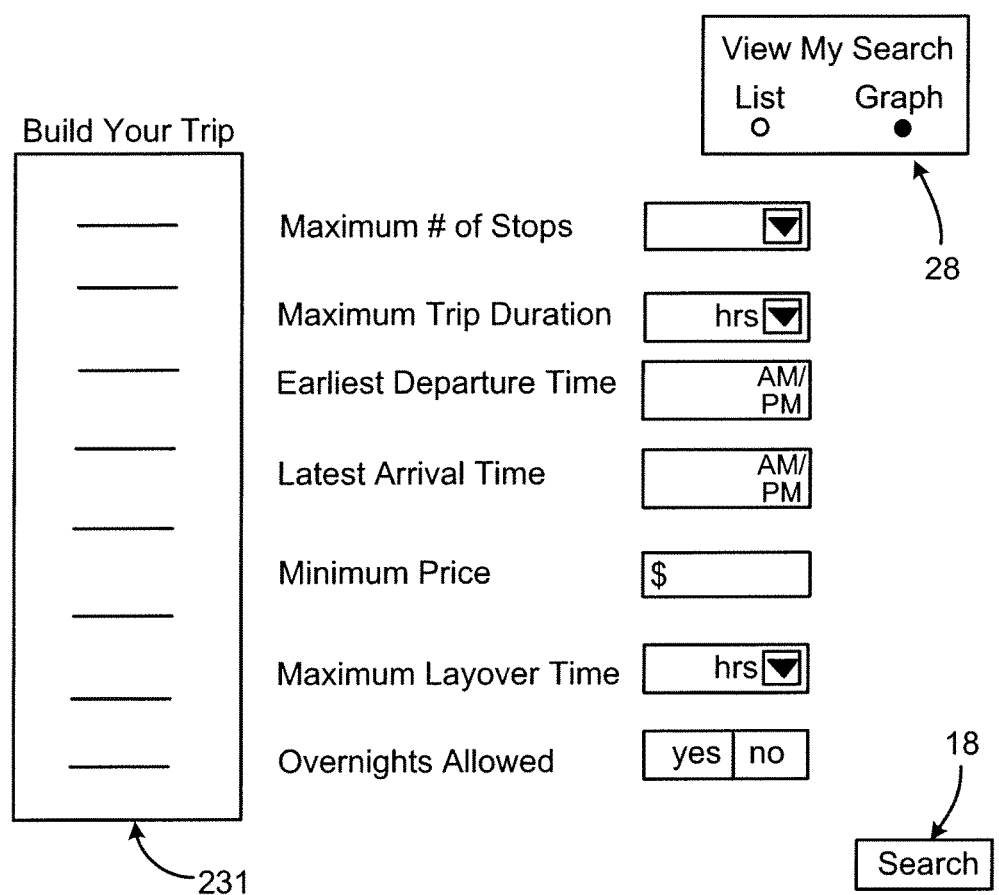

As shown on FIG. 29, filtering criteria can be added in addition to search criteria to refine and narrow trip alternatives. These filtering criteria or trip requirements 295 eliminate any trip alternatives that fall outside of the bounds of acceptance. Examples of these filter criteria are shown and can be a part of the initial "build your trip" screen at the initiation of defining the user's desired trip parameters. These filters can take into consideration the following criteria, for example; the number of allowable stops 2910 along the trip, total trip time duration 2911, earliest departure time 2912, latest arrival time 2913, a specified maximum price 2914, layovers less than a specified period 2915, trips arriving and departing on different days, i.e. overnights, trips 2916. A benefit of these filters is that with travel there are often events that occur prior to, or after the planned travel where time flexibility may not be possible. For example, if a user is in NYC on business, and he has a meeting that lasts until 4:00 PM, he would not want to display any trips prior to 6:00 PM (for example) as alternatives, as these trips would not be considered by the user, and consequently, he would not want to view them. Alternatively, if a user wants to attend a wedding at 1:00 PM on a Saturday, he likely would not consider any flights that arrived after 10:00 AM that day. Even though there may be flight with a great low price that arrives at 1:30 PM, the user simply will not be interested in seeing such an alternative, as his schedule will not permit taking that flight. Eliminating unwanted trip alternatives by using trip requirements 295 allows users to narrow their search only to those trips that they would deem feasible. Implementing trip requirements can take place alongside the inputting of "build your trip" options or they can be entered subsequent to the placing of the "build your trip" options. In either case, trip requirements can be added or deleted following a search to either narrow or expand the data set that is presented to the user.

Figure 30:
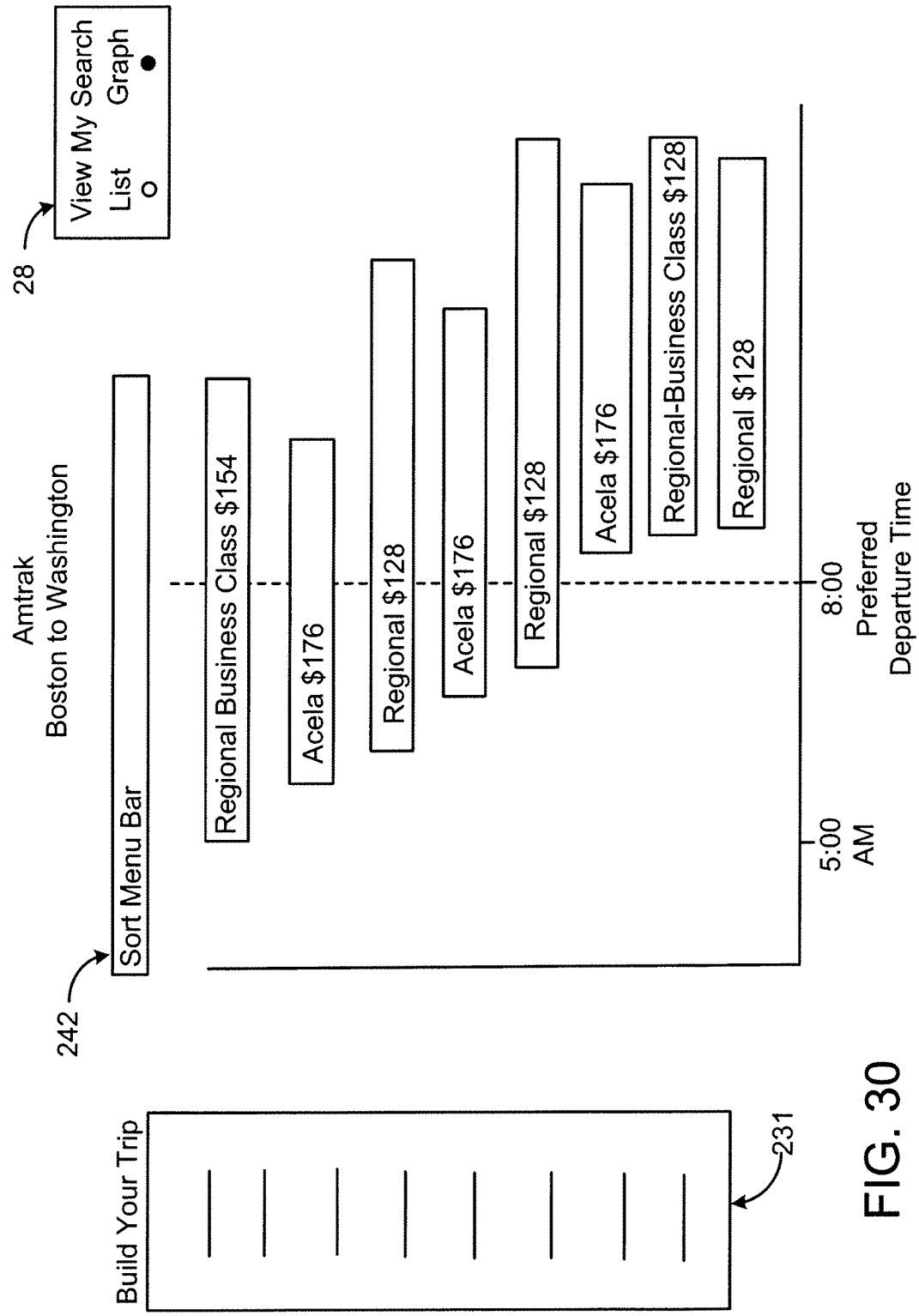

In FIG. 30, an example of a train trip from Boston to Washington is shown, with the data set being sorted by departure time and showing a preferred departure time of 8:00 AM. This example is applicable to all forms of train travel, including long-haul, commuter rail, and subway services, as well as other modes of travel such as ferries and cruises. If the transportation method has scheduled departure and arrival times, this application can be utilized to view, manipulate and select from those travel options provided.

Another use of the comparison display is in matchmaking, the process of connecting one individual to another for the purpose of establishing a relationship between the individuals. In some examples, an online dating site may have members, or subscribers, who are seeking a date, who is an individual with whom the user is looking to establish a dialogue and/or relationship.

In viewing an online site for the purposes of establishing a relationship, i.e. finding a date, users have the ability, from the universe of members on the site, to search for individuals that have the attributes that they are seeking in a date. This search is often conducted through the input of search criteria, which are specific qualitative and quantitative attributes that a person possesses. The search process can be done in a single phase, where all criteria are selected on a single display, or in a multi-phase process, where consecutive narrowing of scope is carried out over multiple displays.

Figure 31A:
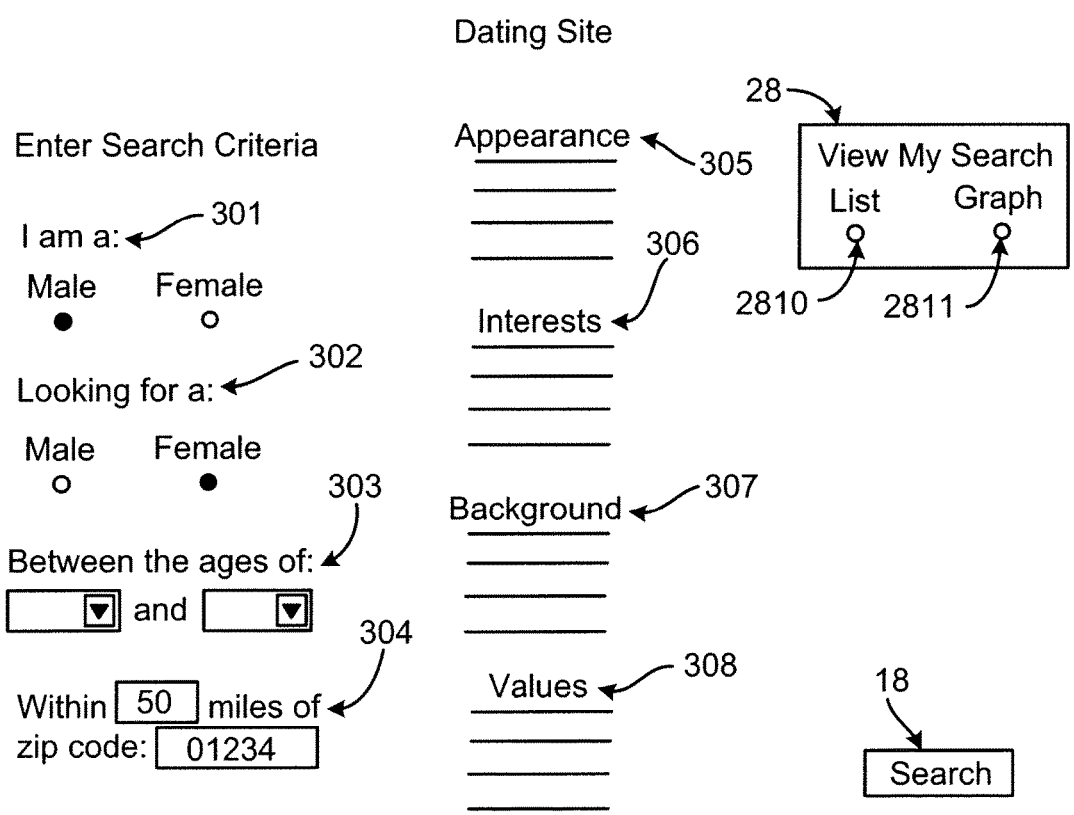
FIGS. 31A-36 are screen shots of portions of portions of a dating web site.

In the example of FIG. 31A, we use the example of a matchmaking web site that has members looking to establish a relationship with another member, and where the user has the ability to select basic information regarding the member in which they are searching. In this case, the user can identify himself or herself as either "male" or "female" 301, and can choose between "male" and "female" 302 for the member in which he or she is looking. Users can choose their age range preference 303 and geographic proximity from a specified zip code 304. In this example, the user has identified himself as a male seeking a female, between the ages of 30 and 35, and within 50 miles of zip code 01234. Furthermore, users have the ability to specify additionally search criteria, generally falling within the categories of "Appearance" 305, "Interests" 306, "Background" 307 and "Values" 308. With these criteria chosen, the user then clicks on the "Search" button 18.

Figure 31B:
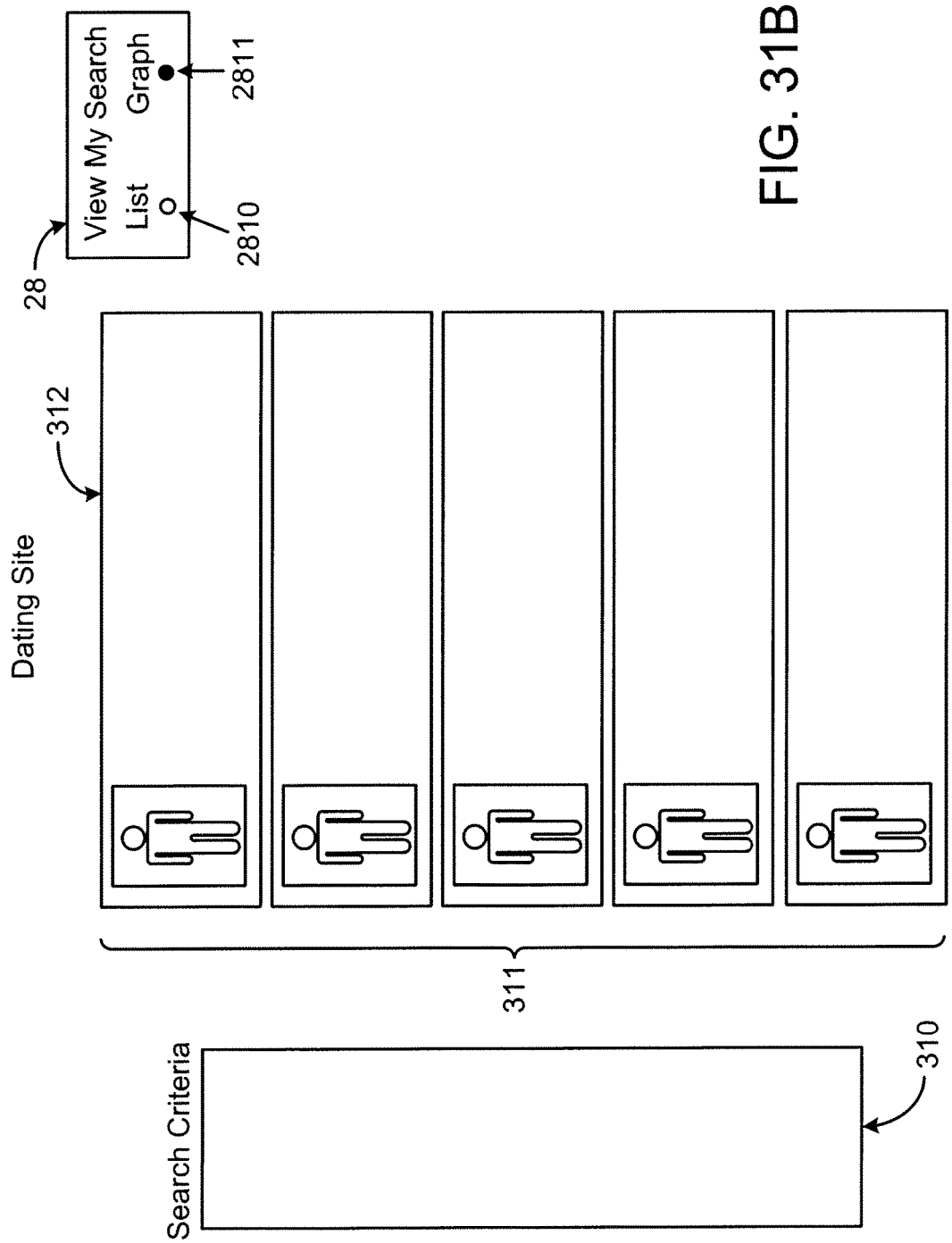

Once the user chooses to search the site's database using the search criteria, he is brought to a display as shown in FIG. 31B. In this display, the members that match the search criteria are displayed in a list of pictures and text 311, along with the search criteria 310. Within list 311, each member 312 that meets the search criteria will be displayed with basic information on the member, generally including age, location and other cursory information.

Here, we introduce the notion of adding a new display alternative for the user. In this case, the user can select from within a "View My Search" box 28, either a list view 2810 or a graph view 2811.

Figure 32:
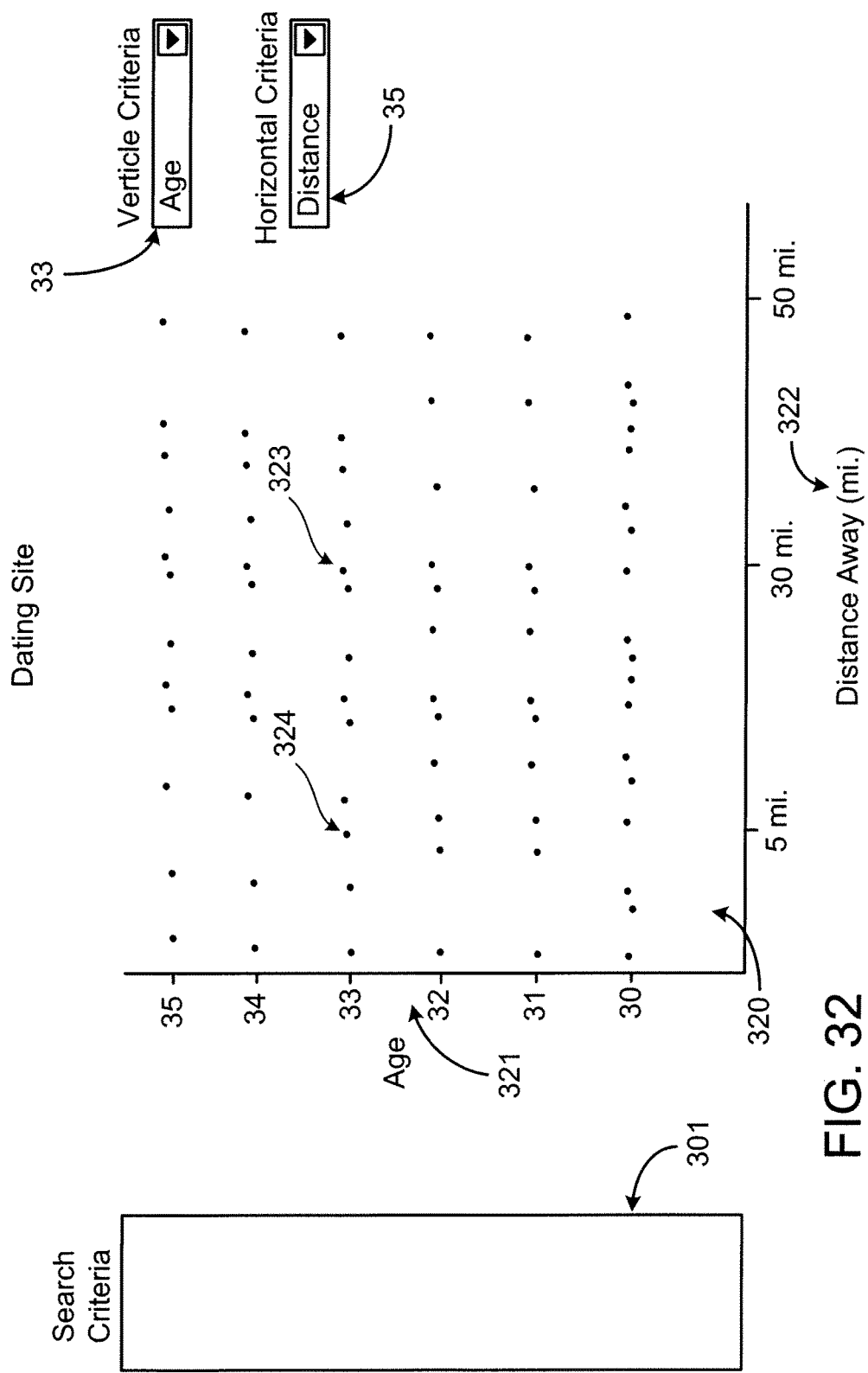

If the user selects the "graph" view 2811, he is brought to a display that is represented by FIG. 32. In this display, instead of seeing members listed sequentially in text, each member that meets the search criteria is displayed as a data point on an X/Y graph 320. For this demonstration, the default display shows members plotted using both their age 321, and their distance away from the user 322, as the X and Y coordinates, respectively. In instances where three variables are chosen in which to view the data set, a three-dimensional X/Y/Z graph with three axes can be utilized.

In this instance, the user sees the age 321 and distance away 322 relationships of the members that meet his search criteria. Age and distance away have been used as default variables in this example, as these attributes are often determinants in users' date-searching process. With this graphical display, users can readily see the relationship among all of the members that meet their search criteria displayed relative to one another by the variables that are important to them. In this demonstration, the members that resulted from applying the search criteria range in age between 30 and 35 and are located between 0 and 50 miles from the user's zip code. For example, member 323 is thirty-three years old and is located thirty miles from the user. Member 324 is also thirty-three years old, but is only five miles from the user. Users might find this view helpful as they can see how far away members of different ages are located, and can also focus their viewing on members that are located nearer to them.

If the user wishes to modify, refine or narrow their search criteria, he can do so from the search criteria 301. As these search criteria are modified while in the graph viewing option, axes ranges will adjust accordingly and data points will appear and disappear dynamically as the displayed data set reflects the new search parameters. To the extent that the user feels that there are too few or too many data points to review, he can modify his search to expand or reduce the number of instances, or data points, on the graph for better visualizations. Users will find that as the search criteria is expanded to allow for more data to be included in the search the graphical display will become unmanageable to view a single data point. As with other X/Y graph applications, interaction with and manipulation of the data set and the graph itself can be performed as with other products and services.

Figure 33:
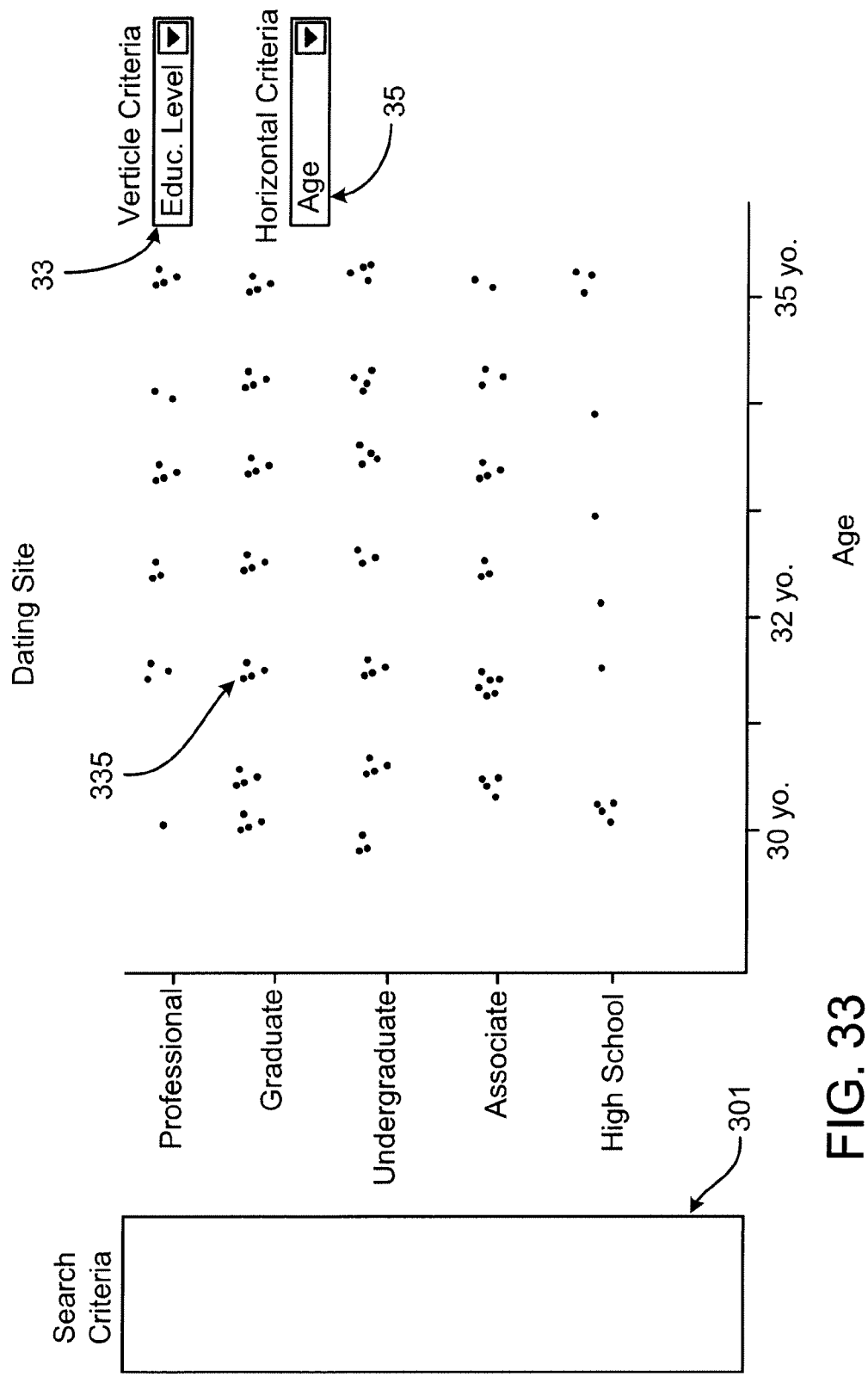

Within the display of FIG. 32, users have the ability to choose the search criteria 301 that are used as variables along the axes of the X/Y graph 320. Utilizing drop-down boxes 33 and 35, users can select from any of the search criteria to determine the vertical criteria (Y axis) 321 and the horizontal criteria (X axis) 322. By way of example, if the user were to choose the criteria "education level" and "age" as the vertical and horizontal measurements, respectively, using 33 and 35, the output would be displayed as represented by FIG. 33. In this example, "education level" is not a quantitative quality, yet it can still be charted, as the education levels can be rank ordered on the chart with education levels increasing as you move higher on the graph. When there are only a limited number of possible outcomes for the age/education combination of members, there will likely be more than one member that falls on the same point on the graph such as those of age thirty-two with a graduate degree 335. In these instances, data points can be displayed in clusters around the appropriate area on the graph so that users can view the data points individually.

While quantitative attributes, such as age, height and weight are easily graphed, as are rank-ordered variables, such as education level, a variable to be graphed can still be qualitative in nature and still be represented graphically. We saw this with the used car example (FIG. 4) in which the color of the car was graphed relative to its price. In the case of matchmaking sites, qualitative attributes such as a person's religion, hair color or political party can also be graphed relative to other variables and displayed on a site. As long as there are variables that are either measurable or have a fixed number of responses, e.g. a drop down menu as opposed to free-form text, the data set can be placed in a graphical display.

Figure 34:
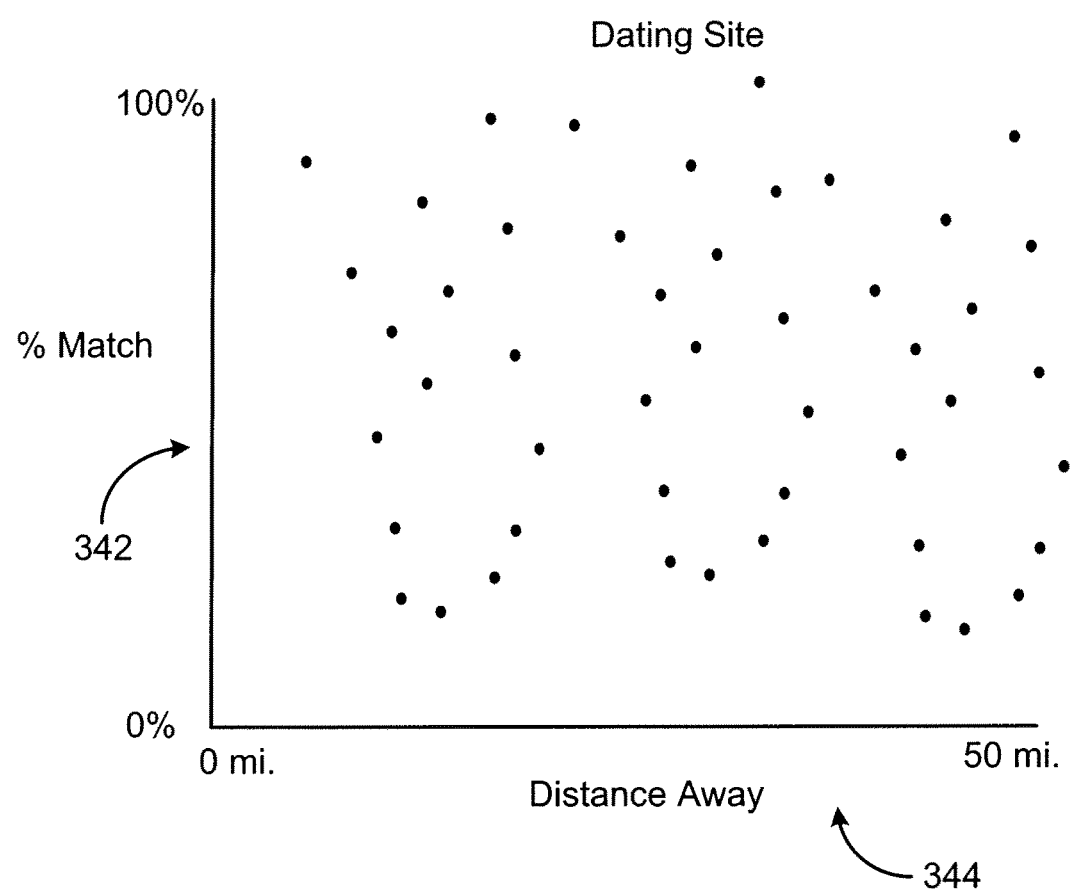

For online dating sites, a feature that is common is to show members' degrees of compatibility with the desired attributes preferred by other members. In these cases, the members will range from meeting none of the preferences of the other member, i.e. 0% match, to meeting all of the preferences of the other member, i.e. 100% match. In these cases, the percentage of compatibility or match can be used as a variable on a graphical display. An example of such is shown in FIG. 34, where members are graphed using their "% match" 342 and "distance away" 344. In this example, the user may be more interested in viewing the upper, left-hand side of the display where members have much in common with the user's preferences and where the members are located closer to the user.

In the X/Y graph views, the method of interacting with the data points is the same as the example given in the used car presentation (e.g. FIGS. 1-22). The features associated with manipulating the data set and the graphical presentation can also be used in the context of a matchmaking site.

Figure 35:
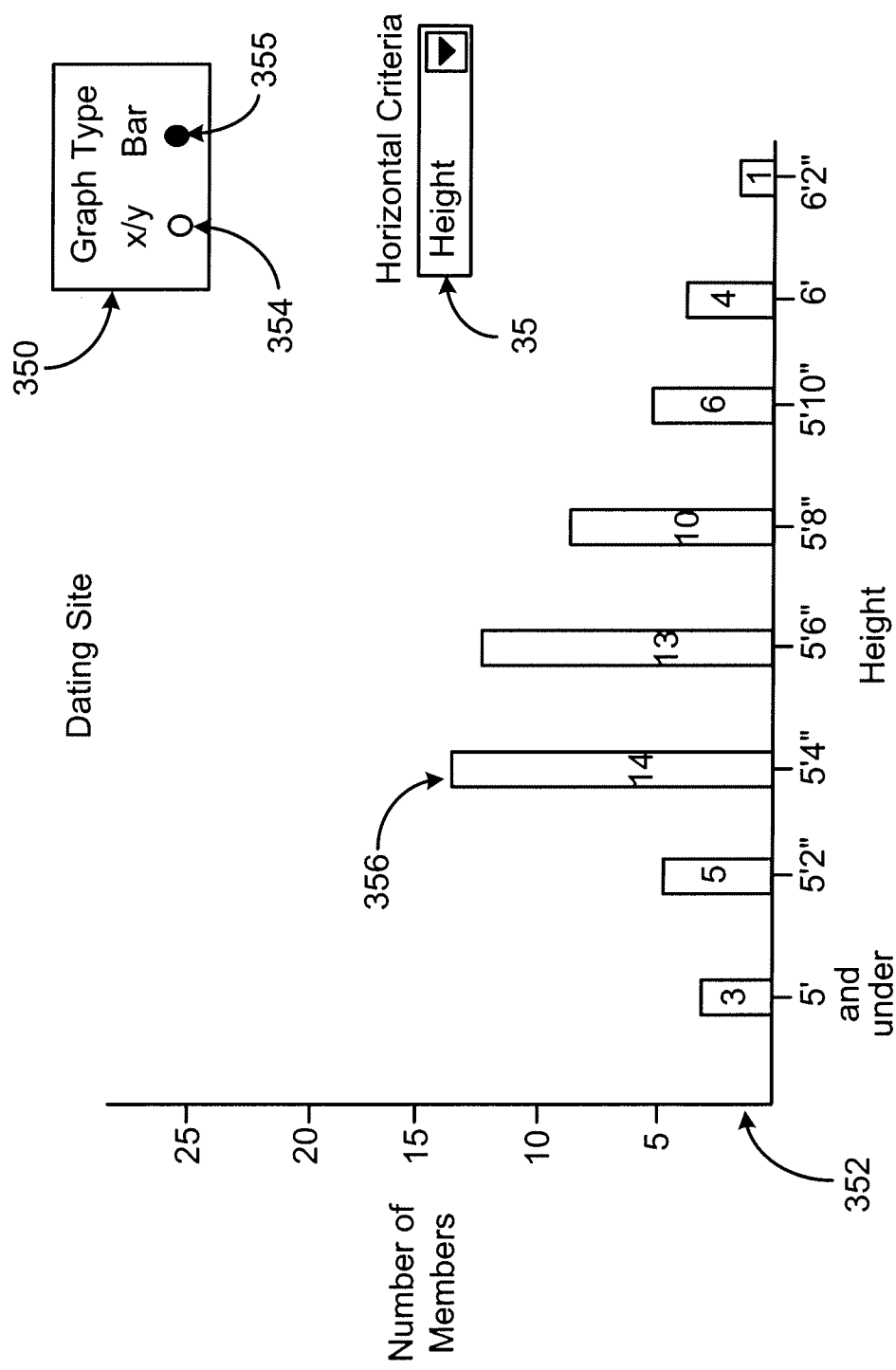

An optional view to the X/Y graph is to display members that meet users' search criteria in a histogram format, where the number of users that meet specific criteria fall into one category, or bar, on a histogram graph. An example of such is shown in FIG. 35 as graph 352 where the user chooses the "bar" option 355 from within the "Graph Type" box 350. When the user chooses the "bar" option 355, he is only asked to choose the horizontal or X axis variable 35, since the vertical or Y axis variable is simply the number of members that meet the X axis variable criteria. In this example, the user has chosen to look at the data set graphed using the height of the members.

A user viewing graph 352 has the option of interacting with the data on the graph in a number of ways. If the user wishes to view a single bar on the graph, such as all members of the data set that were 5'4", he could simply click on bar 356. Alternatively, if he wishes to view a range of bars, he could shift/click on the first bar of the range and then click on the second bar to view all bars within that range. Another option is to control/click on specific bars to view multiple bars, not necessarily adjacent to one another. In these instances, by selecting one or more bars on the graph, the user would be presented with a full profile description of each of the members that were included on the bar(s) selected. With a right click, and then choosing "remove" from a drop-down menu, the user could remove the bar from the graph.

If the user wishes to view a bar graph using a different variable, he could choose from drop-down menu 35 another variable that was of interest to him. Also, the search criteria could also be changed to create a different data set for viewing.

Figure 36:
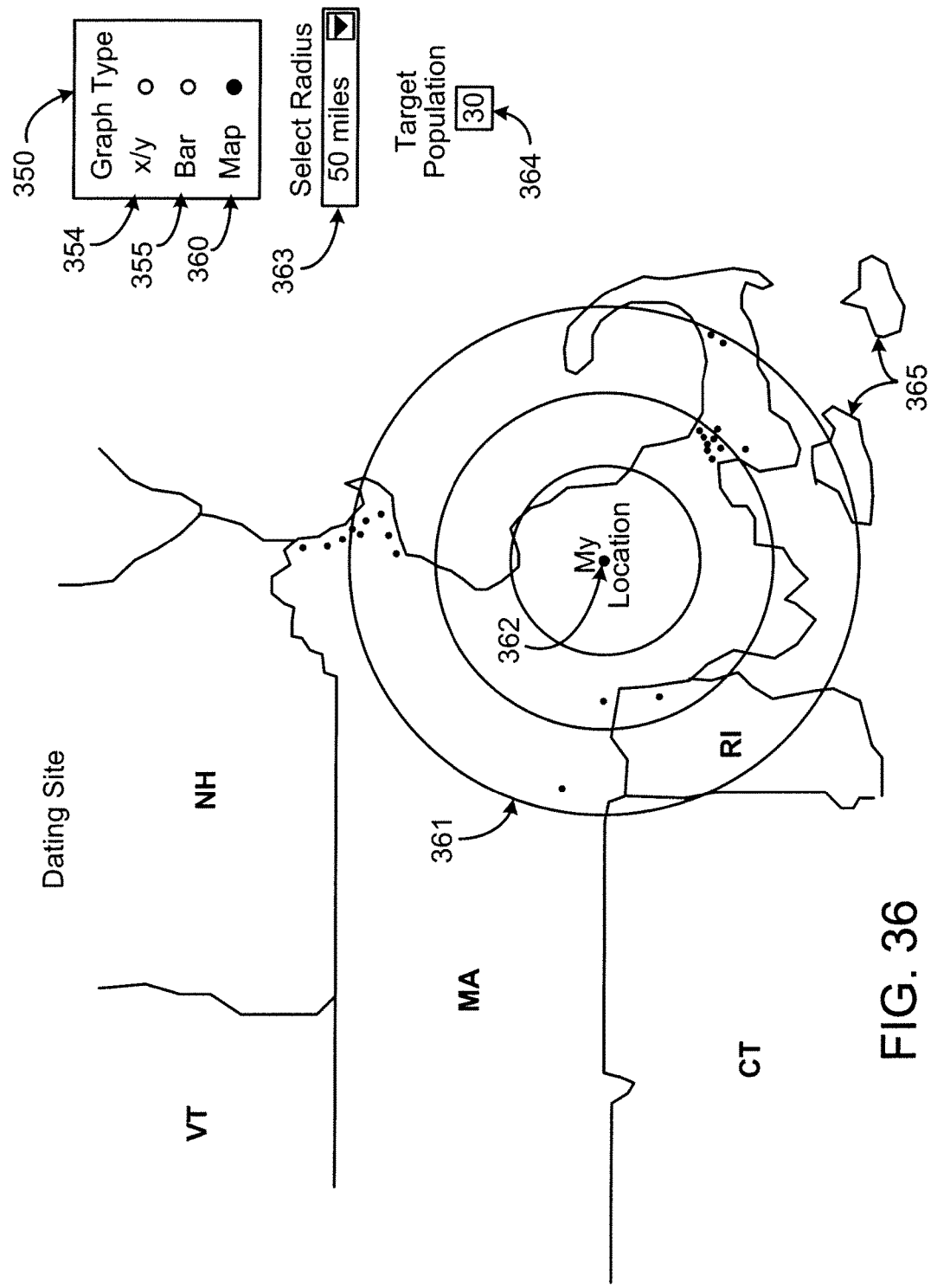

In most online product/service/person searches, geographical proximity is often an important factor when looking for an item, or in this example, a date. While the insertion of a mileage radius from a particular zip code is often included in the search criteria, some sites may not allow for further manipulation of the data set with regard to geographical location. Here, a user that would like to see his search data set presented on a map can click on the "map" button 360 within the "Graph Type" box 350 as shown in FIG. 36. In doing so, he would be presented with a display where the user during his initial entering of search criteria has used area code 02540 as his own location 362 and has entered 50 miles as the search radius.

With this map view, users can see where specific members are located relative to their location, and with a radar screen display overlay 361, they can also see how far each member of the data set is located from them. Within this view, users can interact with each of the data points on the display as they would in the X/Y graphs. For example, to view a member, the user would simply click on the data point. To select an area of the map in which the user is interested, like with the X/Y graph, he can drag his cursor over the area of interest to see only those data points that fall within that selected range. As with other examples, all data points can be uniform and have a similar appearance, or they can be denoted with different shapes/colors/patterns, to suggest variances between sub-sets of the data set.

As optional features for the map view, users can adjust the radius of the search by clicking on the "Select Radius" box 363 and choosing a mileage option within the drop-down menu. Alternatively, the user could select the ideal number of members that he would like to view, using "Target Population" input box 364, and the search could radiate from the user's location until the desired number of members are found. For example, if the user entered "30" as their Target Population to view, the application would search outwardly from the user's location in an increasingly greater radius, until 30 members were found that met the user's search criteria. The user would also have the ability to zoom into an area on the map by simply double-clicking on the map at a specific location; continued double-clicking would result in increasingly closer zoom views.

This map view gives users a better sense as to where members are located versus just a zip code or town name. The map view also allows users to select data points from certain areas, using their cursors, which can be helpful in isolating a certain area to search. For example, in FIG. 36, there are two islands 365 near the user's location, and members on those islands may fall within their search radius, but the user may not want to view members that live on those islands. He could then highlight that area of the map to exclude those islands. This map view can be helpful for any search where the location of the product/service/person is important to the user for practical purposes, especially because all physical distances are not traveled equally. For example, bodies of water, mountain ranges, and other natural and man-made obstacles can present themselves and make accessibility much more difficult than what the physical distance between two points would suggest.

All of the features and functionality used for match making sites, and other functionality and features, can also be used to find services and vendors that are listed on online directory sites. As with all of the categories listed in a traditional "Yellow Pages", these same listings can be found on numerous online sites that either any provide information for multiple categories in a Yellow Pages format, or just a single service, such as a specific profession or vendor category. These directory sites can utilize the application in a number of ways, but most likely as a way to identify service providers or vendors that are available nearby, and that also match search criteria selected by the user. For example, the application could plot service providers by the distance away from the user on one axis, and on the other axis, the satisfaction or quality rating of the provider. Alternatively, the vendors or service providers' compatibility with the user's search criteria could also be measured as a "percent of match," and that could be the measurement on one of the axes.

Similar to products offered online, services and other vendors that are also listed online, provided that they have attributes that can be measured or categorized, can have their attributes presented in a graphical display. While proximity will likely be a common consideration for online searches, the vendor's or service provider's scope of services, product lines offerings, reputation ratings, accreditations, and other definable parameters, can all be displayed graphically. Parameters could also be displayed based upon the compatibility or compliance with the answers responded to on an online questionnaire, where the degree of compatibility or compliance is the basis of measurement. For example, after taking a twenty-question survey, a website could graphically display how the service providers met a percentage of compatibility with the user's search criteria, in relation to the distance away that those service providers were located. In this case, it is not the attributes themselves that are plotted graphically, but instead, the amount of "fit" or compatibility with the requirements or parameters determined and entered by the user.

The comparison display can also be used for property sales and rentals. For example, an aggregator may list many residential or commercial properties for sale or rent. Although a very different product from used cars, property listings can be displayed for comparison in a manner similar to that of used cars. The search criteria and relevant data, however, are different. In a search for property, attributes such as the size of the property and its physical location are often determinants in the value of the property.

Figure 37:
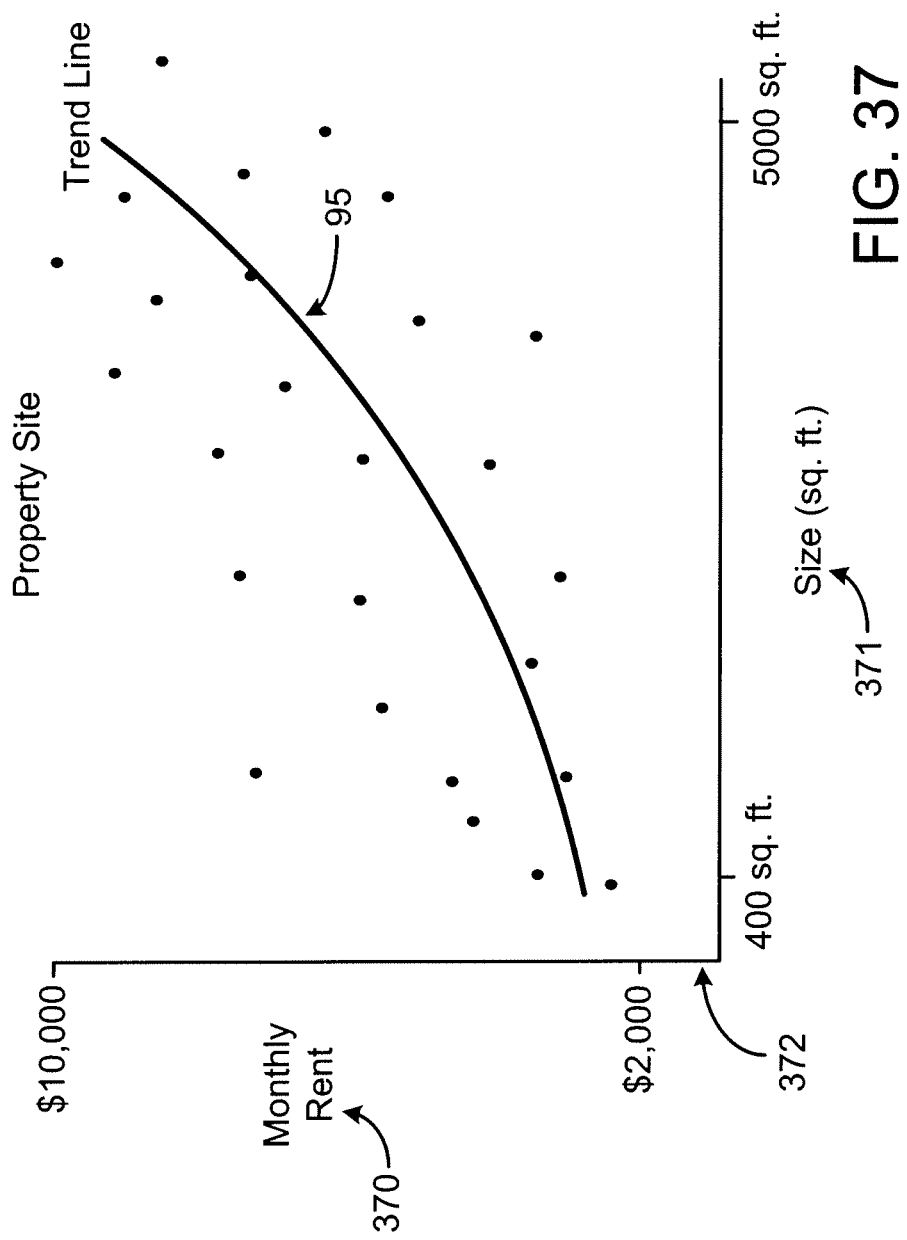
FIGS. 37-40 are screen shots of portions of a real estate web site implementing a comparison display.

As with many product search sites, the results of a search can be displayed in a list format using text and a photo. For this property example, users can be given the same option of choosing to view the search results in a graphical format, and an example of a display in this format is shown in FIG. 37. In this example "rental price" 370 and "size" 371 as measured in square feet are used as variables for an apartment search. The resultant data set that meets the search criteria is shown within graph 372. Similar to other applications, a trend line 95 shows a regression of all of the data points within the data set and allows users to see whether the price of specific properties fall above or below trend.

In this display, users would have the ability to interact with and manipulate the data and the graph in accordance with the features and optionality that has been discussed previously for other applications. Similarly, properties with different attributes, such as being offered by different realtors, can be displayed with varying appearances. As one example, the realtors' logos can be used as icons for each of the data points, and featured properties can receive highlighting reflecting their preferred listing status. The icons for each of the data points could represent other characteristics, such as the type of property (e.g. house or condominium).

Figure 38:
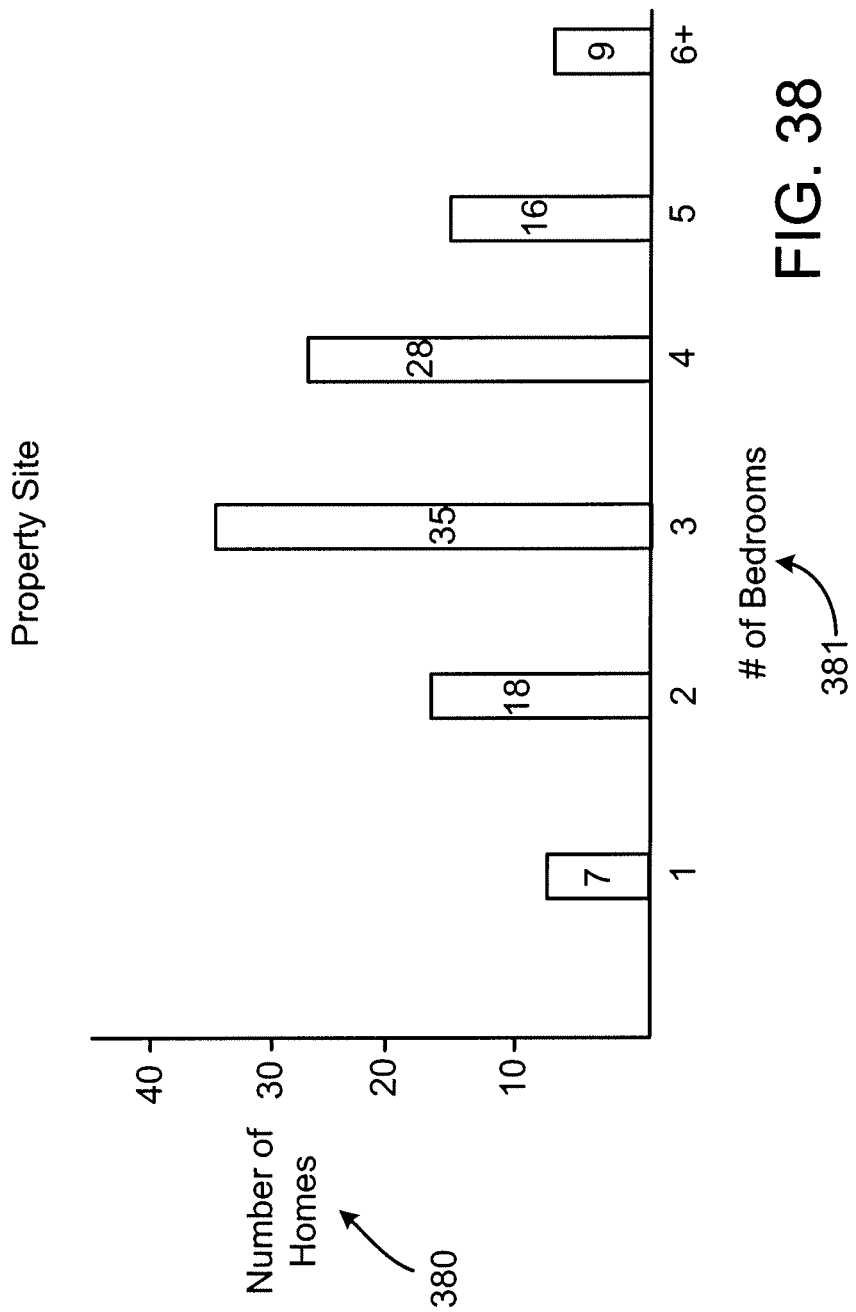

Alternative displays of the data set can also be produced, such as a bar graph, as represented in FIG. 38. In this example, the user can view homes, using "# of bedrooms" 381 as the variable. As above, users have the ability to interact with and manipulate the data and the graph in accordance with the features and optionality that has been discussed previously for bar graphs.

A map view, similar to that discussed in the matchmaking application can also be used, and would have similar features and optionality as previously discussed.

Figure 39:
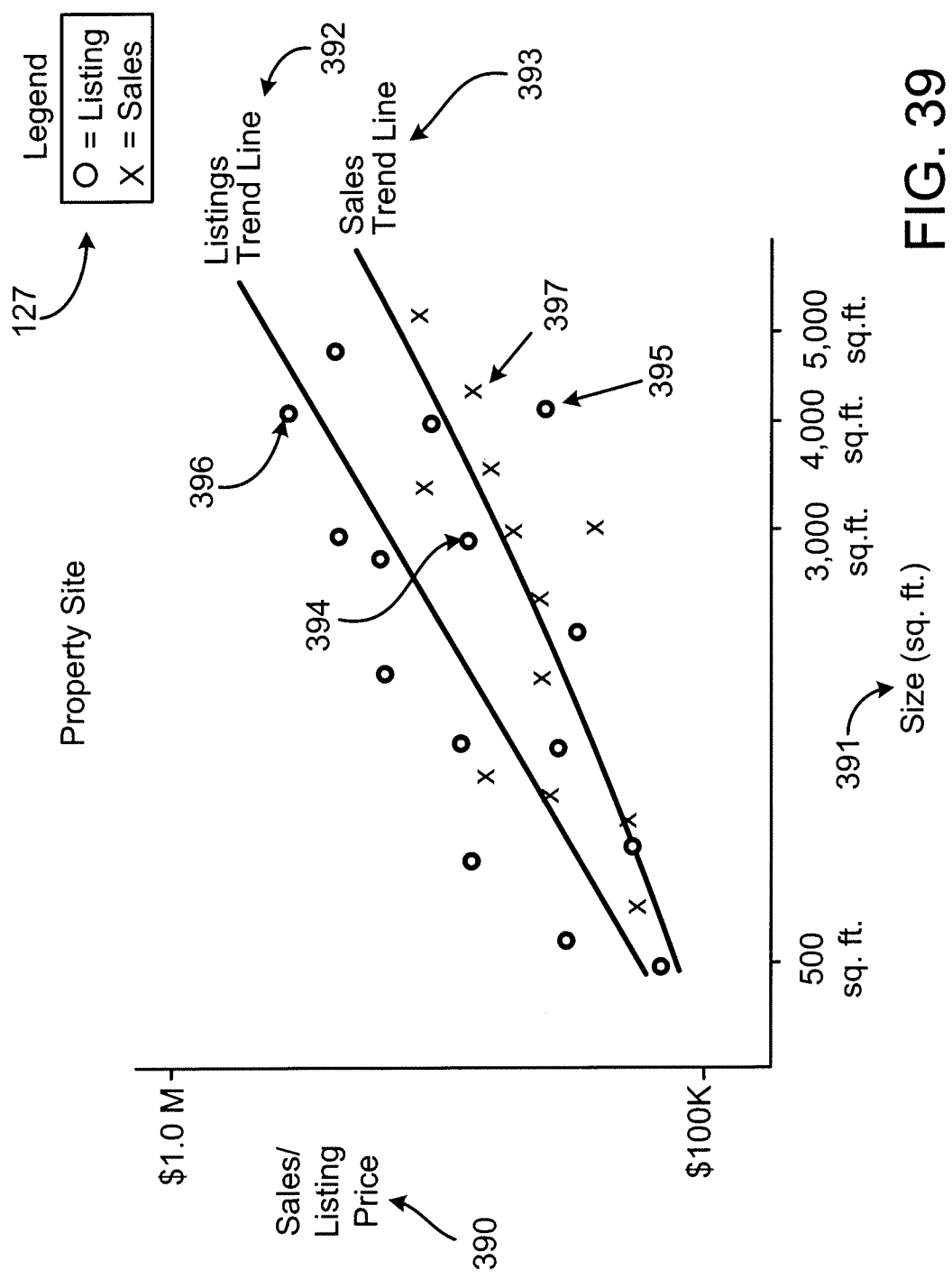

As with used vehicle transactions, data is compiled for residential property transactions that have taken place. Similar to used car book values, this historical data can be used as a means of comparison to properties currently listed for sale or rent. In FIG. 39, the user can view a display that includes both current property listing prices as well as previous sales prices 390. The data set is also plotted according to the size of the residence 391. To assist the user in seeing the difference between property listings and property sales, the data points for the two sub-sets have a differing appearance, where listings are denoted as Os, and sales are denoted at Xs. This relationship is highlighted in legend 127. Also added to the graph is a listings trend line 392 and a sales trend line 393 which provide regression lines for each of the data sub-sets. In this view, users can see the relationship between the trend lines as well as how the individual data points relate to the trend lines. For example, users can see that data point 394 is priced below the Listing Trend Line 392, suggesting that it is a better relative value, based on property size only, than other listings. However, at its current listing price, it is priced above trend for similarly sized homes that have sold recently in the area. =Users looking for a home in the 4,000 square foot range may be more attracted to data point 395 than to data point 396, as these homes are similar in size but have substantially different prices. It should be noted that a home size alone does not determine its value. However, this application gives viewers the ability to view the relationship between the home prices visually. This can be helpful in allowing users to see the difference in how homes are priced relative to one another, as well as relative to other homes that have sold such as data point 397.

Figure 40:
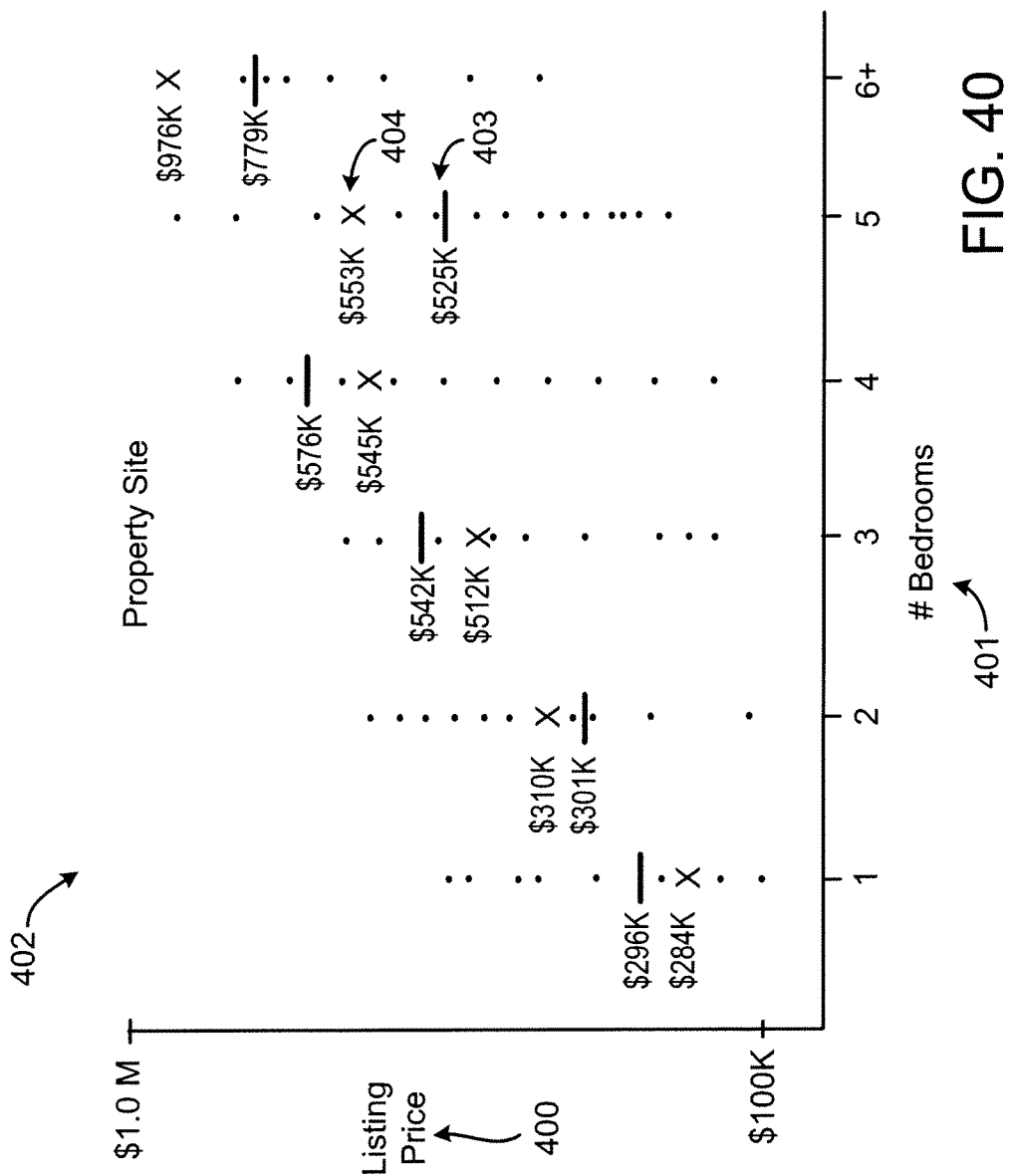

In FIG. 40, the user has plotted home listing prices 400 against the number of bedrooms in the home 401; the data set is represented in X/Y graph 402. In this display users can see the prices of homes with similar bedroom quantities as well as the average listing price 404 and average sale price 403 for each bedroom quantity.

As with other uses of the comparison display, as the filter criteria are changed by the user, the graphical display will change dynamically, reflecting the new search criteria parameters.

The comparison display can also be used for establishments that provide overnight lodging, e.g. hotels, motels, inns, B&Bs, which usually have a room rate that determines the price of a night's stay at the lodging. Overnight lodging options are commonly offered by online aggregators, which are sites that provide lodging options from a number of different providers. Users looking for lodging generally look for availability, location, price and quality/amenities as the key selection criteria in their lodging search. With respect to quality/amenities in the lodging, most providers have star ratings, generally between 1 and 5 stars, which are assigned to them by either former guests, the aggregators themselves, or by a third-party travel company. The higher the star rating, the implied higher quality and amenity level of the lodging.

Figure 41:
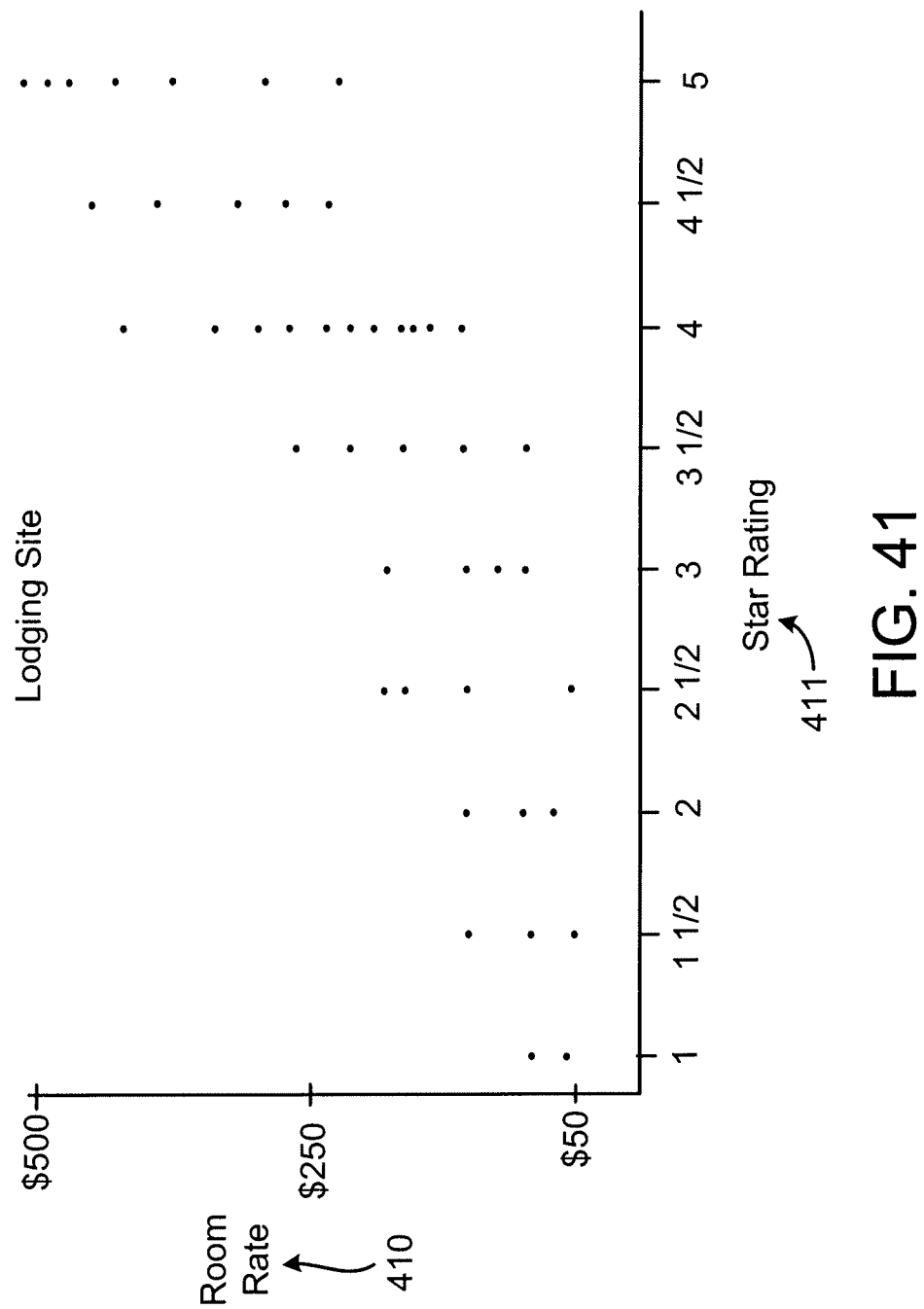
FIGS. 41-43 are screen shots of portions of a restaurant web site.

In FIG. 41, the user has chosen to view room rates 410 plotted against the star ratings 411 of lodgings in a particular area. A user looking for lodgings with at least four stars can easily see what options are available and how their relative prices compare to one another. While this same information is available in a list format, the graphical display allows users to see in one image all of the options that are available given their search criteria. The ability to see all data points placed relative to one another in one display provides a more efficient selection process to users. In this example, should the user decide that he does not wish to spend more than $250 per night, he can easily see that he can choose from any of the options rated 3½ stars or less, or that he can also choose from a handful of lodgings with 4 stars.

Figure 42:
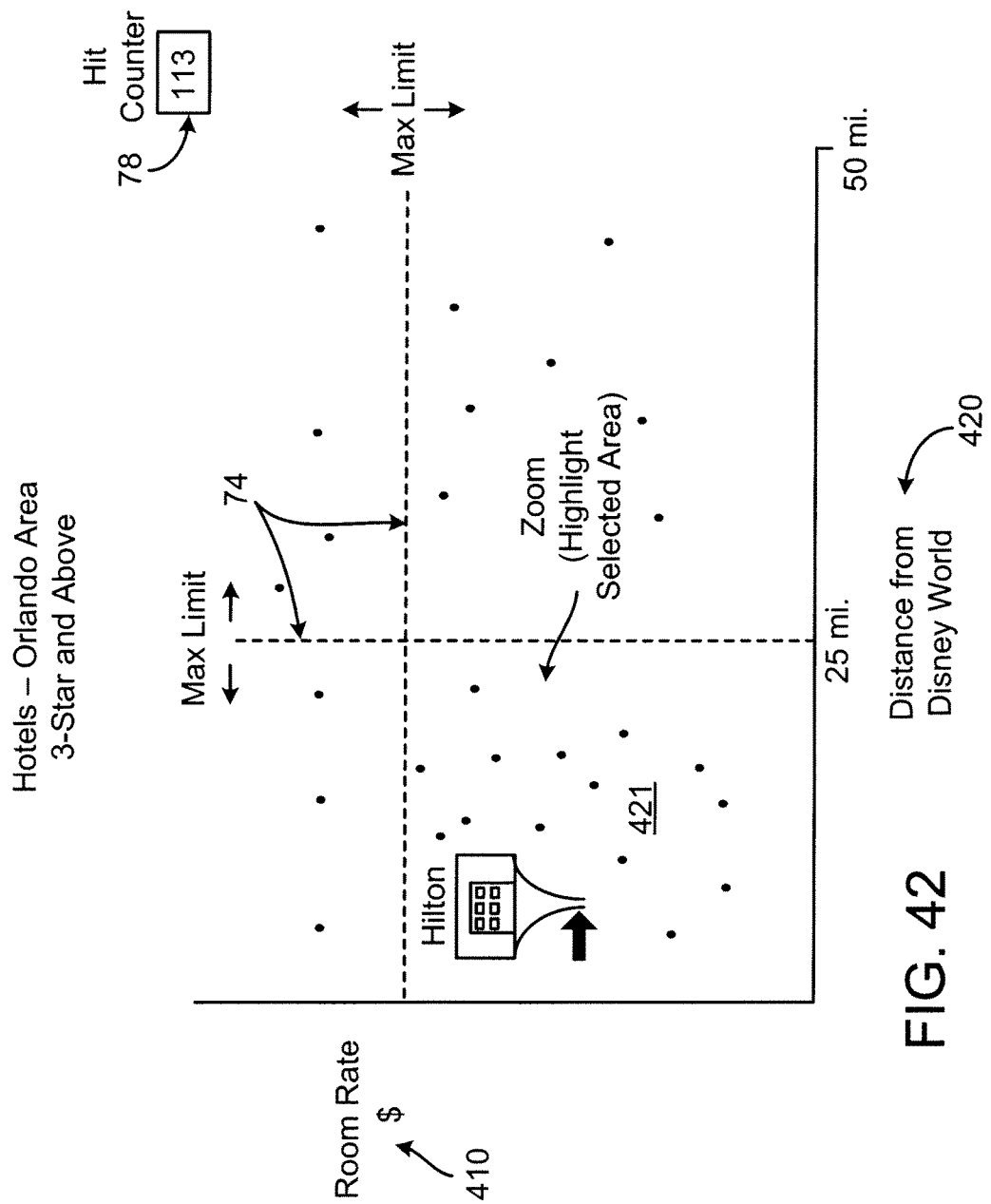

Location is also an important factor for travelers, as often they have a particular place they want to visit, either for business or pleasure purposes, and it can be helpful to see how far a lodging establishment is from a particular address or attraction. While some aggregator sites list this information, a graphical form, e.g. FIG. 42, can be helpful to travelers. In FIG. 42, the user has chosen to view room rates 410 compared to the distance from Disney World 420 for lodgings 3-star and above. Additionally, the user has chosen to insert limit lines 74 to narrow his search using a graphical interface. As the user moves the limit lines lower or to the left the data set will be reduced, reflecting the tighter search parameters. As this is done, hit counter 78 continues to reflect the number of data points that fall within the limit lines, in this case, area 421. As with previously discussed features, options and graph types are also available in the lodging application. The comparison display can also be used for restaurants. Akin to the lodging industry, restaurants receive ratings from both customers and third parties. These ratings often come in the form of "stars", generally from 1 to 5, or from numerical scores that rate restaurants on variables such as "food", "service", "décor" and "price".

Figure 43:
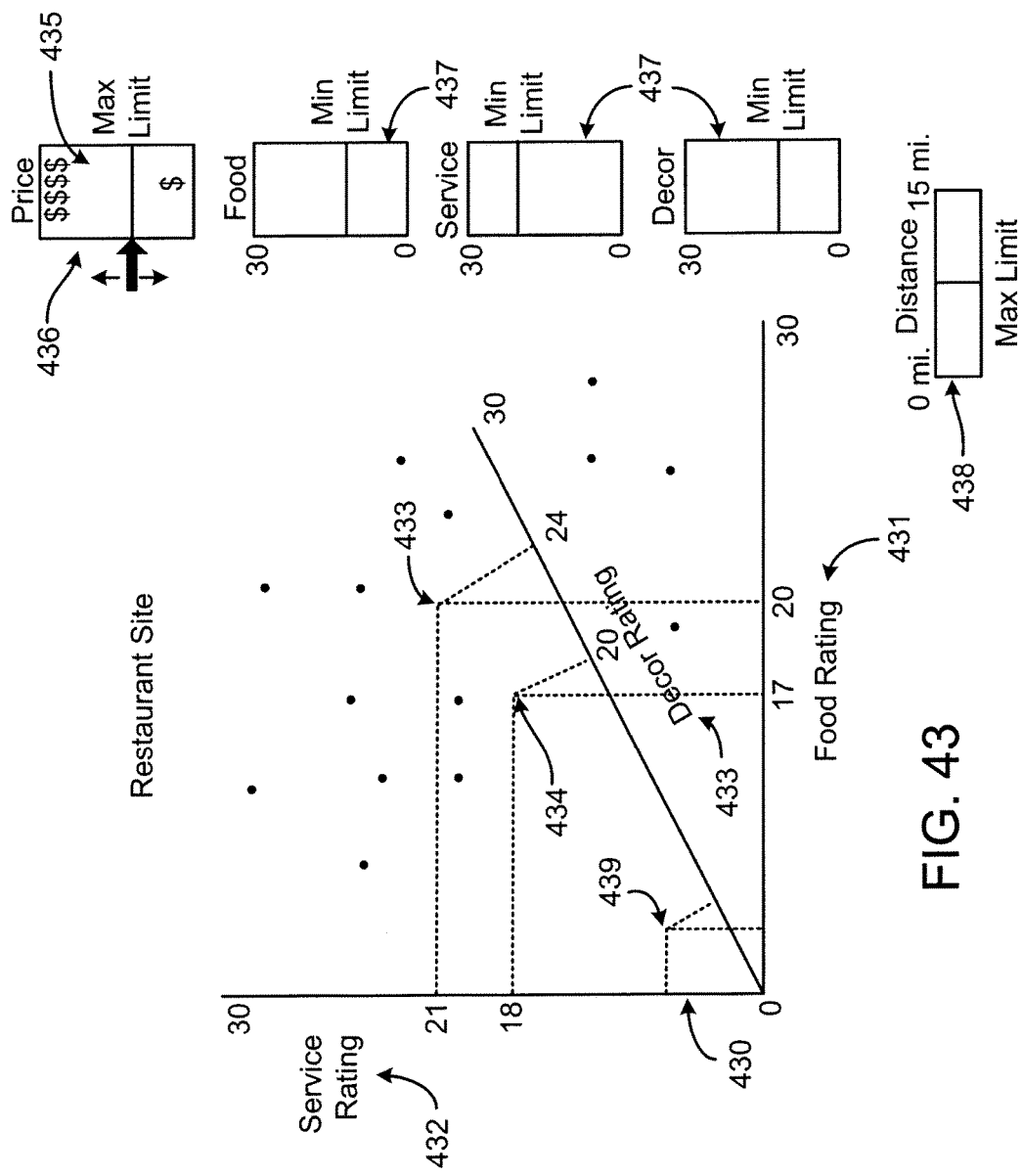

In FIG. 43, we show an example of a three-dimensional scatter graph 430 in which data is plotted along three axes. These three axes are commonly known as the X-, Y- and Z-axis. In this example, the user is viewing restaurants in their area, plotting the following ratings attributes for each restaurant: food 431, service 432, and décor 433. For example, data point 433 has a food rating of "20", a service rating of "21", and a décor rating of "24". In a three-dimensional display, viewers have the ability to see how data points relate to each other across three variables at the same time. In this example, the user can see that data point 433 has higher ratings than data point 434 across all three variables. The three-dimensional display is useful when users have more than two variables that they would like measure a data set against.

The features and optionality of three-dimensional graphs are the same as two-dimensional X/Y graphs, but the user has three axes in which to manipulate instead of just two.

As an alternative to entering search criteria to find the restaurant of choice, users have the ability to alter their criteria using a sliding scale for each of the attributes being measured. In the example of FIG. 43, the user can use his cursor to raise and lower a limit bar 435 located within a scale 436 to raise or lower the parameters of that search criteria. In this case, moving limit bar 435 downward with the cursor eliminates those restaurants that are priced above that limit bar from the data set and consequently from the display. In the case of scale 436, the limit bar 435 sets a maximum value such that data points with values higher than the limit are eliminated. In the case of the food, service, and décor scales 437, the limit bars set minimum limits such that data points falling below the line are eliminated from the data set and the display. A distance scale 438 is also present in which the user has the ability to select restaurants that are no further than a desired distance away.

As with previously-discussed two-dimensional graphs, changes to the search criteria have the effect of changing the data set dynamically and consequently change the data points that are on the display. As the limits are relaxed, the number of data points within the data set increases. Conversely, as the limits are tightened, fewer data points will match the search criteria and the display will become less populated.

As with the two-dimensional examples, regions of the graph can be sub-divided to represent different value ranges along the three axes. For example, data point 439 could fall within a region of the graph that has the following descriptors: "poor food", "poor service", "po he or décor." This region of the graph could have a different appearance than other areas of the graph or data points within the region could be displayed differently than data points falling outside that region. The comparison display could also be used for boats. The application for boats is very similar to that of automobiles, as both are available by model and by model year, both have optional equipment that can act as variables for search criteria, and both have active and deep pre-owned markets. Boats, however, have different boat-specific variables than automobiles that users would utilize in their search criteria. Boat length, displacement, hull material, etc. are all variables that differentiate a boat search from that of an automobile. Another difference is that motorboats do not accumulate mileage with use; motorboats accumulate "engine hours" which reflect the number of hours in which the boat's engines have been in use.

Figure 44:
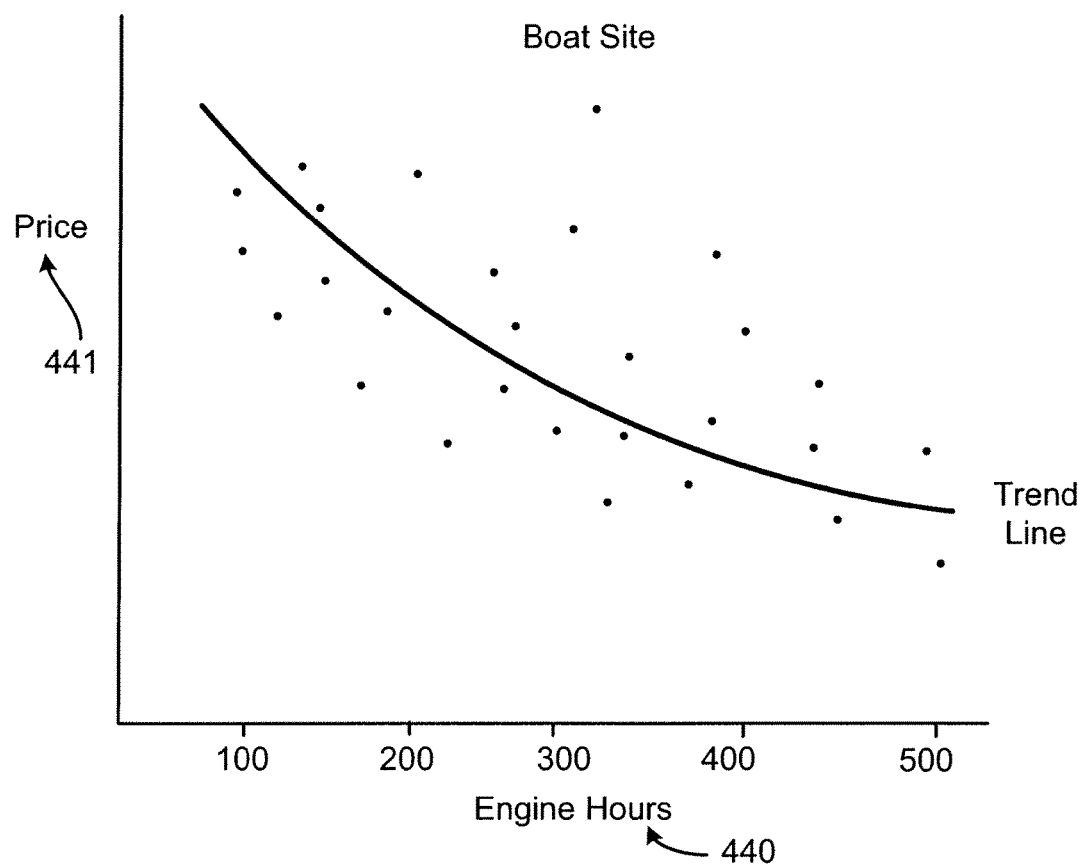
FIGS. 44-45 are screen shots of portions of a boat web site.

If one were to plot the price of a boat model versus engine hours, one would observe a relationship very similar to that of automobiles with miles. In FIG. 44, a user has graphed a particular boat model using engine hours 440 and price 441 as the X-axis and Y-axis variables. As indicated by trend line 95, as the number of engine hours increases, the value of the boat falls. The rate of decline in boats' prices decreases as the number of engine hours increases. This is the case, as one can see that low-engine hour boats lose value at a faster pace than high-engine hour boats. This relationship between engine hours and price is analogous to automobiles with regard to mileage and price.

Figure 45:
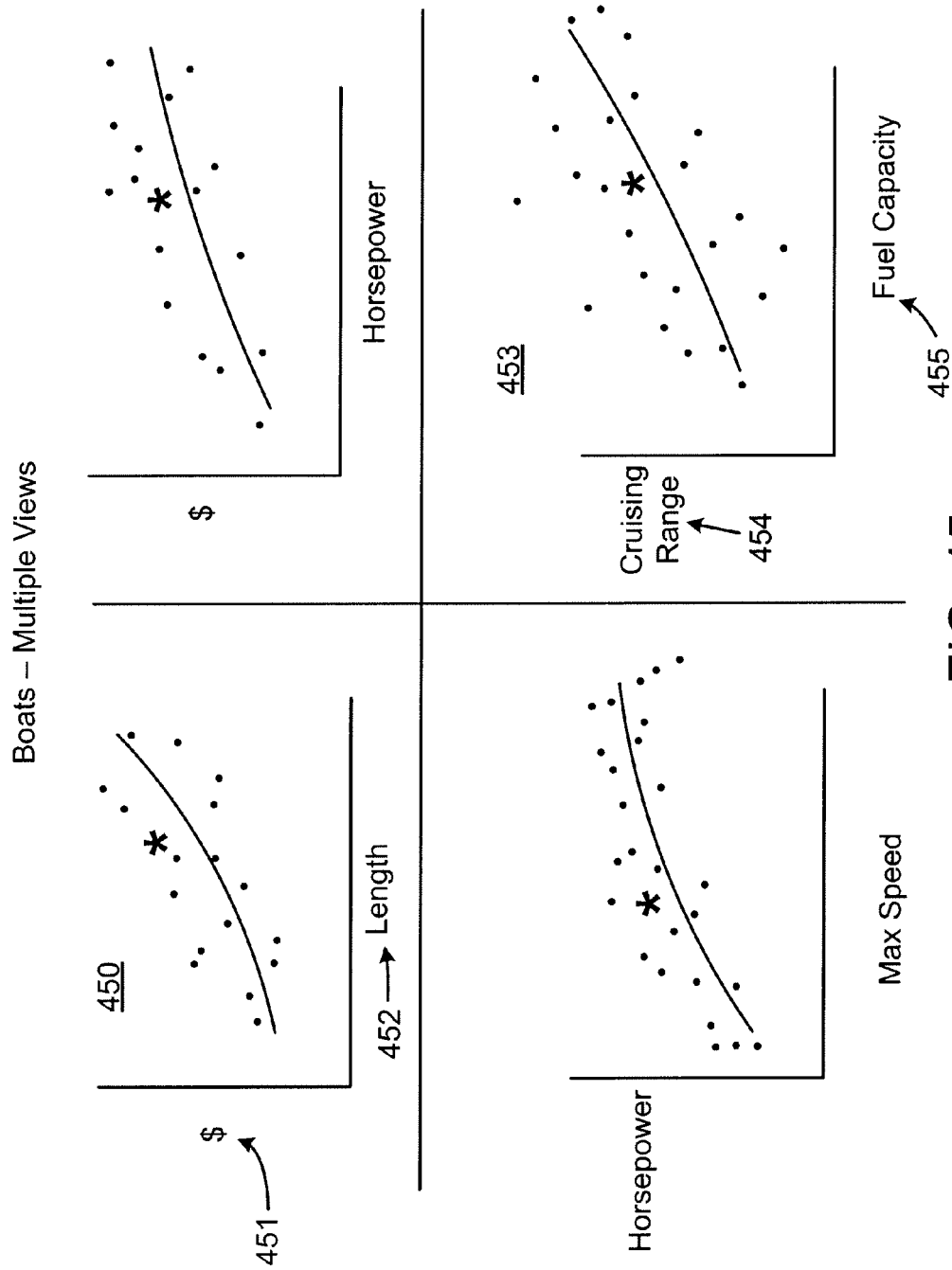

Another display option is a split-screen feature in which a data set can be viewed using two search variables for each quadrant of the display. In the example shown in FIG. 45 the user can view a data set in four different ways. In quadrant 450, the user is measuring price 451 versus boat length 452. In quadrant 453, for example, the user is also viewing the data set, measuring the boat's cruising range 454 versus fuel capacity 455.

Apart from differences in search criteria, all of the features, optionality and data set and graphical manipulation can be utilized with a boat application as they are used with the automobile application.

For the various applications described above, e.g. vehicles and boats, the application of the comparison display is appropriate for not only sites that sell these products only but also for sites that auction these products and many others. To the extent that products have particular attributes that can be broken down into categories or have certain features that are definable, the products' prices can be charted against these categories or attributes. For example, in the case of auction items for which geographical proximately is a determining factor in the bidding process, price can be charted versus the distance between the product and the bidder. Generally, all products can be graphed across some variable which compares one product to others. Given this concept, all features and functionality of the previously discussed applications of the comparison display are relevant for auction sites as well.

However, auction sites are different in that instead of offering a product at a distinct price, the sites hold an auction process, where the highest bidder typically purchases the product at the conclusion of the auction period, provided that the highest bid price is acceptable to the seller.

In the example of auction sites such as eBay, users have the ability to select the search criteria for the product for which they are seeking. As with other sites, this search process can take place over multiple iterations in which the search is iteratively narrowed by choosing increasingly defined product lines or product features until the desired product or product set is found.

Figure 46:
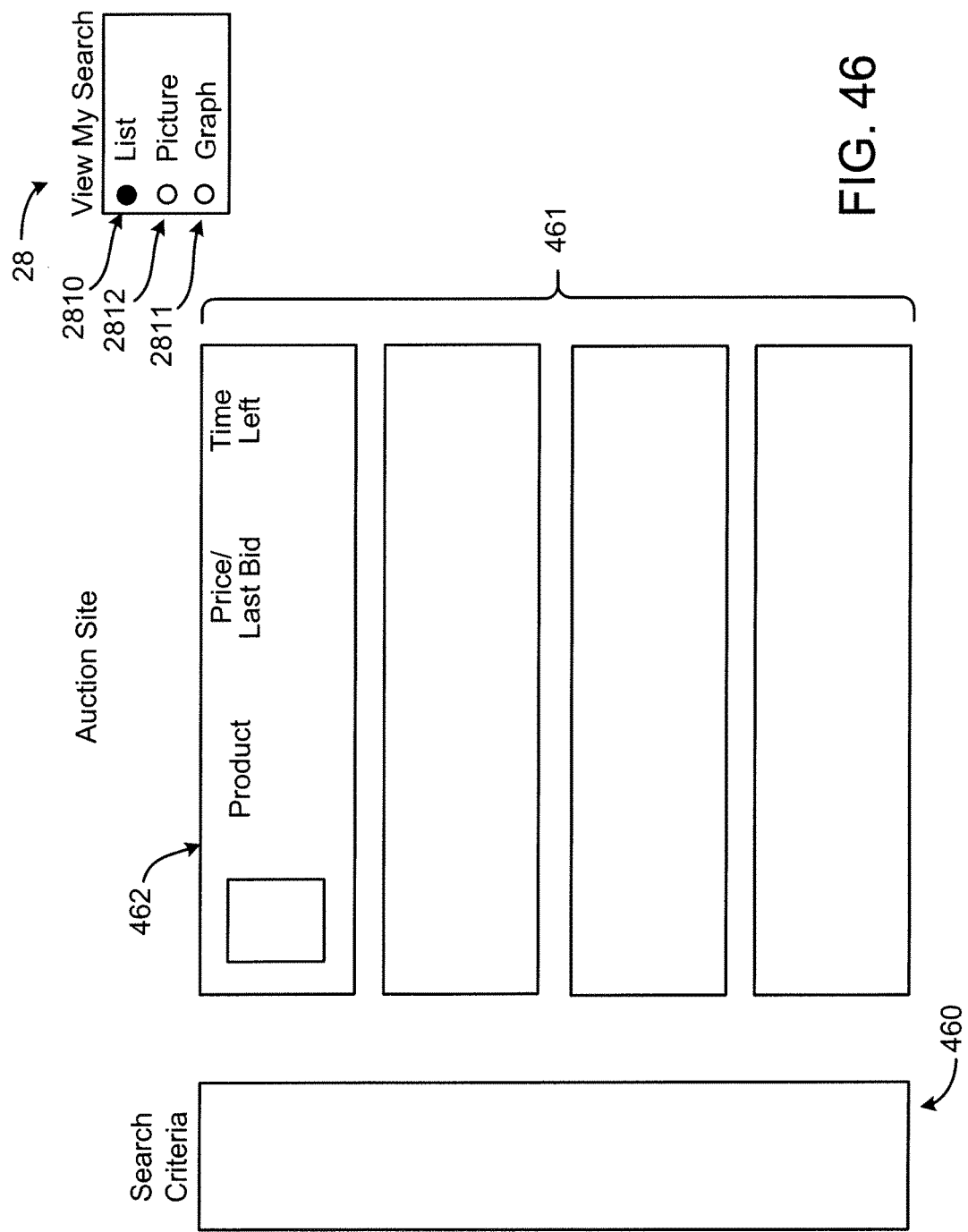
FIGS. 46-53 are screen shots of portions of an auction web site.

As with other sites that offer products and services for sale, the resultant data set that is established after the search criteria are entered is typically presented to the user in a list format similar to that as shown in FIG. 46, where the search criteria 460 are displayed as well as a list 461 of the products that meet those search criteria. Each product 462 is represented in the list with a photo and text describing the product.

The user sees this display as a default view or by clicking within the "View My Search" box 28 on the "List" option 2810.

Figure 47:
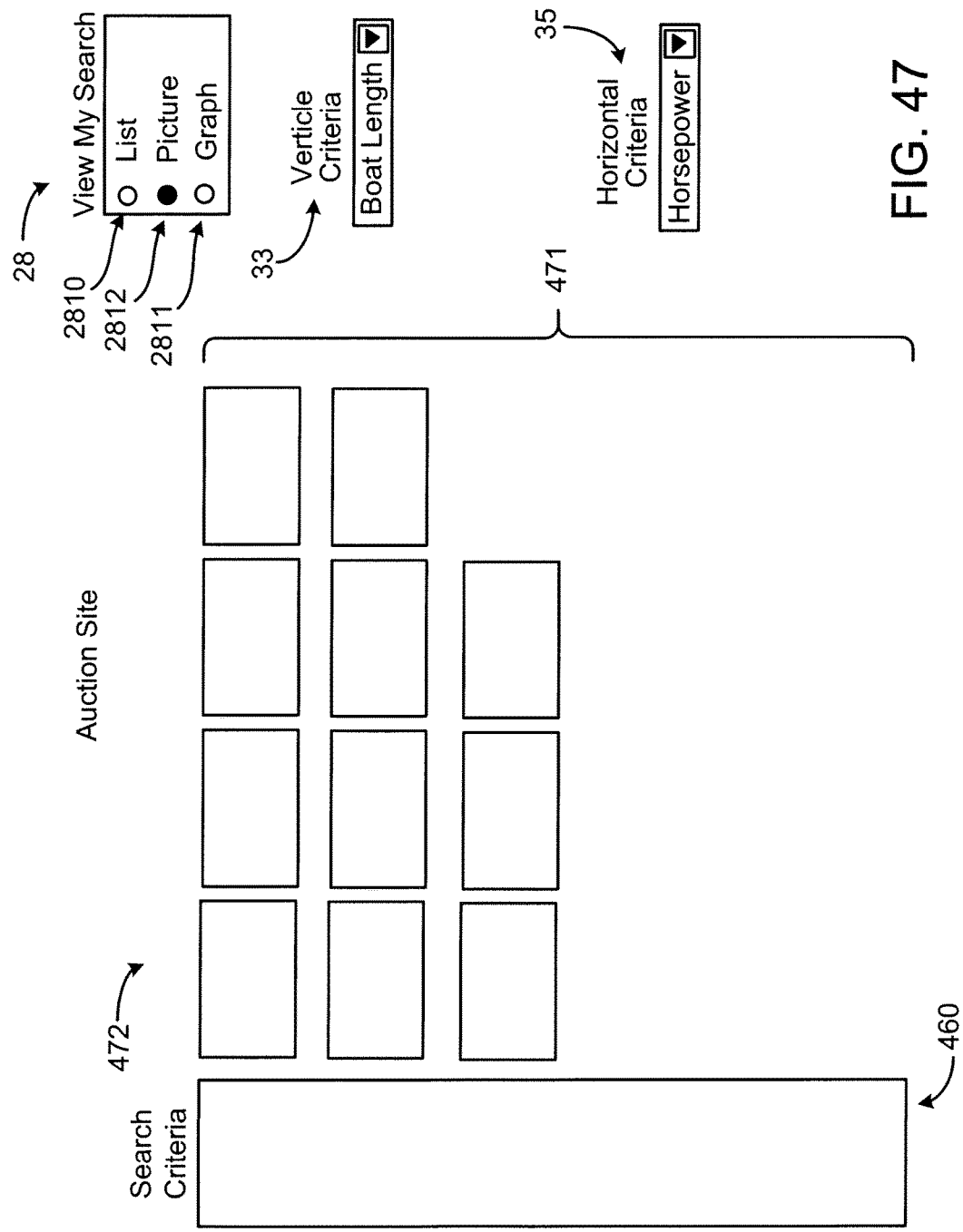

An alternative view is the "picture" view in which the user clicks on the "picture" option 2812 within box 28. In this instance, the user will see a display similar to the one shown in FIG. 47. In this display, the product set is shown as a picture gallery 471, and each product is represented by a single picture 472.

Figure 48:
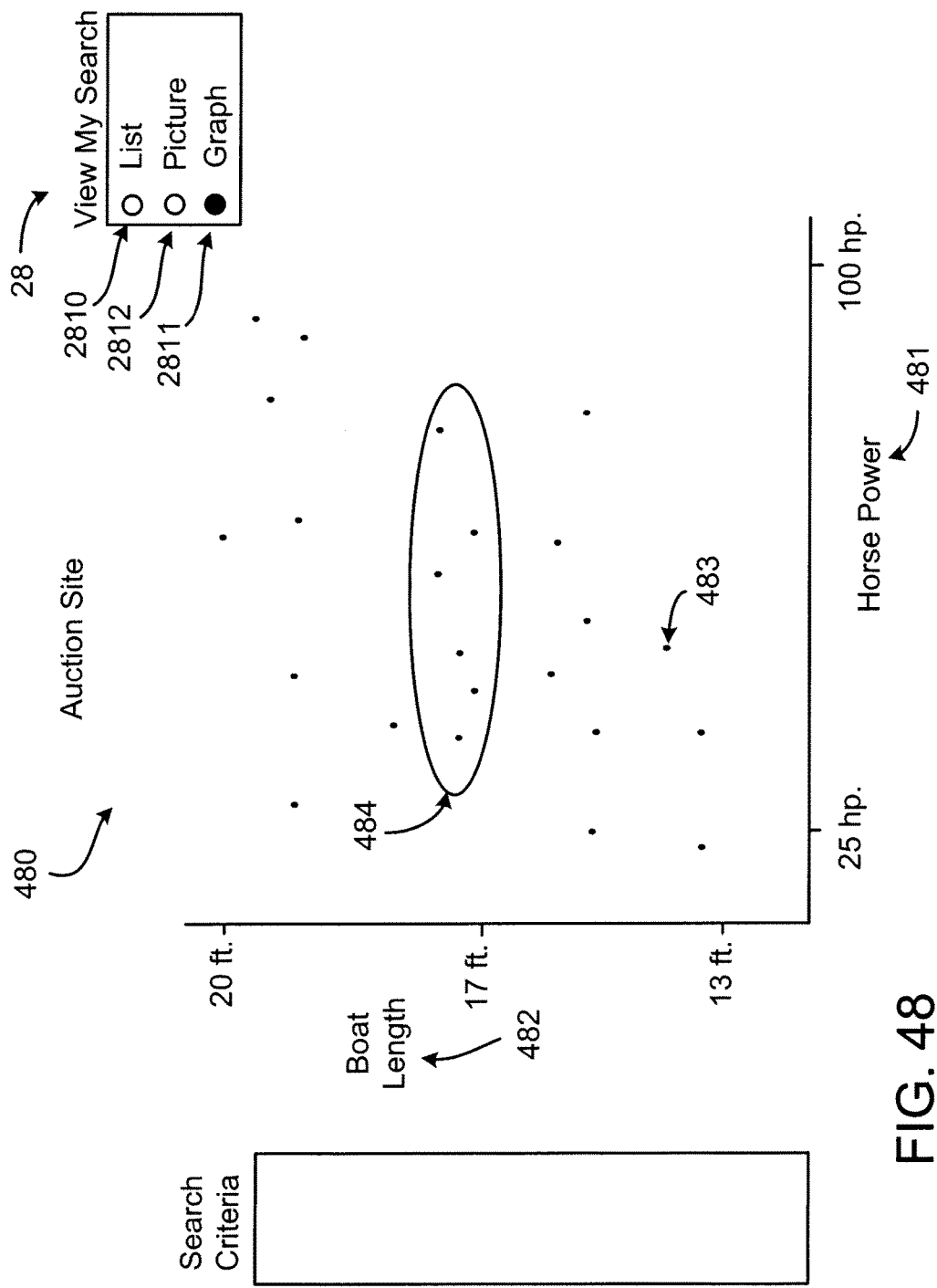

For this application, the user can choose the "graph" option 2811 from within box 28 which allows the user to choose which variables that he wishes to graph. These variables can be taken from any of the search criteria 460 that are used in the search process or even those that are not, such as the price at which the user can buy the product now. Once the user clicks on the "graph" option 2811, drop-down boxes 33 and 35 are displayed, which allow the user to choose which variables will be used for the graphical display. In this example, the user, who is viewing motorboats, chooses "boat length" as the vertical criteria 33, and "horsepower" as the horizontal criteria 35. The results of these selections are used to generate a display similar to that shown in FIG. 48, where the data set is displayed within graph 480, and "horsepower" 481 and "boat length" 482 are represented on the X and Y axes respectively. Each boat within the data set is represented as a point 483 within graph 480. In this view, users can easily see what boats are available to them within the length criteria and horsepower criteria that they have chosen. If the user, for example, were interested in boats in and around the 17' length, he could quickly see that there are five boat options available to him 484, each with different horsepower.

As with other applications of the comparison display shown previously, users can interact with and manipulate the data set and graph in varying degrees to customize their view, as well as select those date points in which they have further interest.

Figure 49:
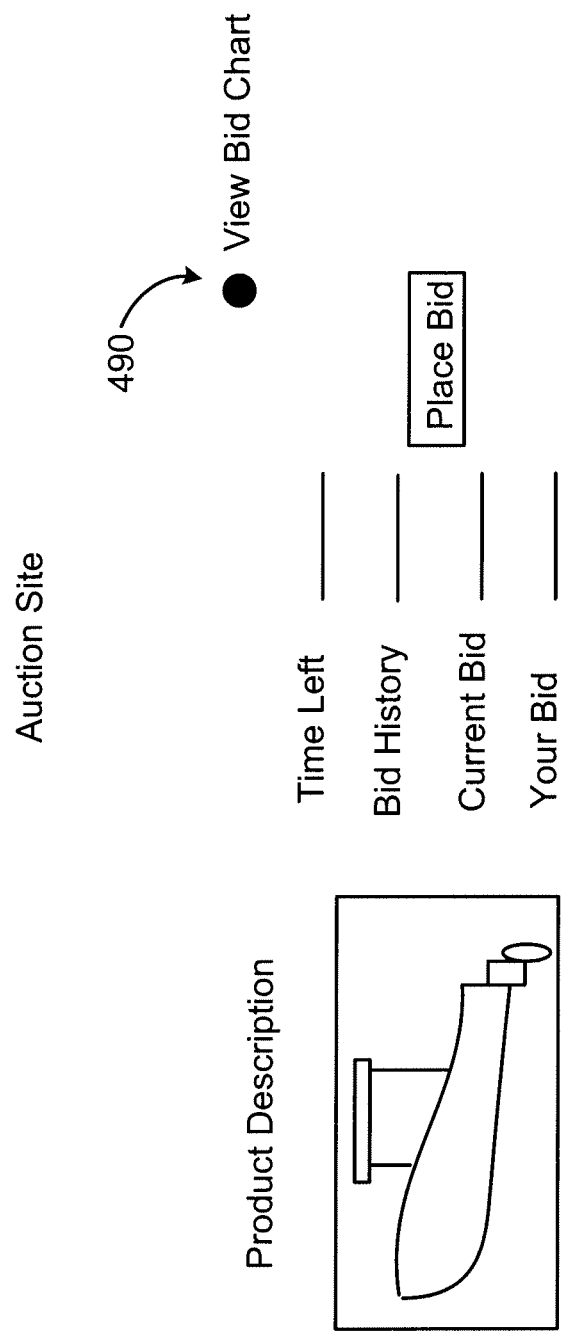

Users who have found a product in which they have an interest and in which they would like to place a bid often will have a bid input screen in which they can input a dollar price bid for that product. Once that bid has been placed, the users can keep track of that product and its auction status through a text and numerical display as seen in FIG. 49.

Figure 50:
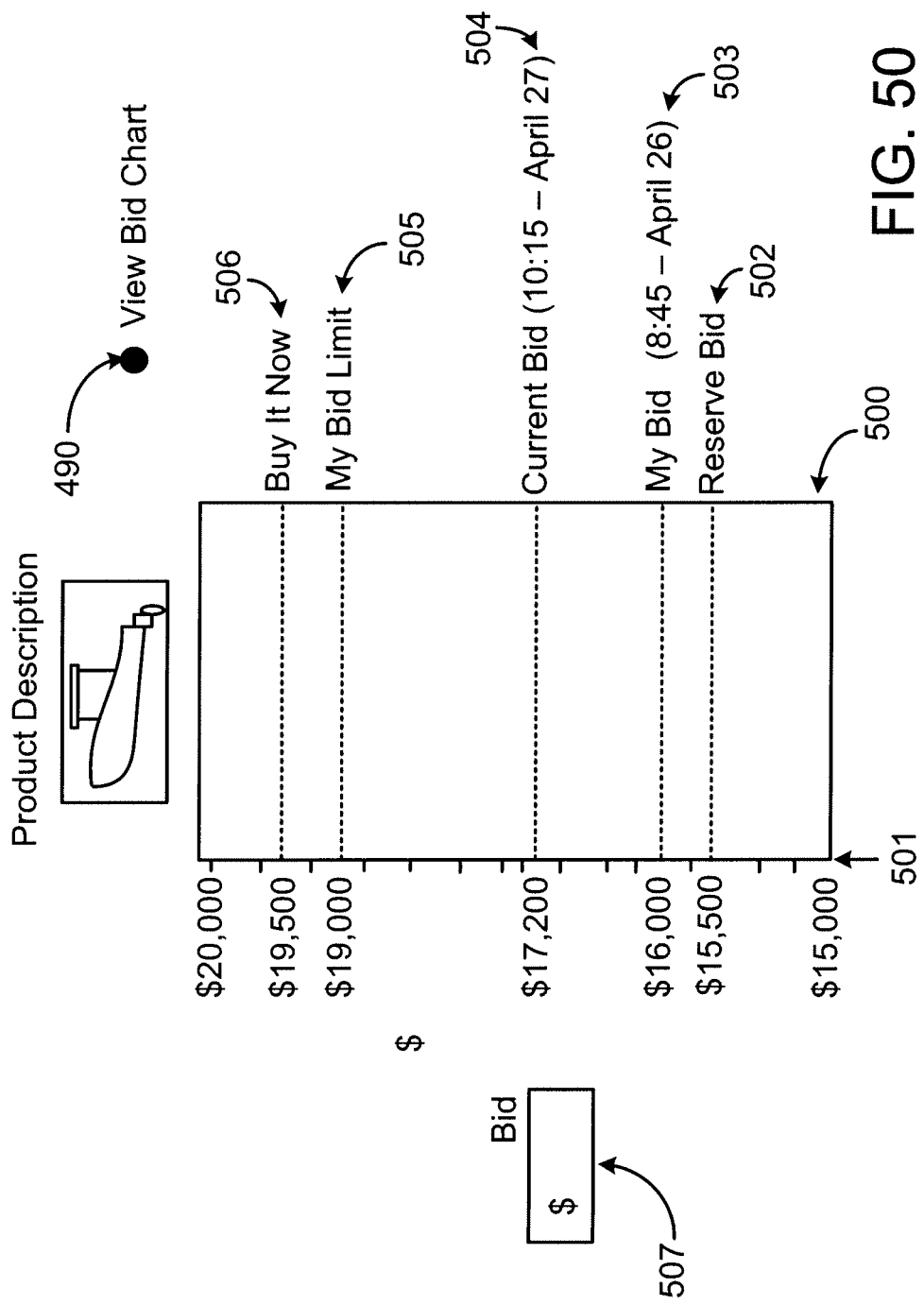

As an alternative display, users could choose to see their chosen product's auction status in a graphical display. This can occur by the user clicking on the "View Bid Chart" button 490 on the bid input screen as shown on FIG. 49. By clicking on button 490, users are be brought to a display such as the one shown in FIG. 50, showing various product and auction information about the item in a graphical format. For example, users see a pricing bar 500, which displays a price range for that product along its side 501. Within the pricing bar, at differing points, users are able to see bidding information for that product, including the reserve bid 502, the user's bid 503, the current bid 504, the user's self-imposed bid limit 505, and a price in which they could buy the product now 506.

These pricing levels, which are depicted in 502-506, can adjust dynamically with changes to bidding conditions so that users could graphically see as conditions change and conveniently view how these changes relate to their own bid and those of others. In addition to the standard manual entry of placing a bid through input box 507, users also have the ability to change their bid by clicking on "My Bid" line 503 and dragging it upward to a level where they would place an updated bid. In doing so, the user is able to see the price level on the bar change to reflect the line's location on the bar. Once the user moved the "My Bid" line to the new preferred bid level, he releases the click. Upon doing so, a pop-up box displays the new bid level and queries whether the user wishes to make a new bid at that new price. If confirmed, the "My Bid" line moves from its prior position to the new level, located above the previous "Current Bid" line 504.

The user also has the ability to adjust the "My Bid Limit" line, which is used simply as a reference for the user. This line gives the user a guide as to where he feels his top bid should be. This line can be moved up or down by the user but will have no impact on the auction status.

The display of pricing bar 500 can have a varied appearance among sections of itself. For example, the area below the reserve bid line 502 can be shaded out, or the area above the user's bid limit 505 could have a red background, both denoting a space in which the user does not want to participate. As another example, a green-shaded area could represent the area between the current bid 504 and the user's bid limit 505.

Figure 51:
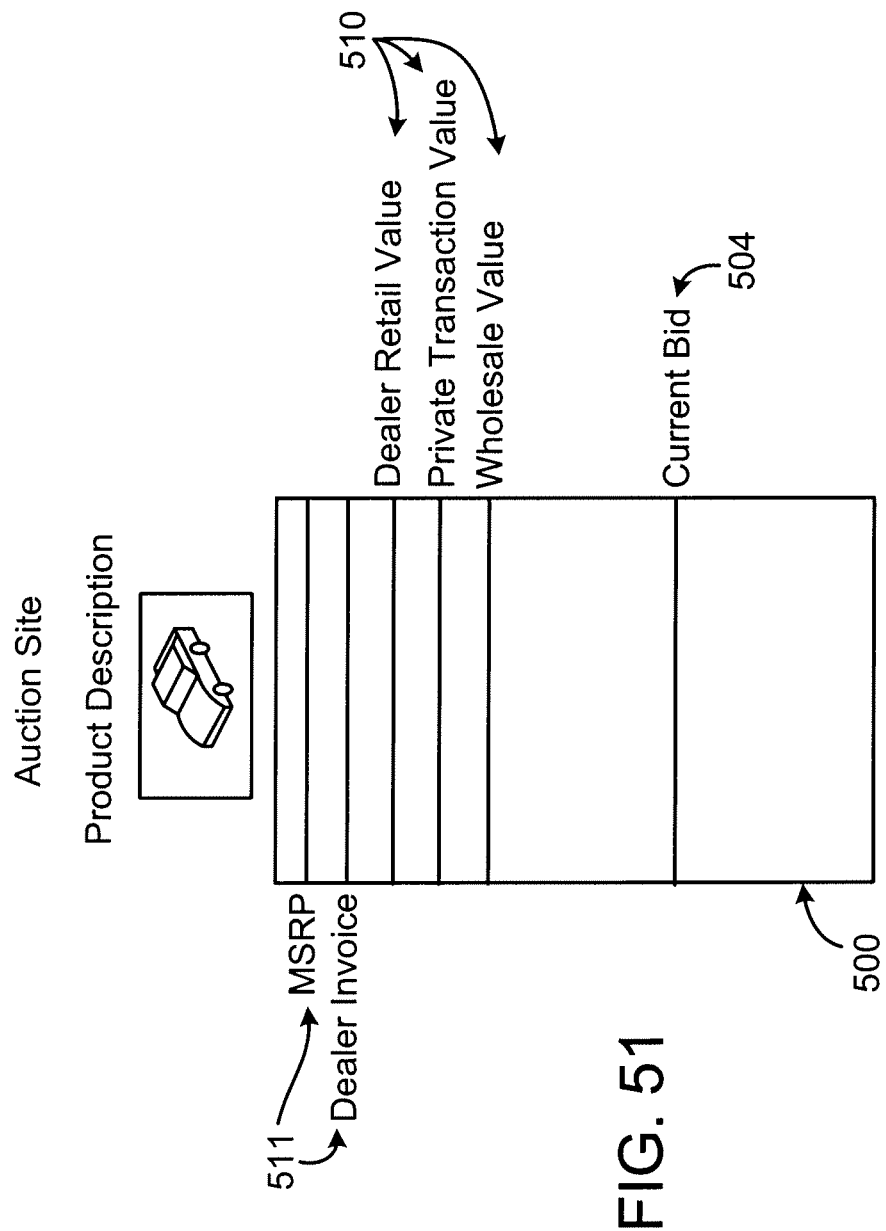

An alternative version of pricing bar 501 can be viewed for products for which there is a known book value, appraised value or accepted fair market value. For example, in the case of used vehicles, where there are book values that relate to that particular vehicle, book value lines can be included as part of the display. This is shown in FIG. 51, where bar 501 has lines (in addition to bid lines 502-506) that show one or more book values 510 for that particular vehicle. In the case of new vehicles, lines reflecting manufacturer's list price and dealer invoice cost 511 could also be included.

Figure 52:
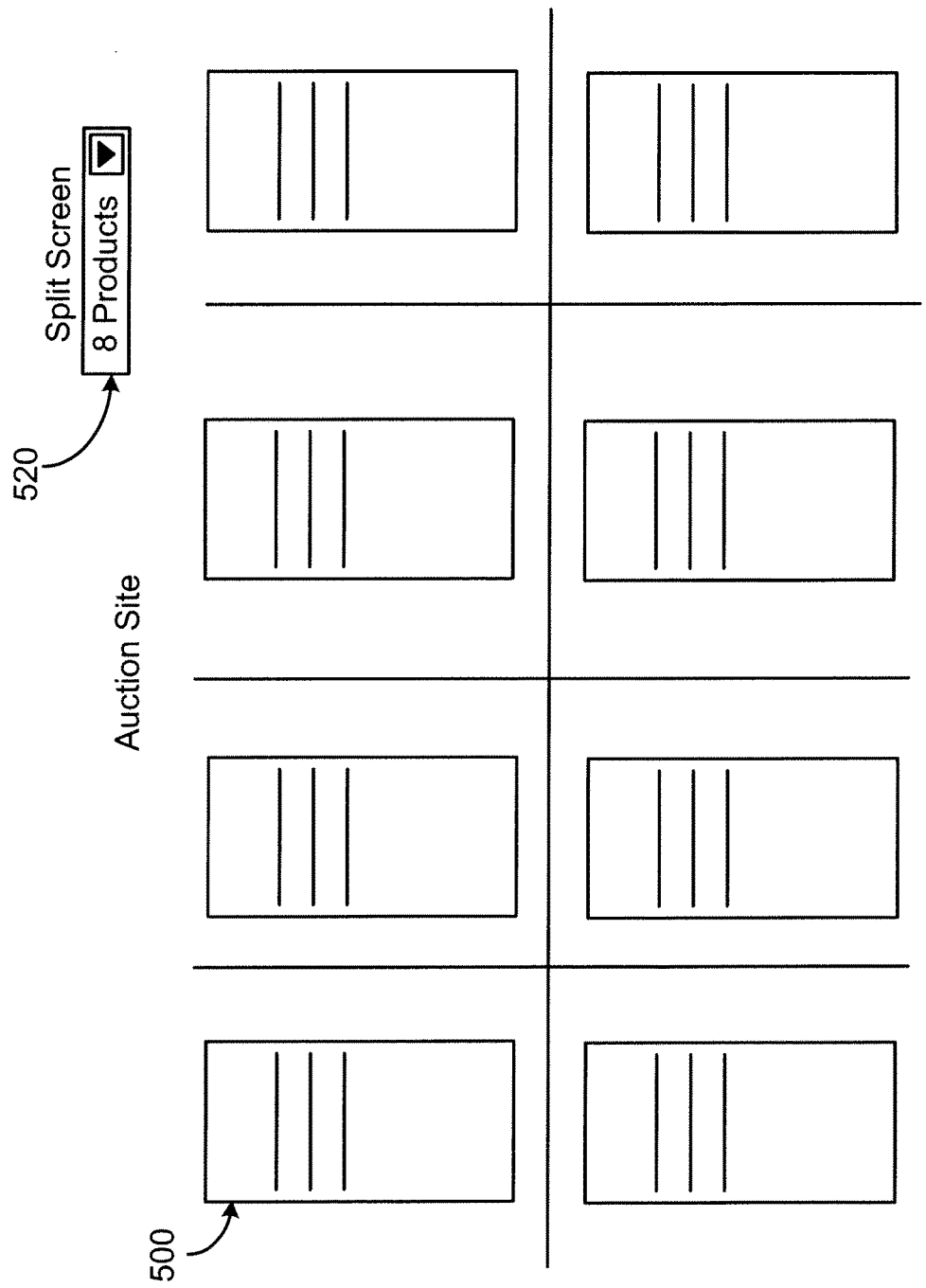

In instances where the user wishes to keep track of more than one product auction simultaneously, the user has the ability, by selecting from a "Split Screen" drop-down menu 520 as represented in FIG. 52, to see more than one product of which they are have an interest. In this display, multiple pricing bars 500 for multiple products can be viewed on the same screen. For users that want to compare the auction status of products in which they have an interest, this viewpoint offers them a convenient and effective way to track their status.

Figure 53:
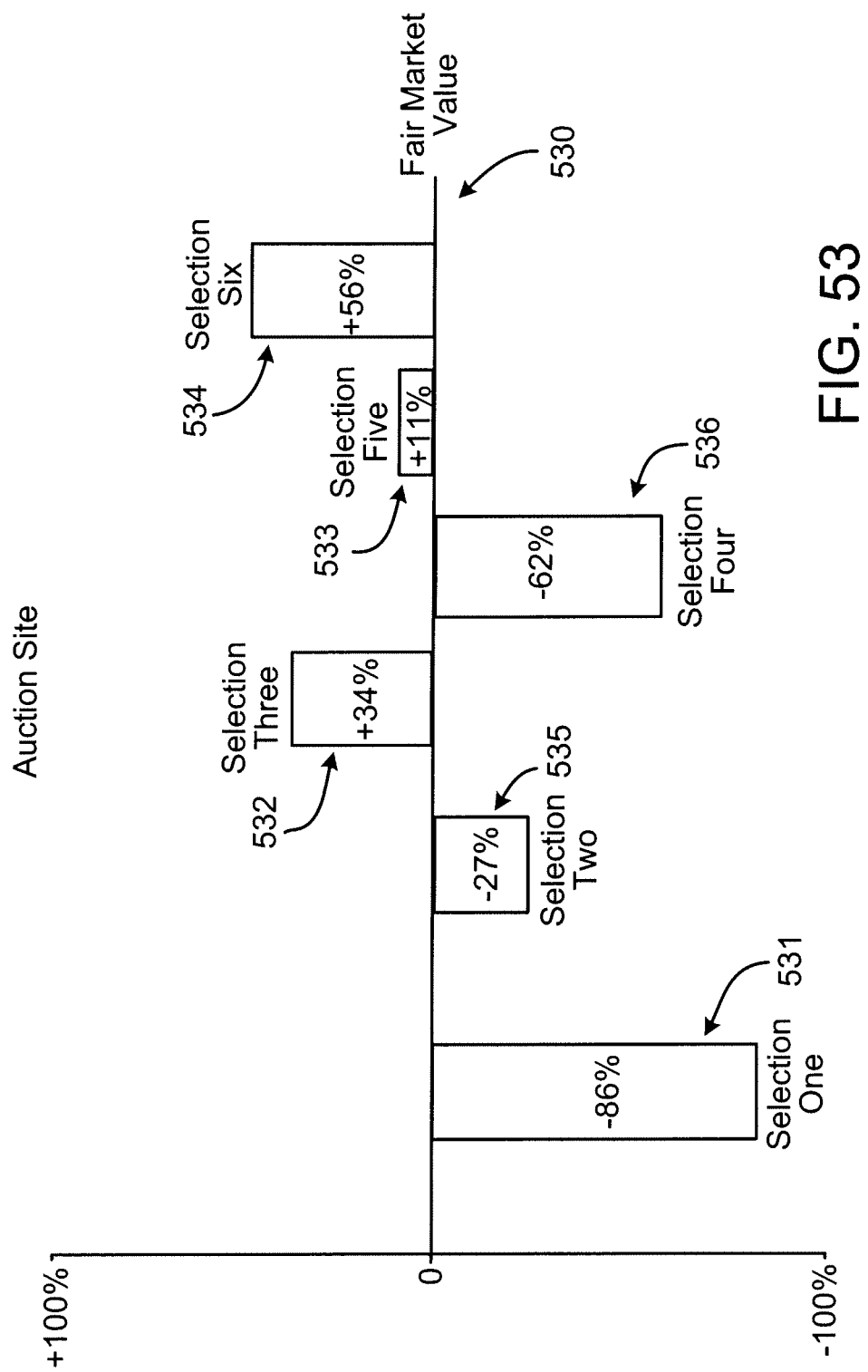

Users that are interested in and are monitoring multiple products in the auction process can be given an option of entering a "fair market price" for each of the products that they are following. With these fair market prices established, users can then view the status of each auction relative to their inputted fair price. In FIG. 53, the user is monitoring the auctions of six different iPhones of which they have previously entered what they believe to be a reasonable price for each. These "fair market values" are normalized on "fair market value" line 530, and their current bid price is reflected as a percentage of the products' "fair market value". For example, iPhone selection one 531 has a current bid that is at present 86% below what the user feels is its fair price. Selections three 532, five 533, and six 534 all have current bids above what the user feels are fair prices. Given such, unless the user is willing to bid above what he feels is a fair price, he will likely lose interest in selections three 532, five 533 and six 534, and instead, focus their attention on those items 531, 535, 536, still bid below their fair prices.

A user can interact with these product bars 531-536 in a similar fashion as the bar charts discussed in the previous sections of this description. For example, to see the product listing in detail, one simply clicks on the bar. Alternatively, if the user is no longer interested in the product, and did not wish to view its auction information any longer, he could right-click on the bar, and choose "remove" from a drop-down menu.

Figure 54:
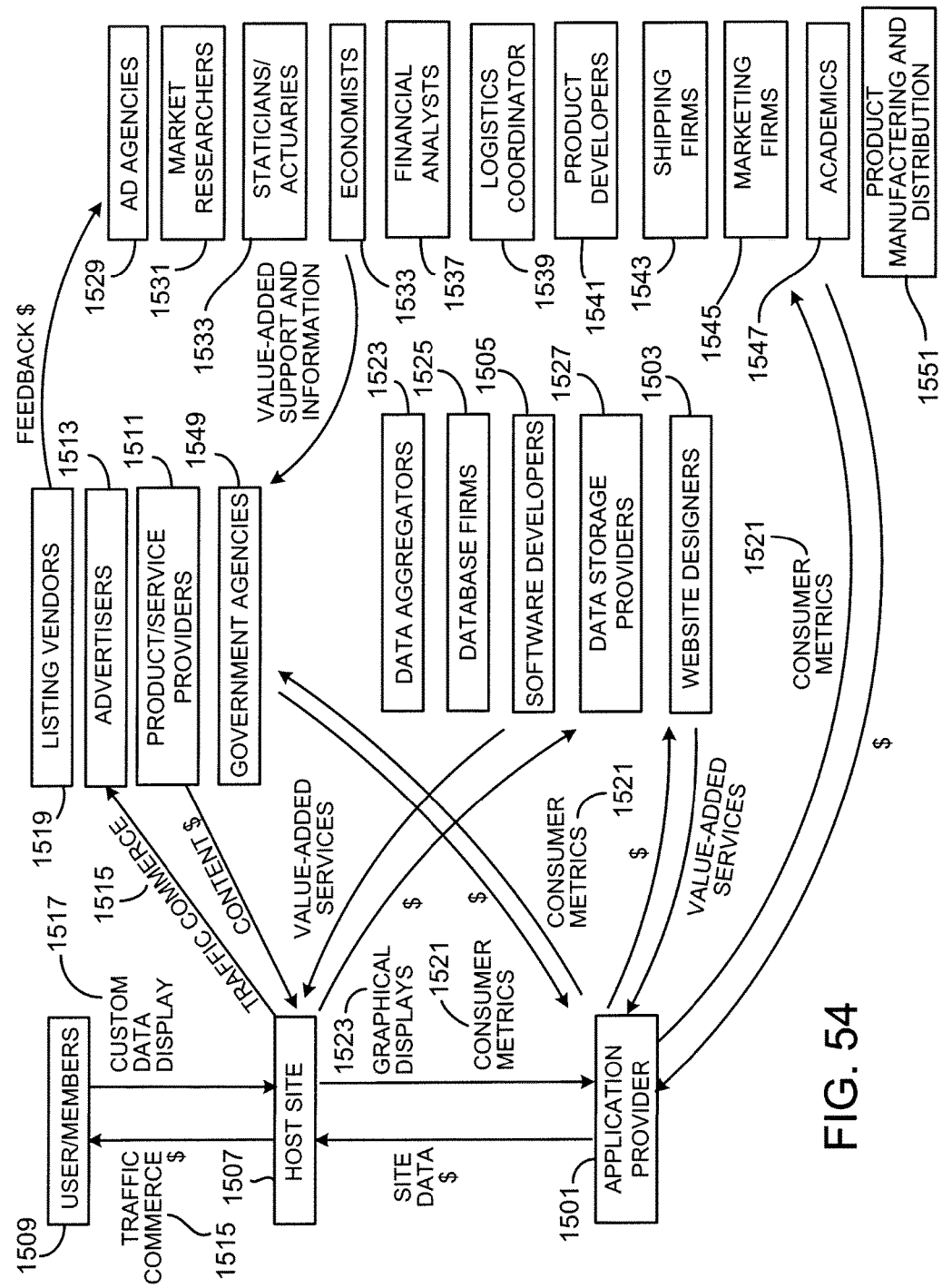

In general, the comparison display can be used with a variety of user interfaces. For example, a touch screen can be used. In the illustrations provided above, all user interactions with the data sets and graphs are described based upon users utilizing a mouse or keyboard to interact with and manipulate the graphic display. In all of the examples above, a touch screen interface can also be utilized to have the same desired outcomes using a finger(s) or stylus. For example, in a scatter graph, where the user wishes to see further information on a data point within the display, the user can simply tap that data point to see a full description of the item, in contrast to a mouse-based interface in which a click or "control/click" might be used. If the user wishes to see multiple data points, he could tap on multiple items in a generic "select items" mode. The same can be done for a bar chart or other graphic display. If a user wishes to see a subset of data points within a scatter graph, he can simply run his finger or a stylus around the preferred data points to outline and select those data points. Likewise, for general cursor operations such as selecting from drop-down menus, clicking on buttons, etc., a finger(s) or stylus can also be utilized to perform the same functions. For example, if the user wishes to move an inserted line within the graphic display, he can simply drag the line with their finger or stylus. For functions such as zooming or panning on a display, the same standard touch screen operations will also apply. Referring to FIG. 54, the comparison display functionality could be licensed by a variety of source entities for a fee to a variety of target entities such as application providers 1501 (e.g web site designers 1503), and software developers 1505. The fee could include a full turn-key solution where the licensor provides all the tools necessary to implement the application into the licensee's site, for example, or the fee could include a basic license where the licensee simply licenses the idea and where the licensee is responsible for the implementation of the application. Ultimately, the licensee can select the nature of whether he would have the application implemented on an in-house or outsourced basis and the licensing fee would be reflective of the effort involved on the part of the licensor.

Host sites 1507 that charge a listing or placement fee for others to list products on their sites, can offer their users 1509 a more robust search process using the comparison display. This enhanced process, which provides increased user tools and increased search efficiency, should drive incremental traffic to these sites. As a result, product/service providers 1511 that list their products or services may be willing to pay increased listing and/or placement fees that correspond to the increased site traffic and resultant increase in sales potential. A site that employs the comparison display can justify an increased listing fee by demonstrating to listing vendors an increase in site traffic as well as other metrics that the vendor would find interesting such as users' average length of time on the site, the amount of click-throughs to vendors' sites, and changes in attitudinal data of users' intent to purchase and/or brand recognition.

Advertisers 1513, too, may be interested in these metrics, because like the listing vendors, they may be interested in the quantity and quality of traffic 1515 that is drawn to a site. With this application, metrics in this area will likely improve, and as a result, advertisers will see a greater value in placing ads on the site. As with any advertising medium, advertisers may be willing to pay higher ad fees to place ads on sites that employ the comparison display, as traffic quantity and quality would both improve. These higher advertising rates can result not only from increased traffic but also from the fact that users 1509 will likely conduct more in-depth searches, viewing varying custom displays 1517 of their data set, as well as interfacing with it. Furthermore, those that make the effort to view their data set in graphical views may be more likely to make a selection on the site since the users are exhibiting a greater degree of interest in the item(s) in which they are researching. Users 1509 that utilize the comparison display will become more informed consumers, and as a result, have greater confidence during their selection process. This increased confidence will generate higher selection rates, and higher post-selection satisfaction rates, which will create benefits for both users 1509 and vendors 1519.

For both listing vendors 1519 and for advertisers 1513, site traffic, click-throughs, attitudinal data, web page views, length of time on the site, resultant sales, and other consumer metrics 1521 are all measurable through Web-based cookie technology, for example, or other technologies used to maintain state and store data, and the application's involvement in the changes to these metrics can be easily determined by comparing those that utilize the application versus those that do not. The metrics could be used in determining fees assessed by the application provider. For example, sites that have users who heavily use the comparison display could be charged higher fees based on that heavy use, as compared to sites that have users who use the comparison display lightly or infrequently based on the metrics.

Data aggregators 1523 that aggregate products and services available for sale that are ultimately provided by others can easily determine whether users have utilized the application and viewed its various displays. For users that subsequently make a selection or purchase, sites can once again use consumer metrics 1521 to measure the purchase habits of those that have utilized the application versus those that have not. To the extent that there is a meaningful difference between the two constituencies, the application licensor can demonstrate the incremental value that the application provides, and charge a licensing fee that is reflective of this value added.

In the case of sites that offer their own products and services, the metrics of those that utilize the application on their site can be readily measured. Consequently, sites can measure the effectiveness of the application versus historical trends, and by observing the behavior of those that have used the application, and determine the incremental value created by the use of the application.

In the case of sites that have a membership base, and where members pay an access fee to the site, those sites will be able to observe the extent of the application's use by its membership base. To the extent that the sites utilize the comparison display application, and they find its members make strong use of the application, and find it helpful, they can potentially increase their market share in their sector, and/or potentially raise the price of membership. To the extent that users find the application to be helpful in educated them, providing them a more robust search process, or simply allowing them to find what they are looking for in a more streamlined manner, the users may be willing to spend more on that membership compared to other sites.

In all instances, regardless of the nature of the site, online surveying can take place to judge users' receptivity to the application on a particular site. This surveying can take place as a result of a beta test of the application on a site, for example, or in the form of a simple mock-up that is created for a site which is not currently in use. In either case, users can respond as to how useful they would find the application, how much they would anticipate using it, which products and/or services they would find most relevant for it, and how valuable they believe it would be for their search process.

There are numerous possible beneficiaries of the comparison display. As stated above, any site that derives revenue from web-based transactions, or simply advertising revenue, would benefit from increased traffic on their site. In addition, firms that create these graphical displays 1523, as well as those that manipulate databases (e.g., database firms 1525 and data storage providers 1527) can garner additional revenue by providing services to the host websites. Advertisers on these sites can benefit as well, as they would be able to better target their advertising to users that chose specific views of the data set. For example, if a user chose to view the data set, using characteristics X and Y as the variables in the graphical display, then vendors whose business relate to characteristics X and Y could opt to advertise when those variables are chosen. The number of users interacting with the data set, through the selection of display variables, and the manner in which they interact with the display can demonstrate to advertisers the features or attributes users feel are important in their selection criteria. The comparison display application can provide a much more targeted approach to advertising, making advertising expenditures more productive. As a result, the more a user interacts with the data set through the graphical displays, the more insights the user can gain from the data set. At the same time, the more the application is used, the more the site will learn from that user through their search behavior and subsequent data set interaction and manipulation.

Throughout this description, a number of different product and service sites are used to demonstrate examples of how this application could be applied. There are, however, countless more that are not mentioned. Practically any product, service or individual that is displayed in a list on a website and that has specific descriptors that can define that item are eligible to be graphed in the comparison display. Consumer and commercial products of all kinds can be represented, as can numerous services—everything from medical services to insurance policies to vacation packages. Additionally, individuals have attributes that can be defined in a graphical format, whether for the purpose of finding someone on a matchmaking site or for the purpose of trying to find the right doctor based upon qualifications or location. Provided that the information on the item can be placed in a database, with definable criteria, whether quantitative or qualitative, the item's attributes can be plotted on a graph along with items that share similar characteristics.

Revenue for the application of the comparison display may come principally from those firms that wish to utilize this application on their websites. In an effort to increase traffic, they may be willing to pay for those applications that increase the site metrics that are important to them, whether they be direct sales, referrals to others, listing fees, membership fees or increased advertising revenue. If the application meaningfully helps on one or more of these metrics, they may be willing to pay for this application, as they see a favorable cost/benefit ratio.

In summary, through the techniques described here, users have a greater likelihood of finding the specific item that they are looking for in a more efficient manner, and those users will be drawn to those sites that can provide this enhanced search and selection process. This increased site traffic, which will lead to increased site awareness, sales, referrals, listings, memberships and advertising, can be monetized in that there is value being created, and businesses and consumers will be willing to pay for this added value.

The relevant parties that could be involved in this application may consist of the following examples: web site users 1509, product and service providers 1511, online data aggregators 1523, database firms 1525, software developers 1505, data storage providers 1527, website design firms 1503, data storage providers 1527, advertising agencies 1529, advertisers 1513, market research firms 1531, product manufacturers and distributors 1551, statisticians and actuaries 1533, academics 1547, economists 1535, financial analysts 1537, governmental agencies 1549, logistics coordinators 1539, product development firms 1541, shipping firms 1543 and marketing firms 1545. Any number of other types of individuals, organizations, and services may also find uses of the comparison display.

FIGS. 55A and 55B show ways in which the users 1509, host sites 1507, and application providers 1501 can interact. FIG. 55A represents an initial setup interaction that occurs when users begin comparison sessions. One of the users 1509 provides search criteria 1561 to the host site 1507, which performs the search and provides the results in the form of tabular data 1563 to the comparison display application provider 1501. The application provider 1501 sends back a graphical display 1565 based on the data defined by the user's search query. The host site 1507 then sends the user-defined graphical display 1565 (with possible cosmetic modifications or other additions specific to the host site).

As shown in FIG. 55B, when one of the users 1509 interacts with the comparison display, he may manipulate the data set and graphical representation 1567 provided by the host site 1507. In this case, the host site sends the revised data set graphical attributes 1569 to the application provider 1501. The provider returns a revised graphical display 1571 which is also returned to the user. Thus, any of the users 1509 can interact with data provided by the host 1507 site using the comparison display interface and functionality as provided by the application provider 1501.

The revenue model for the application of the comparison display varies based upon the constituency involved. In most cases, however, it will be web sites on the Internet (or another user-accessible network) that choose to license the application that will be the chief contributors to application revenues. The web sites' rationale for paying for this application is contingent upon their own revenue model and the metrics that drive that revenue. In general, increased site traffic and the resultant commerce that ensues will generally be the chief determinant of the value of the application for the website. Whether it is from increased listing fees, membership fees, sales commissions, referral fees, direct sales, or advertising revenues, the change in the quality and quantity of site traffic will be the principal attribute that will determine the application's commercial viability. Additional meaningful revenue can be garnered through the aggregation and dissemination of consumer metrics captured as a result of users' graphical interactions. By providing graphical displays to numerous firms within numerous product/service sectors, the application provider can to aggregate and market consumer data to host sites and other constituencies that would have an interest in consumer metrics and behavior patterns.

Figure 56:
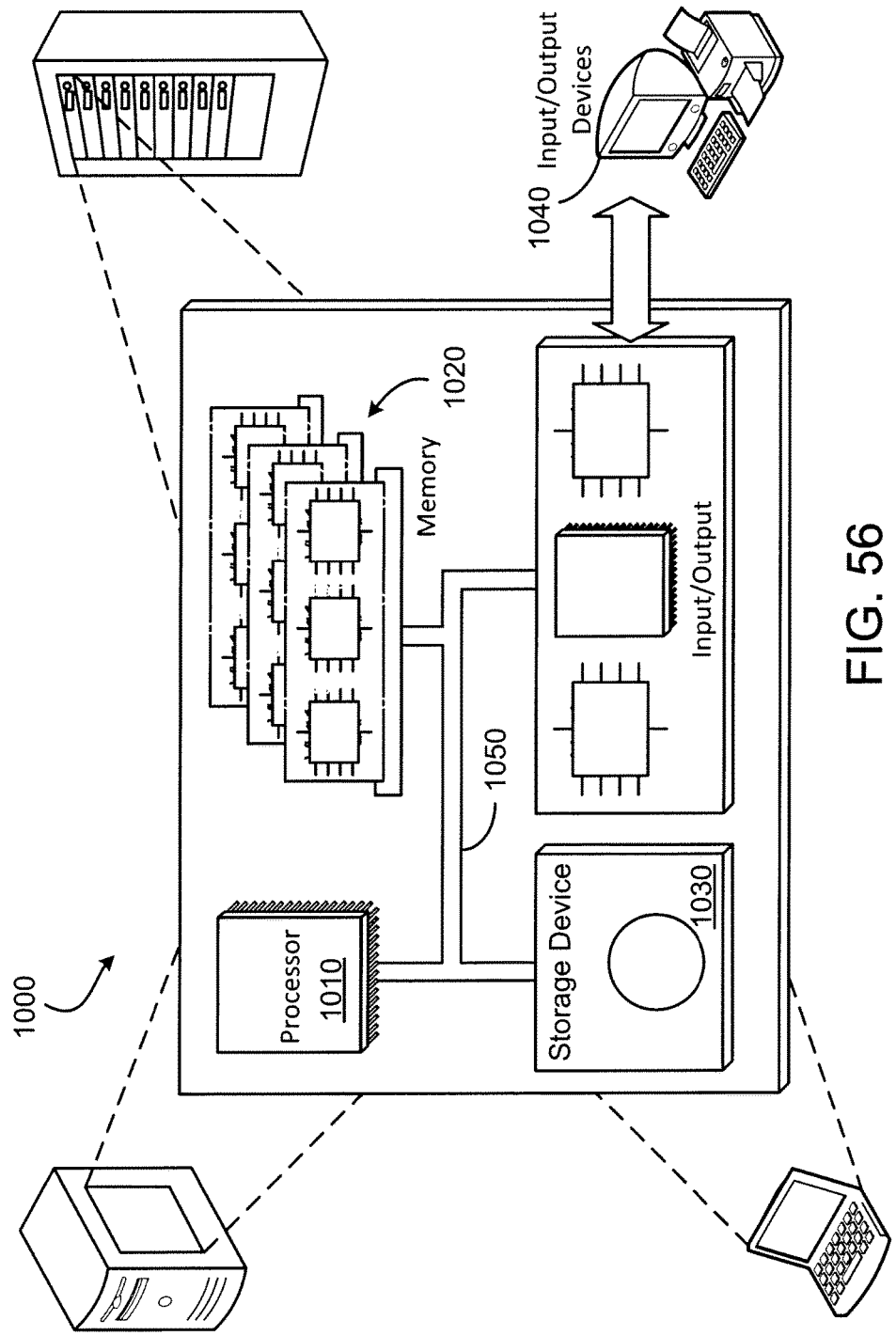

The comparison display described above can be implemented using software for execution on a computer. For example, FIG. 56 shows a schematic diagram of a generic computer system 1000. The system 1000 can be used for the operations described in association with any of the computer-implemented methods described previously, according to one implementation. For example, the server 130 could take the form of the system 1000 described here. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In some implementations, the memory 1020 is a computer-readable medium. The memory 1020 is a volatile memory unit in some implementations and is a non-volatile memory unit in other implementations.

The storage device 1030 is capable of providing mass storage for the system 800. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Other implementations are also within the scope of the following claims.

The invention claimed is:

1. A computer-implemented method comprising through a browser window on a display of a user device, showing a two-dimensional dynamically-changing graphical data presentation, including on the two-dimensional dynamically-changing graphical data presentation, a dynamically changing set of constituent markers that graphically illustrate information about a corresponding changing selection of available items, each of the available items being represented in the presentation by one of the constituent markers of the changing set, the changing selection of available items being characterized by values of attributes of a corresponding set of data records for the items, presenting in the browser window, scope controls representative of controllable aspects of a scope of a search of the data records, receiving changing scope information representative of successive invocations of the scope controls, each of the markers being displayed in the presentation in a position located at distances along each of two different dimensions, the distance of the position of the marker along one of the dimensions of the presentation corresponding to a value of one of the attributes of the item, and the distance of the position of the marker along another one of the dimensions of the presentation corresponding to a value of another one of the attributes of the item, the distances being based on attributes of the data record of the item stored in the database, the two-dimensional dynamically-changing graphical data presentation having an extent along the one dimension that corresponds to a range of the values of the one attribute of the items for which markers are included in the presentation, and an extent along the other dimension that corresponds to a range of the values of the other attribute of the items for which markers are included in the presentation, the set of data records to which the changing selection of available items corresponds changing based on successive searches of the database in response to the changing scope information, the selection of available items including available items that are different in total number or in the identities of the available items or both and that have a different range of values of the one attribute or the other attribute or both, from the items that previously were in the selection of available items, changing the constituent markers of the set of markers dynamically and repeatedly in real time in response to changing search results that derive from changes in scope of searches of the database containing the data records, the changing of the constituent markers being based on information about the changing search results received at the user device through a communication network from the server, showing in the browser window on the display of the user device an updated two-dimensional dynamically-changing graphical data presentation that includes the changed set of the constituent markers and graphically illustrates comparative information about the updated selection of available items, each of markers being characterized by values of attributes of a corresponding data record for the item, the updated two-dimensional dynamically-changing graphical data presentation having an updated extent along the one dimension that corresponds to a range of the values of the one attribute of the items for which markers are included in the updated presentation, and an extent along the other dimension that corresponds to a range of the values of the other attribute of the items for which markers are included in the updated presentation, the extent of each of the dimensions of the updated two-dimensional dynamically-changing graphical data presentation and the positions of the markers in the updated dynamically-changing graphical data presentation in the browser window on the display at the user device corresponding to the data records.

2. The method of claim 1 in which the graphical identifiers comprise active display elements each of which can be invoked by the user to learn more information about the item represented by the graphical identifier.

3. The method of claim 1 in which enabling the user to interactively define an updated selection comprises presenting interactive controls associated with the two-dimensional presentation, the interactive controls enabling the user to define filter criteria to be applied to the data in the database.

4. The method of claim 1 comprising including in the two-dimensional presentation a trend line that indicates a trend of a relationship of the attributes associated with the one dimension and the other dimension.

5. The method of claim 1 comprising
in the two-dimensional dynamically-changing graphical data presentation a trend line that indicates a trend of a relationship of the attributes associated with the one dimension and the other dimension.

* * * * *

UNITED STATES PATENT AND TRADEMARK OFFICE
CERTIFICATE OF CORRECTION

PATENT NO. : 10,025,866 B2
APPLICATION NO. : 14/858705
DATED : July 17, 2018
INVENTOR(S) : Scott T. Baker Page 1 of 1

It is certified that error appears in the above-identified patent and that said Letters Patent is hereby corrected as shown below:

In the Specification

Column 1, Line 10, delete "14/381,361," and insert -- 14/831,361, --, therefore.

Signed and Sealed this
Twenty-eighth Day of August, 2018

Andrei Iancu
*Director of the United States Patent and Trademark Office*